United States Patent
Ito et al.

(10) Patent No.: US 9,042,002 B2
(45) Date of Patent: May 26, 2015

(54) MODULATED SIGNAL DETECTING APPARATUS AND MODULATED SIGNAL DETECTING METHOD

(75) Inventors: Kiyotaka Ito, Hyogo (JP); Yasumori Hino, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 204 days.

(21) Appl. No.: 13/817,952

(22) PCT Filed: Aug. 16, 2012

(86) PCT No.: PCT/JP2012/005168
§ 371 (c)(1),
(2), (4) Date: Feb. 20, 2013

(87) PCT Pub. No.: WO2013/031120
PCT Pub. Date: Mar. 7, 2013

(65) Prior Publication Data
US 2013/0271823 A1    Oct. 17, 2013

(30) Foreign Application Priority Data
Aug. 30, 2011 (JP) .................... 2011-187584

(51) Int. Cl.
*G02F 2/00*    (2006.01)
*G11B 7/1395*  (2012.01)
(Continued)

(52) U.S. Cl.
CPC .............. *G02F 2/00* (2013.01); *G11B 7/1365* (2013.01); *G11B 7/1395* (2013.01); *G11B 20/10268* (2013.01)

(58) Field of Classification Search
CPC ...... G02F 2/00; G11B 7/1365; G11B 7/1395; G11B 20/10268

USPC ......................................................... 359/325
See application file for complete search history.

(56) References Cited

U.S. PATENT DOCUMENTS 6,813,321 B1 * 11/2004 Katoh et al. .................. 375/329
7,616,318 B2    11/2009 Kikuchi
(Continued)

FOREIGN PATENT DOCUMENTS

JP    5-274679    10/1993
JP    6-223433    8/1994
(Continued)

OTHER PUBLICATIONS

International Search Report issued Sep. 11, 2012 in International (PCT) Application No. PCT/JP2012/005168.

*Primary Examiner* — Daniel Petkovsek
(74) *Attorney, Agent, or Firm* — Wenderoth, Lind & Ponack, L.L.P.

(57) ABSTRACT

A phase difference error detecting unit detects a phase difference error component included in a phase difference component; a phase difference correcting unit corrects a first signal having the phase difference component as an angle of a cosine function and a second signal whose angle of the cosine function differs from that of the first signal by approximately π/2 based on the detected phase difference error component; a phase operating unit operates a phase difference component from the first signal and the second signal corrected by the phase difference correcting unit; and the phase difference correcting unit obtains the corrected first signal and the corrected second signal by rotating a coordinate point represented by the first signal and the second signal on a polar coordinate plane by an angle corresponding to the phase difference error component.

9 Claims, 30 Drawing Sheets

(51) Int. Cl.
  *G11B 7/1365* (2012.01)
  *G11B 20/10* (2006.01)

(56) References Cited

U.S. PATENT DOCUMENTS

| | | |
|---|---|---|
| 7,715,287 B2 | 5/2010 | Shimano et al. |
| 7,750,276 B2 | 7/2010 | Miyamoto et al. |
| 7,911,889 B2 | 3/2011 | Shimano et al. |
| 7,945,821 B2 * | 5/2011 | Ohishi et al. ............ 714/700 |
| 8,098,548 B2 | 1/2012 | Mikami et al. |
| 2007/0046952 A1 | 3/2007 | Kikuchi |
| 2007/0274171 A1 | 11/2007 | Shimano et al. |
| 2008/0067321 A1 | 3/2008 | Miyamoto et al. |
| 2009/0316539 A1 | 12/2009 | Mikami et al. |
| 2010/0188961 A1 | 7/2010 | Shimano et al. |

FOREIGN PATENT DOCUMENTS

| | | |
|---|---|---|
| JP | 2007-64860 | 3/2007 |
| JP | 2007-317284 | 12/2007 |
| JP | 2008-65961 | 3/2008 |
| JP | 2008-269680 | 11/2008 |
| JP | 2009-15944 | 1/2009 |
| JP | 2009-252337 | 10/2009 |

* cited by examiner ized signal detecting apparatus and a modulated signal detecting method for detecting a modulated signal by detecting interference light resulting from an interference between intensity-modulated or phase-modulated signal light and reference light, and provides a technique that is applicable to an optical disk medium, optical data transmission, optical data communication, an optical bus, an optical USB (universal serial bus), and the like.

BACKGROUND OF THE INVENTION

Background Art

Optical disk media are widely used as large capacity information recording media. Technological development for increasing capacities of optical disk media has proceeded from CDs to DVDs and then to Blu-ray Discs by using laser light of shorter wavelengths and objective lenses with higher numerical apertures (NA). Recently, given that services known as cloud services that utilize online storage on the Internet have been expanding year after year, further capacity enlargement of storages including HDDs (hard disk drives) and flash memories is desired.

The following developments are underway with respect to further capacity enlargement of optical disk media.

First, as far as wavelength reduction of laser light is concerned, a semiconductor laser that outputs laser light in the 300 nm ultraviolet range has been put to practical use. However, since light in an ultraviolet range equal to or shorter than 300 nm attenuates significantly in air, wavelength reduction of laser light cannot be expected to produce major benefits.

Next, as far as increasing NA is concerned, a technique has been developed for increasing recording surface density with a system that uses an SIL (solid immersion lens) having an NA of one or higher. In addition, research is being carried out with respect to increasing recording surface density through the use of a near-field light that occurs in a smaller region than a diffraction limit of light. Furthermore, while BD-XL among optical disk media currently in the market has three or four recording surfaces, research aimed at enlarging capacity by further increasing the layers of recording surfaces is also being carried out.

With ongoing promotion of capacity enlargement of optical disk media as described above, in particular, multi-layering causes a further reduction in signal light intensity that is modulated due to reflection on a recording surface of an optical disk medium and prevents a sufficient S/N of a reproduction signal from being secured. Therefore, further increasing an S/N of a detected signal should become essential in pursuing capacity enlargement of optical disk media in the future.

Techniques for increasing an S/N of a reproduction signal of an optical disk medium include a detecting system that uses optical interference (for example, refer to Patent Literature 1). With this detecting system, light from a laser is divided into light (disk light) that is irradiated on an optical disk medium and light (reference light) that is not irradiated on the optical disk medium, and interference occurs between reflected light (signal light) from the optical disk medium and the reference light. In addition, weak signal amplitude by the signal light is amplified by increasing the intensity of the reference light. Accordingly, in principle, since intensity of the reference light increases in a feasible range, S/N can be further increased with respect to an amplifier noise or a shot noise created in a photodetector.

This technique is advantageous in that weak signal light can be detected at a high S/N. However, since optical interference is used, a fluctuation in a difference between an optical path length of signal light and an optical path length of reference light causes a variation in an optical phase relationship between the signal light and the reference light and creates a noise component in a reproduction signal. For example, a fluctuation in optical path difference may include camming that occurs during rotation of an optical disk medium. Therefore, further creativeness is required. For example, solutions thereof are disclosed in Patent Literature 2 and Patent Literature 3.

FIG. 28 is a diagram showing a configuration of a conventional interferometric optical disk apparatus. In Patent Literature 2, in order to stabilize a difference in optical path lengths between signal light and reference light, a mirror drive unit 112 for adjusting an optical path length of the reference light is added to a reference light mirror 111 as shown in FIG. 28. Accordingly, control is performed so that maximum signal amplitude is always obtained in response to a fluctuation in the optical path length due to camming or the like during rotation of an optical disk medium 101 or to a change over time in the optical path length due to a variation in ambient environment such as temperature.

In addition, Patent Literature 3 describes a system in which a corner-cube prism is used as a reference light mirror, the corner-cube prism is mounted on a same actuator as an objective lens, and an optical path length of light to be interfered is adjusted according to an optical disk media type or a recording layer to be read. Furthermore, Patent Literature 4 describes a system for stably extracting a signal component regardless of phase fluctuation by respectively staggering a phase relationship between signal light and reference light by 90 degrees on four detectors.

A decline in the S/N of signal light limits progress toward realizing an apparatus with a high transmission rate and high density in the optical disk field. In a similar manner, a high S/N is also necessary in order to realize a high transmission rate in the optical communication field or the optical interface (optical bus or optical USB (universal serial bus)) field. Even in the optical communication field and the optical interface field, in order to achieve a high transmission rate at low power, systems that transmit data by modulating a phase of light generated by a laser is becoming mainstream in place of systems that transmit data by modulating laser intensity. Therefore, techniques that provide optical phase control for accurately controlling a phase of light on the receiving side in order to eliminate optical phase fluctuating factors that occur on a communication path are becoming important.

FIGS. 29 and 30 are diagrams for describing signal light modulation at an optical disk medium. FIG. 29 is a diagram for describing an example in which an intensity of signal light is modulated at an optical disk medium, and FIG. 30 is a diagram for describing an example in which a phase of signal light is modulated at an optical disk medium.

With a conventional optical disk medium 201, a variation in reflectance of a recording surface 201a such as that shown in FIG. 29 due to irradiation of laser light is mainly responsible for causing intensity of reflected light to be modulated and information to be recorded. In other words, information is recorded as a mark 201m and a space 201s with mutually different reflectances are formed on a track on the recording surface 201a. For example, the optical disk medium 201 is a rewritable or recordable CD, DVD, or Blu-ray Disc.

Optical interference can be used not only to detect light intensity but also to detect an optical phase. As shown in FIG. 30, by forming a groove 203g or a hole 203h at a position where light is reflected on a recording surface 203a, a phase of reflected light is modulated and information is recorded. In other words, information is recorded as a continuous groove 203g or a discrete hole 203h with varied transmittance or a varied refractive index is formed inside the recording surface 203a. When signal light is irradiated on the groove 203g or the hole 203h, due to a difference in a distance from incidence to the optical disk medium 203 to reaching a position of reflection, phase-modulated signal light is reflected.

When detecting a phase using optical interference, an average relative relationship between a phase of signal light to be detected and a phase of reference light to be interfered must be precisely controlled. If a constant relationship between an average phase of the signal light to be detected and a phase of the reference light to be interfered cannot be maintained, a detection sensitivity of a detected signal declines significantly. Therefore, controlling a phase relationship is extremely important for practical realization of this detecting system.

However, since the wavelength of light ranges from several μm to 400 nm and is extremely short, even a slight variation of an optical path length of reference light and an optical path length of signal light in the order of several ten nm can have a significant impact on signal detection sensitivity. This means that a difference between the optical path length of reference light and the optical path length of signal light must be kept constant at an accuracy of several ten nm. When a fluctuating factor exists on an optical path length, there is a problem that controlling the optical path length becomes extremely difficult. For example, in the case of an optical disk medium, an optical path length of signal light from the optical disk medium varies significantly within a range of around 200 μM due to an effect of undulation of a recording surface of the optical disk medium. Patent Literature 2 discloses a technique which attempts to avoid this effect by integrating an optical system and having the optical system follow an undulation of a recording surface of an optical disk medium while correcting gradual fluctuations with an actuator.

However, with the configuration according to Patent Literature 2, when the optical disk medium tilts and an angle of signal light changes, an optical path length of the signal light also changes. Tracking fluctuations in the optical path length at an accuracy of several ten nm by an actuator is extremely difficult and, in particular, fluctuations become totally uncontrollable at frequency bands that are higher than a certain level. Therefore, in order to put the technique described in Patent Literature 2 into practice, fluctuation due to undulation of a recording surface of an optical disk medium must be reduced to almost zero and the fluctuation had been a major obstacle toward practical realization.

In addition, Patent Literature 3 discloses a configuration in which a corner-cube prism is mounted on an actuator of an objective lens and an optical path of reference light is varied by a same amount as an optical path of signal light. The issue of undulation of the recording surface of an optical disk medium causing a fluctuation in the optical path length of reference light and the optical path length of signal light also applies to the configuration according to Patent Literature 3, making practical realization extremely difficult.

Since the frequency of light is extremely high, an optical phase cannot be directly detected using modern technology. Therefore, an optical phase cannot be detected by any other method than detecting an optical phase using optical interference between signal light and reference light. However, since the wavelength of light used in optical communication, an optical bus, or an optical disk medium ranges from several μm to 400 nm and is extremely short, the technique described above (a phase detection technique by reference light using optical interference) requires a technique that accurately controls average phases of reference light and signal light at several tenths of the wavelength of light. While fluctuating factors of optical phases of reference light and signal light differ among optical disk media, optical communication, and an optical bus, optical phase control in the order of nanometers is required in any case.

In addition, Patent Literature 4 does not specify reproduction of a phase-modulated optical disk medium. With the configuration described in Patent Literature 4, detecting only an intensity component of light results in removing a phase component that includes a signal component. Furthermore, in a case of obtaining an inverse of a tangent obtained from a cosine and a sine and detecting only a phase component of light instead of calculating a squared-sum after a differential operation, the detected optical phase component ends up including a noise component associated with a fluctuation in an optical path length and necessitates removal of the noise component.

FIG. 31 is a diagram for describing an example of calculating a phase component of light using an arc tangent. As shown in FIG. 31, a calculated value of an arc tangent that is an inverse of a tangent has a discontinuous portion in each $2\pi$ period. Therefore, when a range of optical path length fluctuation is significantly large compared to a range of phase modulation at extremely short wavelengths ranging from several μm to 400 nm, a phase noise component due to the optical path length fluctuation causes an arc tangent output phase to cross over to a discontinuous portion and prevents a correct output from being obtained.

CITATION LIST

Patent Literature

Patent Literature 1: Japanese Patent Application Laid-open No. H6-223433
Patent Literature 2: Japanese Patent Application Laid-open No. 2007-317284
Patent Literature 3: Japanese Patent Application Laid-open No. 2009-252337
Patent Literature 4: Japanese Patent Application Laid-open No. 2008-065961

SUMMARY OF THE INVENTION

The present invention has been made in order to solve the issues described above, and an object thereof is to provide a modulated signal detecting apparatus and a modulated signal detecting method capable of detecting a modulated signal with a high S/N ratio.

A modulated signal detecting apparatus according to an aspect of the present invention is a modulated signal detecting apparatus for detecting a modulated signal component from a signal based on a phase difference component between phase-modulated signal light and non-phase-modulated reference light, the modulated signal detecting apparatus comprising: a correcting unit which detects a phase difference error component included in the phase difference component and which corrects a first signal having the phase difference component as an angle of a cosine function and a second signal whose angle of the cosine function differs from that of the first signal by approximately π/2 based on the detected phase difference error component; and a phase operating unit which operates a phase difference component from the first signal and the second signal corrected by the correcting unit, wherein the correcting unit obtains the corrected first signal and the corrected second signal by rotating a coordinate point represented by the first signal and the second signal on a polar coordinate plane by an angle corresponding to the phase difference error component.

According to this configuration, the correcting unit detects a phase difference error component included in a phase difference component and, based on the detected phase difference error component, corrects a first signal having the phase difference component as an angle of a cosine function and a second signal whose angle of the cosine function differs from that of the first signal by approximately π/2. The phase operating unit operates a phase difference component from the first signal and the second signal corrected by the correcting unit. In addition, the correcting unit obtains the corrected first signal and the corrected second signal by rotating a coordinate point represented by the first signal and the second signal on a polar coordinate plane by an angle corresponding to the phase difference error component.

According to the present invention, a phase difference error component that is a phase noise component created by a fluctuation of optical path difference between phase-modulated signal light and non-phase-modulated reference light can be canceled from a phase difference component between the signal light and the reference light, and a modulated signal with a high S/N ratio can be detected.

The above and other objects, features, and advantages of the present invention will become more apparent in the following detailed description and the accompanying drawings.

DETAILED DESCRIPTION OF THE INVENTION

Hereinafter, embodiments of the present invention will be described with reference to the accompanying drawings. However, the following embodiments are merely embodied examples of the present invention and are not intended to limit the technical scope of the present invention.

First Embodiment

Figure 1:
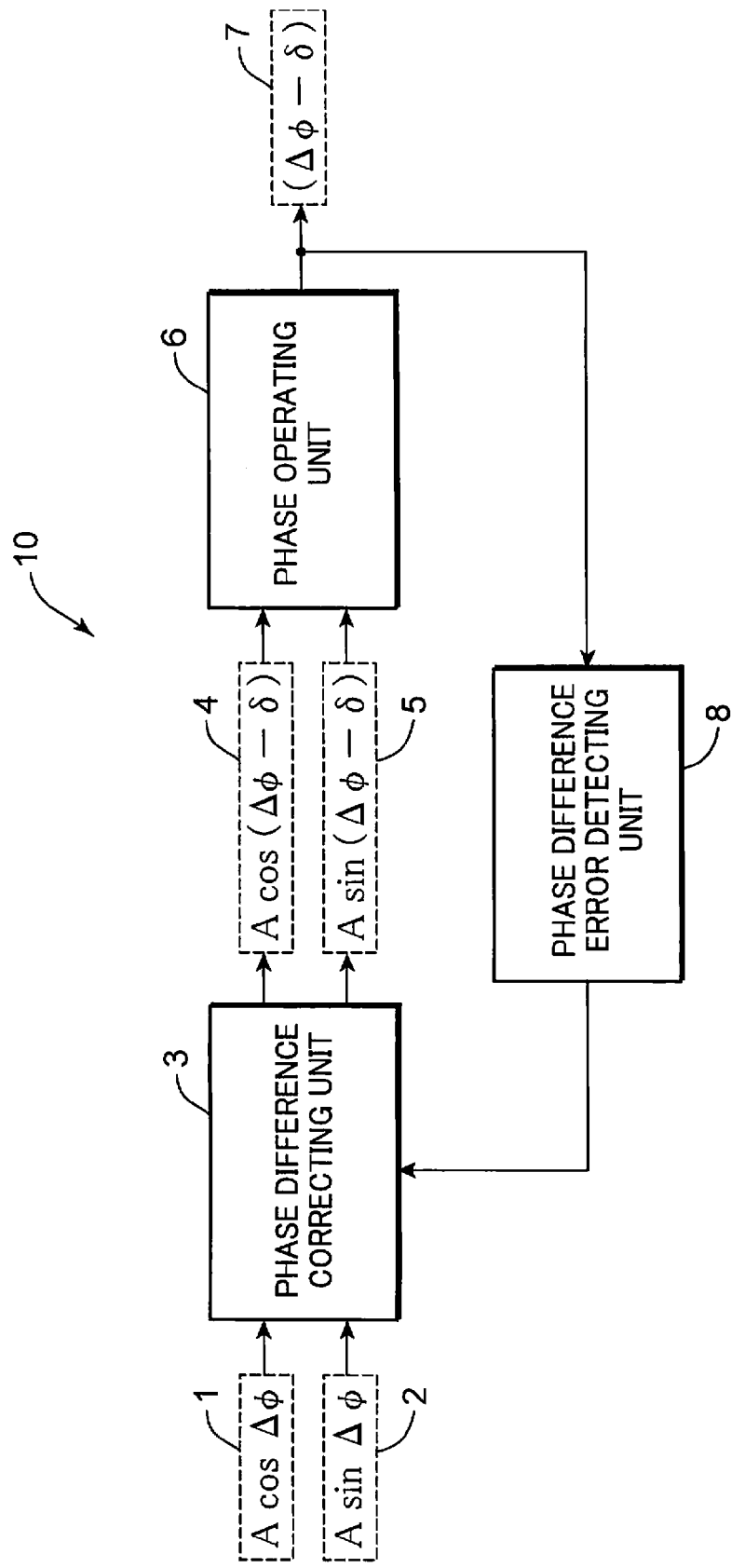
FIG. 1 is a diagram showing a configuration of a phase difference operating unit according to a first embodiment of the present invention.
Figure 2:
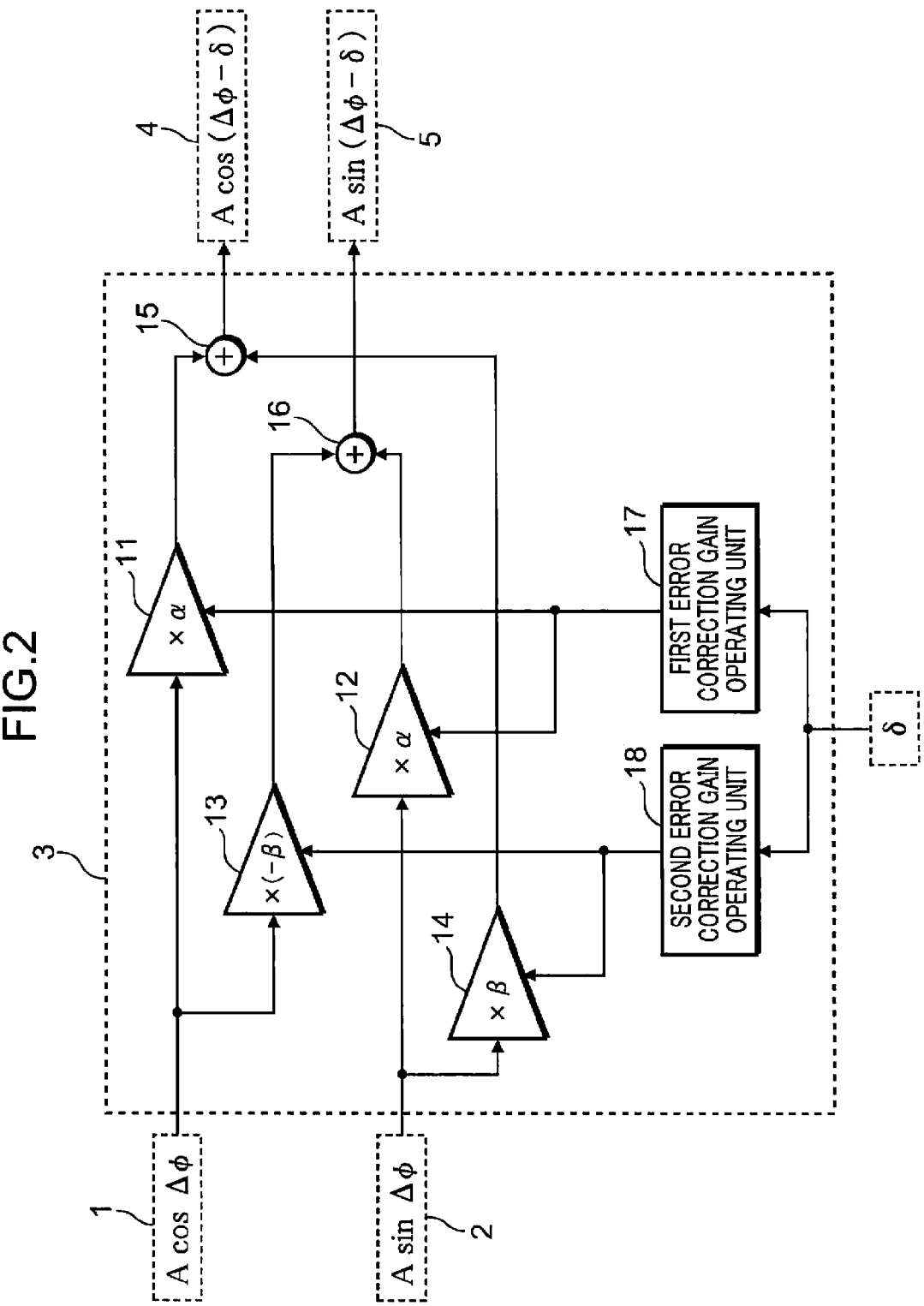
FIG. 2 is a diagram showing a configuration of a phase difference correcting unit according to the first embodiment of the present invention.
Figure 4:
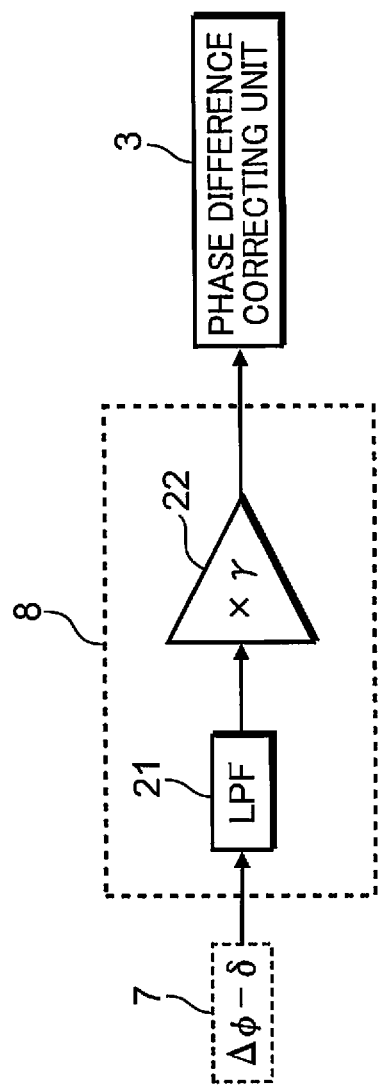
FIG. 4 is a diagram showing a configuration of a phase difference error detecting unit according to the first embodiment of the present invention.

FIGS. 1, 2, and 4 are schematic diagrams showing a configuration of a modulated signal detecting apparatus according to a first embodiment of the present invention. Hereinafter, the present first embodiment will be described in detail.

FIG. 1 is a diagram showing a configuration of a phase difference operating unit according to the first embodiment of the present invention. In FIG. 1, a phase difference operating unit 10 comprises a phase difference correcting unit 3, a phase operating unit 6, and a phase difference error detecting unit 8. A cosine component 1 and a sine component 2 are inputted to the phase difference correcting unit 3. The cosine component 1 has a phase difference (an optical path difference) $\Delta\phi$ between reference light and signal light. The sine component 2 has an amplitude that is approximately equal to that of the cosine component 1 and a phase difference of approximately $\pi/2$ from the cosine component 1.

In this case, a deviation in phase difference between the cosine component 1 and the sine component 2 is set to an approximately $\pi/2$ phase difference in consideration of accuracy, variation, and the like of optical elements. Generally, an optical element such as a wavelength plate, a polarizer, and a beam splitter is used to detect a signal of the cosine component 1 and a signal of the sine component 2 having the phase difference component $\Delta\phi$ between signal light and reference light as a phase term. For example, a $\lambda/2$ plate does not always create a phase difference of $\lambda/2$ and may sometimes create a phase difference of $(\lambda/2)+\Delta\lambda$. In this case, the cosine component 1 is expressed as $\cos(\Delta\phi+\Delta\theta_1)$ and the sine component 2 is expressed as $\sin(\Delta\phi+\Delta\theta_2)$.

According to such an ideal phase difference deviation $\pi/2$ between the cosine component 1 and the sine component 2, a phase difference deviation $(\Delta\theta_1-\Delta\theta_2)$ that is added due to accuracy or variation of an optical element can produce an operational effect of the present invention in a range where S/N of a reproduction signal is allowed. For example, when a signal is modulated in a range of $\pm\pi$ to four values ($-\pi<\Delta\phi\leq-\pi/2$, $-\pi/2<\Delta\phi\leq0$, $0<\Delta\phi\leq\pi/2$, and $\pi/2<\Delta\phi\leq\pi$), if there is absolutely no phase noise component created by a fluctuation of optical path difference or the like, a phase difference deviation that is added due to accuracy or variation of an optical element is allowable within a range of $\pm\pi/4$. The present first embodiment will be described on the assumption that a deviation in phase difference between the cosine component 1 and the sine component 2 is approximately $\pi/2$, an S/N of a reproduction signal is within an allowable range, and a degree of accuracy or variation of an optical element does not pose an issue.

The phase difference correcting unit 3 uses a phase difference error component $\delta$ outputted from the phase difference error detecting unit 8 to generate a phase difference-corrected cosine component 4 and a phase difference-corrected sine component 5. The generated phase difference-corrected cosine component 4 and phase difference-corrected sine component 5 are inputted to the phase operating unit 6. The phase operating unit 6 outputs a phase difference component 7. The phase difference error detecting unit 8 performs feedback control for generating the phase difference error component $\delta$ based on the outputted phase difference component 7.

In other words, the phase difference error detecting unit 8 detects a phase difference error component included in a phase difference component $\Delta\phi$. Based on the phase difference error component detected by the phase difference error detecting unit 8, the phase difference correcting unit 3 corrects a first signal (the cosine component 1) having the phase difference component $\Delta\phi$ as an angle of a cosine function and a second signal (the sine component 2) whose angle of the cosine function differs from that of the first signal by approximately $\pi/2$. The phase operating unit 6 operates a modulated signal component from the corrected first signal (the phase difference-corrected cosine component 4) and the corrected second signal (the phase difference-corrected sine component 5) which have been corrected by the phase difference correcting unit 3. In addition, the phase difference error detecting unit 8 detects a phase difference error component from the phase difference component operated by the phase operating unit 6.

In this case, the phase difference component $\Delta\phi$ includes both a signal component $\phi_{sig}$ of phase-modulated signal light and a phase noise component $\phi_{noise}$ created by a fluctuation of optical path difference between the signal light and reference light. The phase difference component $\Delta\phi$ is represented by Expression (1) below.

$$\Delta\phi = \phi_{sig} + \phi_{noise} \quad (1)$$

Here, if $\lambda$ denotes a wavelength of light and $\Delta L$ denotes a fluctuation of optical path difference that may cause a phase noise, then the phase noise component $\phi_{noise}$ is represented by Expression (2) below.

$$\phi_{noise} = 2\pi(\Delta L/\lambda) \quad (2)$$

The wavelength of light $\lambda$ ranges from several μm to 400 nm and is extremely short, and the fluctuation of optical path difference $\Delta L$ due to an undulation of a recording surface of an optical disk medium or the like is around several hundred μm and is extremely large. For example, if light with a wavelength of 400 nm is used, a range of the signal component $\phi_{sig}$ is equivalent to one wavelength ($2\pi$), and an amplitude of the undulation of the recording surface is 200 μm, then the phase noise component $\phi_{noise}$ has a range of $500\pi$. Accordingly, we find that the phase noise component $\phi_{noise}$ has an extremely large value compared to the signal component $\phi_{sig}$. Since the phase noise component $\phi_{noise}$ is extremely large, when the cosine component 1 no (the first signal $X_1$) and the sine component 2 (the second signal $X_2$) are directly inputted to the phase operating unit 6, the phase difference component $\Delta\phi$ ends up exceeding a discontinuous portion of a $2\pi$ period of an arc tangent operation by the phase operating unit 6 and a phase calculated by the arc tangent operation becomes discontinuous. In consideration thereof, the phase difference correcting unit 3 corrects a phase difference so that the phase difference component $\Delta\phi$ does not exceed a discontinuous portion of a $2\pi$ period of an arc tangent operation.

Next, the phase difference correcting unit 3 will be described with reference to FIG. 2. FIG. 2 is a diagram showing a configuration of a phase difference correcting unit according to the first embodiment of the present invention. The phase difference correcting unit 3 comprises amplifiers 11, 12, 13, and 14, addition operating units 15 and 16, a first error correction gain operating unit 17, and a second error correction gain operating unit 18. The cosine component 1 inputted to the phase difference correcting unit 3 is inputted to the amplifier 11 and the amplifier 13. The amplifier 11 multiplies the cosine component 1 by $\alpha$ and the amplifier 13 multiplies the cosine component 1 by $-\beta$. The sine component 2 inputted to the phase difference correcting unit 3 is inputted to the amplifier 12 and the amplifier 14. The amplifier 12 multiplies the sine component 2 by $\alpha$ and the amplifier 14 multiplies the sine component 2 by $\beta$.

In this case, the first error correction gain operating unit 17 calculates an error correction gain $\alpha$ according to Expression (3) below using a phase difference error component 8 detected by the phase difference error detecting unit 8. The second error correction gain operating unit 18 calculates an error correction gain $\beta$ according to Expression (4) below using the phase difference error component 8 detected by the phase difference error detecting unit 8.

$$\alpha = \cos \delta \quad (3)$$

$$\beta = \sin \delta \quad (4)$$

The addition operating unit 15 adds up the cosine component 1 multiplied by α and the sine component 2 multiplied by β. Accordingly, the addition operating unit 15 outputs the phase difference-corrected cosine component 4 represented by Expression (5) below.

$$\alpha X_1 + \beta X_2 = \alpha A \cos \Delta\phi + \beta A \sin \Delta\phi = A \cos(\Delta\phi - \delta) \quad (5)$$

The addition operating unit 16 adds up the sine component 2 multiplied by α and the cosine component 1 multiplied by −β. Accordingly, the addition operating unit 16 outputs the phase difference-corrected sine component 5 represented by Expression (6) below.

$$\alpha X_2 - \beta X_1 = \alpha A \sin \Delta\phi - \beta A \cos \Delta\phi = A \sin(\Delta\phi - \delta) \quad (6)$$

Expressions (5) and (6) show that, by multiplying the cosine component 1 and the sine component 2 by gains respectively operated based on the phase difference error component 6 and adding up the multiplied cosine component 1 and the multiplied sine component 2, the phase difference-corrected cosine component 4 (a first phase difference-corrected signal $Y_1$) and the phase difference-corrected sine component 5 (a second phase difference-corrected signal $Y_2$) in which the phase difference error component δ has been removed from the phase difference component Δφ can be obtained.

Figure 3:
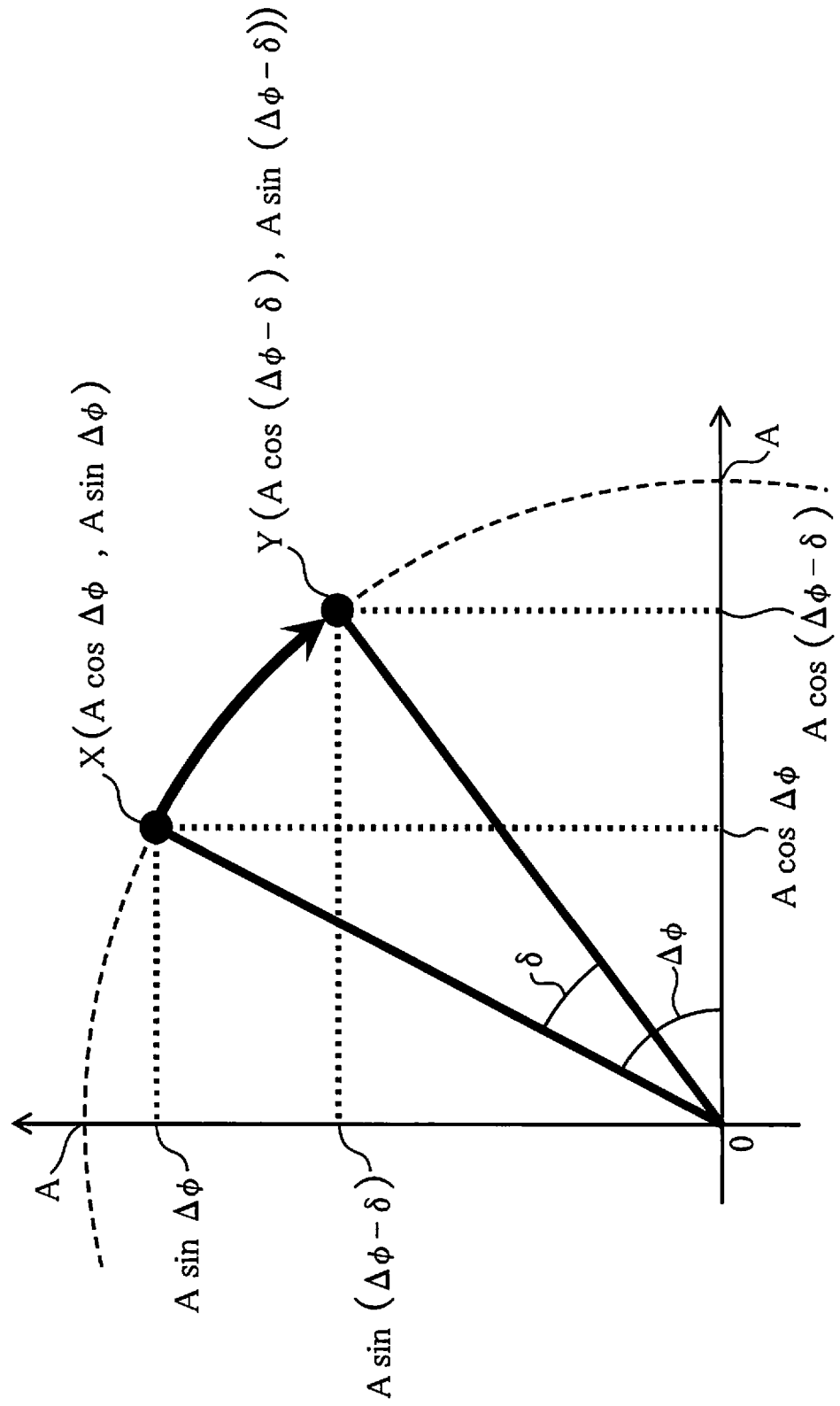
FIG. 3 is a diagram for describing phase difference correction on a polar coordinate plane in the first embodiment of the present invention.

The phase difference correction described above will be further described using a polar coordinate plane shown in FIG. 3. FIG. 3 is a diagram for describing phase difference correction on a polar coordinate plane in the first embodiment of the present invention.

X denotes a coordinate point represented by the cosine component 1 (a first signal $X_1$) and the sine component 2 (a second signal $X_2$) and Y denotes a coordinate point represented by the phase difference-corrected cosine component 4 (the first phase difference-corrected signal $Y_1$) and the phase difference-corrected sine component 5 (the second phase difference-corrected signal $Y_2$). The coordinate point Y is a coordinate obtained by rotating the coordinate point X by an angle corresponding to the phase difference error component 8 on the polar coordinate plane.

In other words, the phase difference correcting unit 3 obtains the first phase difference-corrected signal $Y_1$ and the second phase difference-corrected signal $Y_2$ by rotating a coordinate point represented by the first signal $X_1$ and the second signal $X_2$ on a polar coordinate plane by an angle corresponding to the phase difference error component δ. The phase difference correcting unit 3 generates the first error correction gain α and the second error correction gain β based on the detected phase difference error component δ and generates the first phase difference-corrected signal $Y_1$ and the second phase difference-corrected signal $Y_2$ representing the corrected first signal $X_1$ and the corrected second signal $X_2$ based on Expressions (5) and (6) above. The phase operating unit 6 then operates a phase difference component from the first phase difference-corrected signal $Y_1$ and the second phase difference-corrected signal $Y_2$.

Next, the phase operating unit 6 will be described. The phase operating unit 6 operates the phase difference component 7 according to Expression (7) below based on the inputted phase difference-corrected cosine component 4 and phase difference-corrected sine component 5.

$$\arctan\{A\sin(\Delta\phi-\delta)/A\cos(\Delta\phi-\delta)\} = \Delta\phi - \delta \quad (7)$$

Next, the phase difference error detecting unit 8 will be described with reference to FIG. 4. FIG. 4 is a diagram showing a configuration of a phase difference error detecting unit according to the first embodiment of the present invention. In FIG. 4, the phase difference error detecting unit 8 comprises a low-pass filter (LPF) 21 and an amplifier 22. The phase difference component 7 operated by the phase operating unit 6 is inputted to the phase difference error detecting unit 8. The LPF 21 outputs a phase noise component $\phi_{noise}$ that is a component of a lower frequency band than the signal component $\phi_{sig}$ from the phase difference component 7 inputted to the phase difference error detecting unit 8. Alternatively, the LPF 21 outputs a difference between the phase noise component $\phi_{noise}$ and the phase difference error component 6.

In other words, the LPF 21 extracts a frequency band corresponding to the phase difference error component from the phase difference component. In addition, from the phase difference component, the LPF 21 extracts a frequency band corresponding to a phase difference error component that is lower than a frequency band corresponding to a modulated signal component included in the phase difference component.

The amplifier 22 multiplies the phase difference error component outputted from the LPF 21 by γ and outputs the phase difference error component multiplied by γ to the phase difference correcting unit 3. In this case, if H denotes a transfer function of the phase difference error detecting unit 8, the gain value γ is set to an arbitrary value within a range where a closed-loop characteristic 1/(1+H) constituted by the phase difference correcting unit 3, the phase operating unit 6, and the phase difference error detecting unit 8 shown in FIG. 1 is stable.

According to this configuration, the phase difference correcting unit 3 can perform control such that in Expression (8) below, a second term on a right hand-side ($\phi_{noise}$) is canceled by a third term on the right hand-side (δ). As a result, reproduction of a modulated signal can be performed in which discontinuity of an arc tangent operation does not occur regardless of a range of the phase noise component $\phi_{noise}$ that is significantly larger than the signal component $\phi_{sig}$.

$$\Delta\phi = \phi_{sig} + \phi_{noise} - \delta \quad (8)$$

In addition, the phase difference error detecting unit 8 according to the present first embodiment is capable of continuously detecting fluctuations from minute fluctuations in the nanometer order and within a range of ±π to large fluctuations in the micrometer order and within a range of ± several hundred π. Therefore, even a phase noise component in the nanometer order which is extremely difficult to track with an actuator can be suppressed and high S/N reproduction can be achieved.

Moreover, in the present first embodiment, the phase difference correcting unit 3 and the phase difference error detecting unit 8 correspond to an example of the correcting unit, the phase operating unit 6 corresponds to an example of the phase operating unit, the LPF 21 corresponds to an example of the low-pass filter, the phase difference error detecting unit 8 corresponds to an example of the phase difference error detecting unit, and the phase difference correcting unit 3 corresponds to an example of the phase difference correcting unit.

In addition, while the phase difference correcting unit 3 has been described with reference to FIG. 2 in the present first embodiment, the present invention is not limited thereto. Any configuration may be adopted as long as a cosine component and a sine component having a phase difference component Δϕ that includes a signal component and a phase noise components are corrected using a phase difference error component δ to a phase difference-corrected cosine component and a phase difference-corrected sine component. For example, the first error correction gain operating unit 17 and the second error correction gain operating unit 18 shown in FIG. 2 may determine the error correction gains α and β using a look-up table or the like instead of using Expressions (3) and (4) described above.

Furthermore, while the cosine component 1 is multiplied by −β by the amplifier 13 and the cosine component 1 multiplied by −β and the sine component 2 multiplied by α are added up by the addition operating unit 16 in the phase difference correcting unit 3 shown in FIG. 2, alternatively, the cosine component 1 may be multiplied by β by the amplifier 13 and the cosine component 1 multiplied by β may be subtracted from the sine component 2 multiplied by a by the addition operating unit 16. In this case, a similar operational effect to that of the present first embodiment may be obtained.

Figure 5:
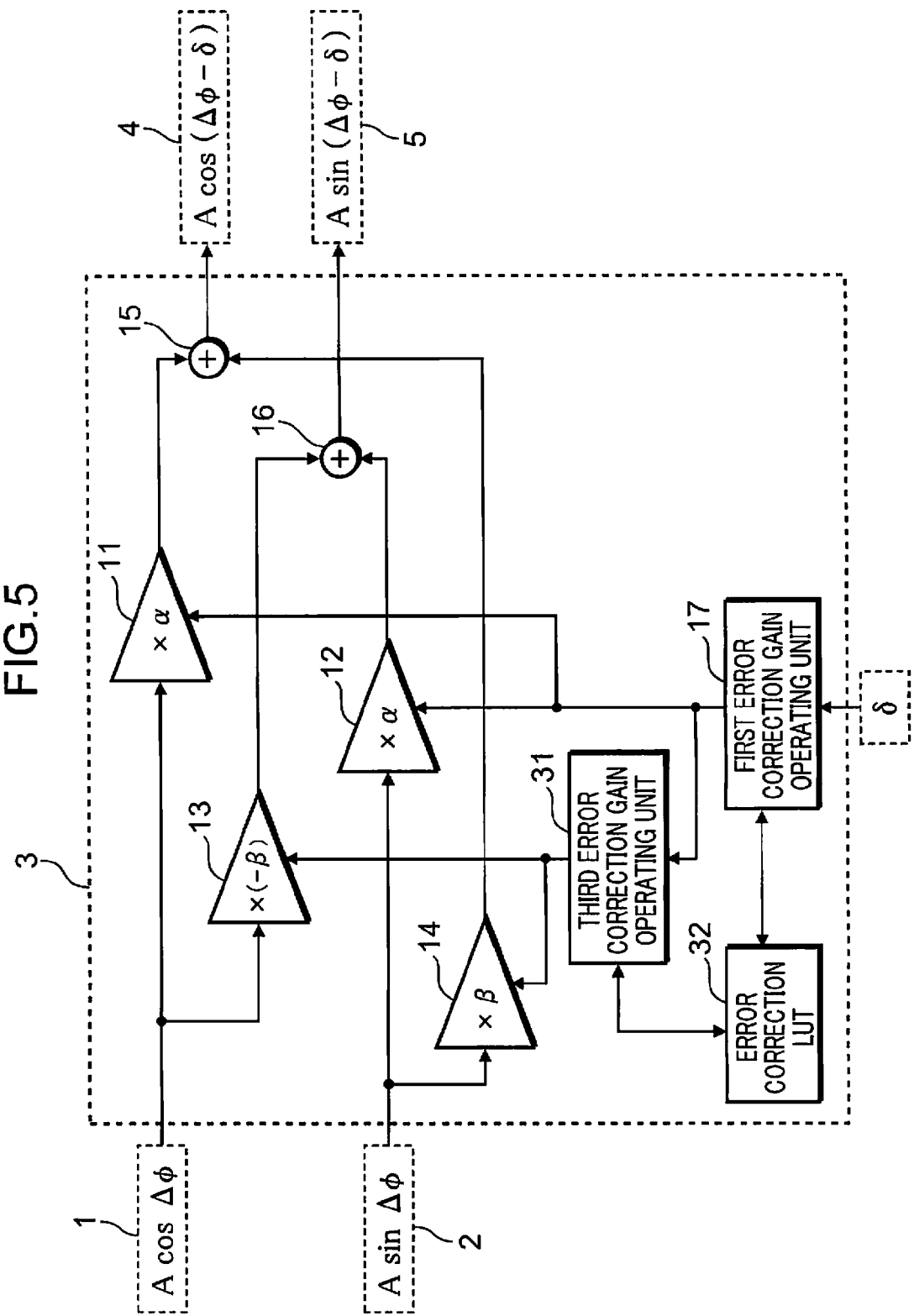
FIG. 5 is a diagram showing a configuration of a phase difference correcting unit according to a first modification of the first embodiment of the present invention.

In addition, FIG. 5 is a diagram showing a configuration of a phase difference correcting unit according to a first modification of the present first embodiment. As shown in FIG. 5, a phase difference correcting unit 3 comprises amplifiers 11, 12, 13, and 14, addition operating units 15 and 16, a first error correction gain operating unit 17, a third error correction gain operating unit 31, and an error correction look-up table (LUT) 32.

The first error correction gain operating unit 17 refers to the error correction look-up table (LUT) 32 and operates an error correction gain α from a phase difference error component δ. The first error correction gain operating unit 17 outputs the operated error correction gain α to the amplifiers 11 and 12 and the third error correction gain operating unit 31. The third error correction gain operating unit 31 refers to the error correction LUT 32 and operates a value whose phase is shifted by π/2 as an error correction gain β from the inputted error correction gain α. The third error correction gain operating unit 31 outputs the operated error correction gain β to the amplifiers 13 and 14. In this case, a similar operational effect to that of the present first embodiment may be obtained.

Figure 6:
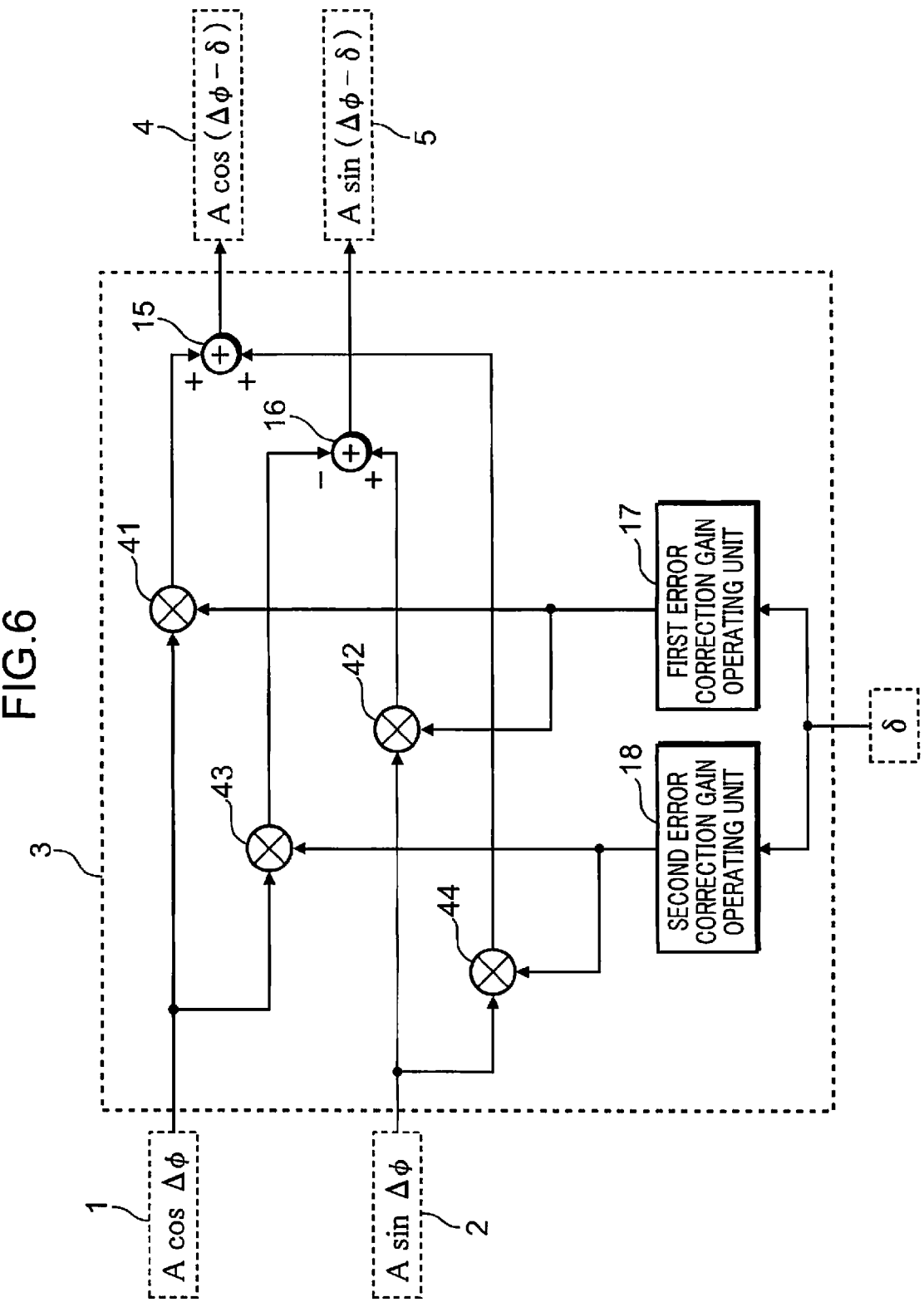
FIG. 6 is a diagram showing a configuration of a phase difference correcting unit according to a second modification of the first embodiment of the present invention.

Furthermore, FIG. 6 is a diagram showing a configuration of a phase difference correcting unit according to a second modification of the present first embodiment. As shown in FIG. 6, a phase difference correcting unit 3 comprises multiplying units 41, 42, 43, and 44, addition operating units 15 and 16, a first error correction gain operating unit 17, and a second error correction gain operating unit 18. A cosine component 1 and a sine component 2 are A/D-converted digital data. In this case, as shown in FIG. 6, the multiplying unit 41 may multiply the cosine component 1 by an error correction gain α, the multiplying unit 42 may multiply the sine component 2 by the error correction gain α, the multiplying unit 43 may multiply the cosine component 1 by an error correction gain β, and the multiplying unit 44 may multiply the sine component 2 by the error correction gain β.

Moreover, while the phase operating unit 6 generates the phase difference component 7 using Expression (7) above in the present first embodiment, the present invention is not limited thereto. For example, the phase operating unit 6 may comprise a look-up table that retains, in advance, the phase difference component 7 obtained as a result of an arc tangent operation. The phase operating unit 6 may transform a phase difference-corrected cosine component 4 and a phase difference-corrected sine component 5 into a phase difference component 7 using the look-up table. In addition, the phase operating unit 6 may operate the phase difference component 7 by performing branching as represented by Expression (9) or (10) below.

$$\Delta\phi - \delta = \begin{cases} \arctan\left\{\frac{A\sin(\Delta\phi - \delta)}{A\cos(\Delta\phi - \delta)}\right\} & (\text{when } \cos(\Delta\phi - \delta) \geq 0) \\ \arctan\left\{\frac{A\cos(\Delta\phi - \delta)}{A\sin(\Delta\phi - \delta)}\right\} + \pi & (\text{when } \cos(\Delta\phi - \delta) < 0) \end{cases} \quad (9)$$

$$\Delta\phi - \delta = \begin{cases} \arctan\left\{\frac{A\sin(\Delta\phi - \delta)}{A\cos(\Delta\phi - \delta)}\right\} & \begin{pmatrix} \text{when } \cos(\Delta\phi - \delta) \geq \\ \sin(\Delta\phi - \delta) \text{ and} \\ \cos(\Delta\phi - \delta) \geq \\ -\sin(\Delta\phi - \delta) \end{pmatrix} \\ \arctan\left\{-\frac{A\cos(\Delta\phi - \delta)}{A\sin(\Delta\phi - \delta)}\right\} - \frac{\pi}{2} & \begin{pmatrix} \text{when } \cos(\Delta\phi - \delta) \geq \\ \sin(\Delta\phi - \delta) \text{ and} \\ \cos(\Delta\phi - \delta) < \\ -\sin(\Delta\phi - \delta) \end{pmatrix} \\ \arctan\left\{-\frac{A\cos(\Delta\phi - \delta)}{A\sin(\Delta\phi - \delta)}\right\} + \frac{\pi}{2} & \begin{pmatrix} \text{when } \cos(\Delta\phi - \delta) < \\ \sin(\Delta\phi - \delta) \text{ and} \\ \cos(\Delta\phi - \delta) \geq \\ -\sin(\Delta\phi - \delta) \end{pmatrix} \\ \arctan\left\{\frac{A\sin(\Delta\phi - \delta)}{A\cos(\Delta\phi - \delta)}\right\} + \pi & \begin{pmatrix} \text{when } \cos(\Delta\phi - \delta) < \\ \sin(\Delta\phi - \delta) \text{ and} \\ \cos(\Delta\phi - \delta) < \\ -\sin(\Delta\phi - \delta) \text{ and} \\ \sin(\Delta\phi - \delta) \geq 0 \end{pmatrix} \\ \arctan\left\{\frac{A\sin(\Delta\phi - \delta)}{A\cos(\Delta\phi - \delta)}\right\} - \pi & \begin{pmatrix} \text{when } \cos(\Delta\phi - \delta) < \\ \sin(\Delta\phi - \delta) \text{ and} \\ \cos(\Delta\phi - \delta) < \\ -\sin(\Delta\phi - \delta) \text{ and} \\ \sin(\Delta\phi - \delta) < 0 \end{pmatrix} \end{cases} \quad (10)$$

Moreover, while the phase difference error detecting unit 8 has been described with reference to FIG. 4 in the present first embodiment, the present invention is not limited thereto. The phase difference error detecting unit 8 may adopt any configuration as long as a closed-loop characteristic constituted by the phase difference correcting unit 3, the phase operating unit 6, and the phase difference error detecting unit 8 shown in FIG. 1 is stable and control can be performed such that, in Expression (8) above, the second term on the right hand-side ($\phi_{noise}$) is canceled by the third term on the right hand-side (δ). For example, the LPF 21 may be a primary LPF or a secondary or higher-order LPF. When the LPF 21 is a secondary or higher-order LPF, the phase difference error detecting unit 8 may comprise a phase compensating unit in order to stabilize the closed-loop characteristic. Alternatively, the phase difference error detecting unit 8 may comprise an integrator in place of the LPF 21.

Figure 7:
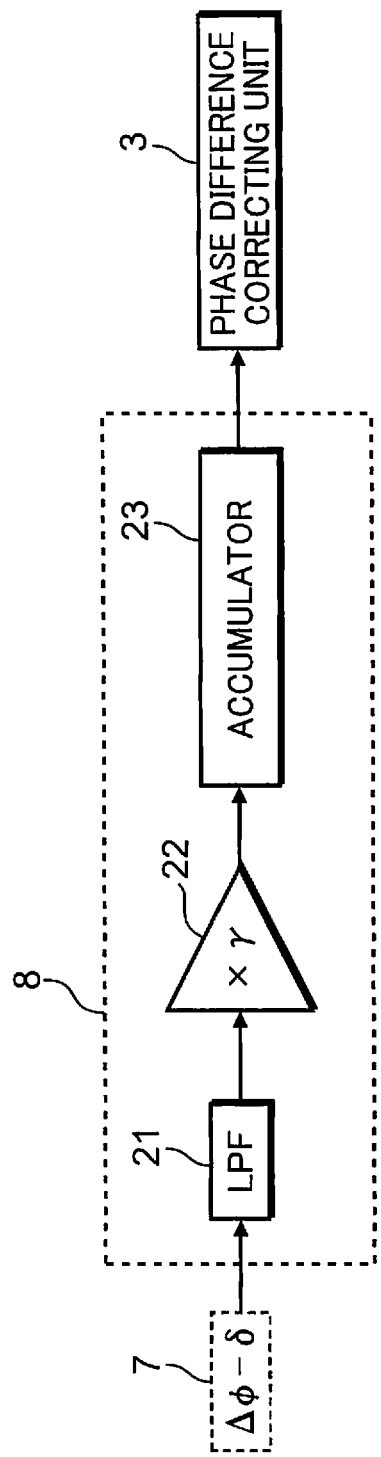
FIG. 7 is a diagram showing a configuration of a phase difference error detecting unit according to a third modification of the first embodiment of the present invention.

Furthermore, FIG. 7 is a diagram showing a configuration of a phase difference error detecting unit according to a third modification of the present first embodiment. As shown in FIG. 7, a phase difference error detecting unit 8 comprises an LPF 21, an amplifier 22, and an accumulator 23. The accumulator 23 cumulates output from the amplifier 22 and outputs a cumulated value to a phase difference correcting unit 3. In other words, the phase difference error detecting unit 8 multiplies a phase difference error component by a predetermined factor γ, and cumulates the phase difference error component multiplied by γ. In addition, the phase difference correcting unit 3 generates a first error correction gain α and a second error correction gain β based on the cumulated phase difference error component. Even in this case, a similar operational effect to that of the present first embodiment may be obtained.

Moreover, while a noise component other than a signal component is separated by the LPF 21 of the phase difference error detecting unit 8 in the present first embodiment, the present invention is not limited thereto. The phase difference error detecting unit 8 may adopt any configuration as long as a noise component other than a signal component can be separated. For example, the phase difference error detecting unit 8 may comprise a band elimination filter (BEF), a band-pass filter (BPF), or a high-pass filter (HPF) capable of removing a frequency band of a signal component. In addition, the phase difference error detecting unit 8 may separate a noise component other than a signal component by transforming a time domain signal into a frequency domain signal using Fourier transform and dividing a band by frequency domains.

Furthermore, while camming of a recording surface of an optical disk medium has been described in the present first embodiment as an example of a fluctuating factor due to disturbance, a fluctuation component in a lower frequency band than a modulated signal due to a fluctuation factor such as a temperature variation can also be canceled with the configuration of the present first embodiment.

In addition, in the present first embodiment, a configuration may be adopted in which the phase difference correcting unit 3, the phase operating unit 6, and the phase difference error detecting unit 8 are integrated on a single LSI (Large Scale Integration).

Figure 8:
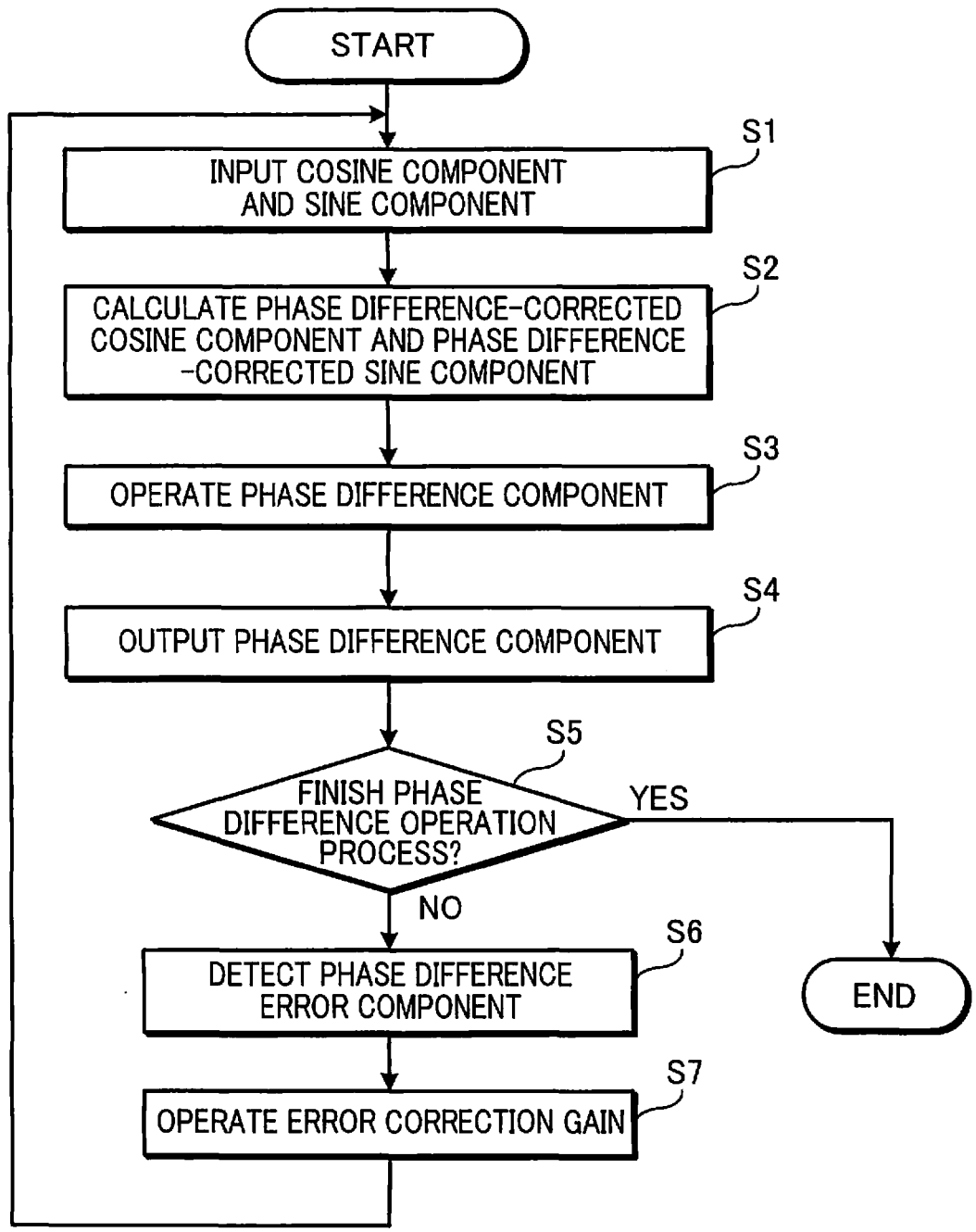
FIG. 8 is a flow chart showing an example of a phase difference operation process by the phase difference operating unit shown in FIG. 1.

Furthermore, in the present first embodiment, functions of the phase difference correcting unit 3, the phase operating unit 6, and the phase difference error detecting unit 8 may be realized by a computer-executable program and a computer. FIG. 8 is a flow chart showing an example of a phase difference operation process by the phase difference operating unit shown in FIG. 1. For example, a program of the phase difference correcting unit 3, the phase operating unit 6, and the phase difference error detecting unit 8 is represented by a flow chart shown in FIG. 8.

First, in step S1, the phase difference correcting unit 3 receives input of a cosine component 1 (A cos $\Delta\phi$) and a sine component 2 (A sin $\Delta\phi$).

Next, in step S2, the phase difference correcting unit 3 adds up a value obtained by multiplying the cosine component 1 by an error correction gain $\alpha$ and a value obtained by multiplying the sine component 2 by an error correction gain 13 to calculate a phase difference-corrected cosine component 4 (A cos ($\Delta\phi-\delta$)), and subtracts a value obtained by multiplying the sine component 2 by the error correction gain $\alpha$ from a value obtained by multiplying the cosine component 1 by the error correction gain $\beta$ to calculate a phase difference-corrected sine component 5 (A sin($\Delta\phi-\delta$)).

In step S3, the phase operating unit 6 operates a phase difference component 7 ($\Delta\phi-\delta$) by operating an arc tangent of a value obtained by dividing the phase difference-corrected sine component 5 by the phase difference-corrected cosine component 4.

In step S4, the phase operating unit 6 outputs the operated phase difference component 7 as a modulated signal to the outside of the phase difference operating unit 10 and, at the same time, outputs the operated phase difference component 7 to the phase difference error detecting unit 8.

In step S5, a control unit determines whether or not to finish the phase difference operation process. The control unit is provided inside or outside the phase difference operating unit 10. In step S5, when it is determined that the phase difference operation process is to be finished (YES in step S5), the phase difference operation process is finished.

On the other hand, when it is determined that the phase difference operation process is not to be finished (NO in step S5), in step S6, the phase difference error detecting unit 8 detects a phase difference error component 6 from the phase difference component 7 operated by the phase operating unit 6. For example, the phase difference error detecting unit 8 detects the phase difference error component 6 according to the expression $\delta=\gamma\int(\Delta\phi-\delta)d\phi$.

In step S7, the first error correction gain operating unit 17 calculates the error correction gain $\alpha$ according to Expression (3) above using the phase difference error component $\delta$ detected by the phase difference error detecting unit 8, and the second error correction gain operating unit 18 calculates the error correction gain $\beta$ according to Expression (4) above using the phase difference error component $\delta$ detected by the phase difference error detecting unit 8. Subsequently, a return is made to step S1 and input of the cosine component 1 (A cos $\Delta\phi$) and the sine component 2 (A sin $\Delta\phi$) is received.

Second Embodiment

Figure 9:
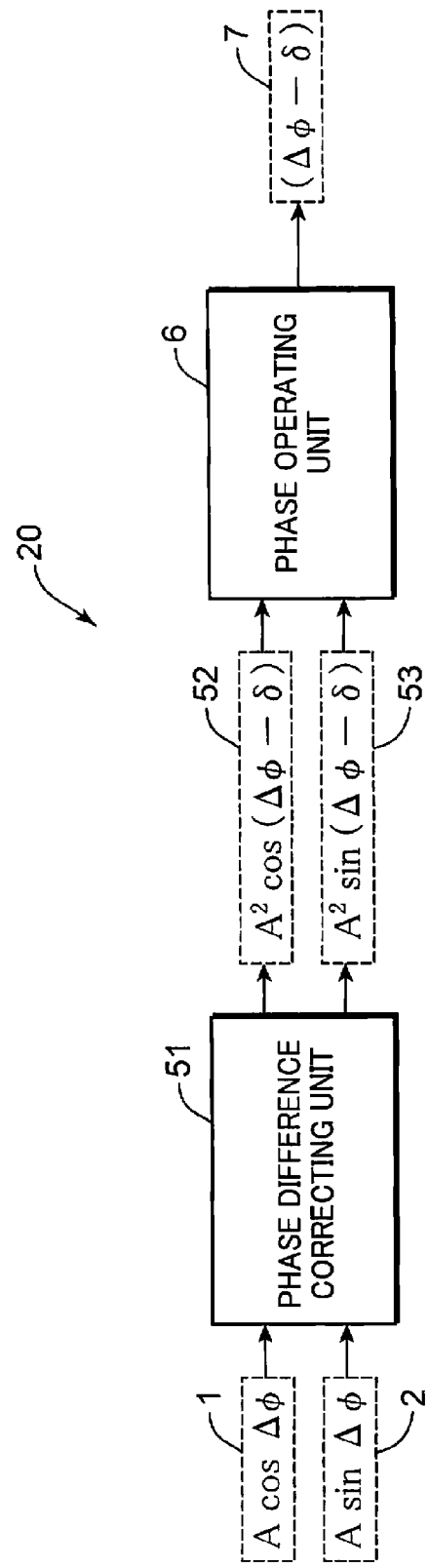
FIG. 9 is a diagram showing a configuration of a phase difference operating unit according to a second embodiment of the present invention.
Figure 10:
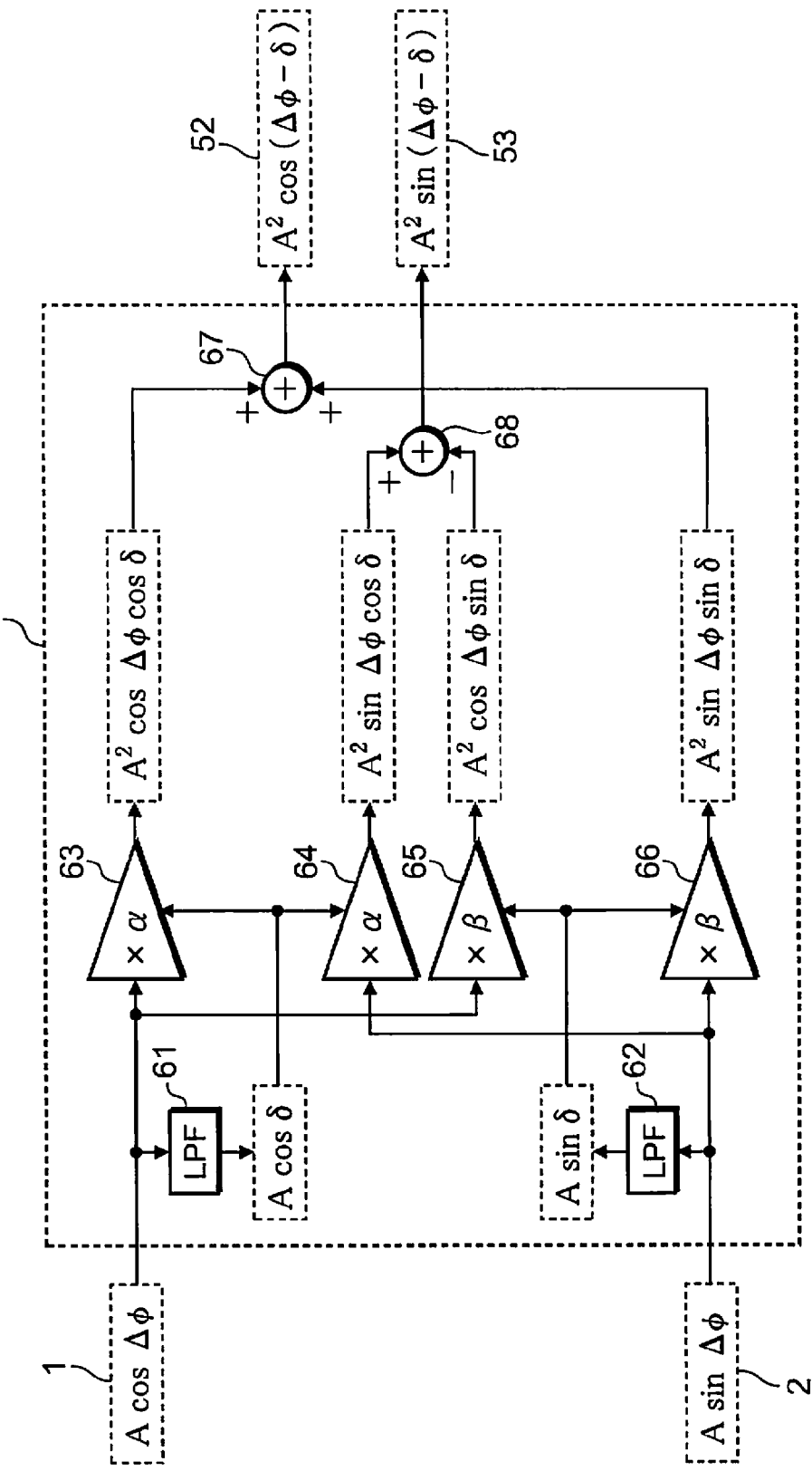
FIG. 10 is a diagram showing a configuration of a phase difference correcting unit according to the second embodiment of the present invention.

FIGS. 9 and 10 are schematic diagrams showing a configuration of a modulated signal detecting apparatus according to a second embodiment of the present invention. Hereinafter, the present second embodiment will be described in detail.

In FIGS. 9 and 10, same components as those shown in FIGS. 1 and 2 are denoted by same reference numerals and descriptions thereof will be omitted.

FIG. 9 is a diagram showing a configuration of a phase difference operating unit according to the second embodiment of the present invention. In FIG. 9, a phase difference operating unit 20 comprises a phase difference correcting unit 51 and a phase operating unit 6. A cosine component 1 and a sine component 2 are inputted to the phase difference correcting unit 51. The cosine component 1 has a phase difference (an optical path difference) $\Delta\phi$ between reference light and signal light. The sine component 2 has an amplitude that is approximately equal to that of the cosine component 1 and a phase difference of approximately $\pi/2$ from the cosine component 1. The phase difference correcting unit 51 uses a phase difference error component $\delta$ to generate a phase difference-corrected cosine component 52 and a phase difference-corrected sine component 53. The generated phase difference-corrected cosine component 52 and phase difference-corrected sine component 53 are inputted to a phase operating unit 6. The phase operating unit 6 outputs a phase difference component 7.

Next, the phase difference correcting unit 51 will be described with reference to FIG. 10. FIG. 10 is a diagram showing a configuration of a phase difference correcting unit according to the second embodiment of the present invention. The phase difference correcting unit 51 comprises LPFs 61 and 62, amplifiers 63, 64, 65, and 66, and addition operating units 67 and 68. The LPF 61 generates a signal according to a phase noise component $\phi_{noise}$ other than a signal component $\phi_{sig}$ from the cosine component 1 inputted to the phase difference correcting unit 51, and outputs the generated signal. In addition, the LPF 62 generates a signal according to a phase noise component $\phi_{noise}$ other than a signal component $\phi_{sig}$ from the sine component 2 inputted to the phase difference correcting unit 51, and outputs the generated signal.

In this case, if the LPF 61 and the LPF 62 are capable of ideally dividing a frequency band of the signal component $\phi_{sig}$ from a frequency band of the phase noise component $\phi_{noise}$, then Expression (11) is true. Therefore, the phase noise component $\phi_{noise}$ itself can be handled as the phase difference error component 8 and the phase noise component $\phi_{noise}$ can be suppressed.

$$\delta = \phi_{noise} \tag{11}$$

A signal according to the phase noise component $\phi_{noise}$ generated by the LPF 61 becomes an error correction gain $\alpha$ of the amplifiers 63 and 64, and a signal according to the phase noise component $\phi_{noise}$ generated by the LPF 62 becomes an error correction gain $\beta$ of the amplifiers 65 and 66. The error correction gain $\alpha$ and the error correction gain $\beta$ are represented by Expressions (12) and (13) below.

$$\alpha = A \cos \delta \tag{12}$$

$$\beta = A \sin \delta \tag{13}$$

The amplifier 63 multiplies the cosine component 1 by $\alpha$, the amplifier 64 multiplies the sine component 2 by $\alpha$, the amplifier 65 multiplies the cosine component 1 by $\beta$, and the amplifier 66 multiplies the sine component 2 by $\beta$. Outputs from the amplifiers 63, 64, 65, and 66 are represented by Expressions (14) to (17) below.

$$\text{Output from amplifier 63: } A^2 \cos \Delta\phi \cos \delta \tag{14}$$

$$\text{Output from amplifier 64: } A^2 \sin \Delta\phi \cos \delta \tag{15}$$

$$\text{Output from amplifier 65: } A^2 \cos \Delta\phi \sin \delta \tag{16}$$

$$\text{Output from amplifier 66: } A^2 \sin \Delta\phi \sin \delta \tag{17}$$

The addition operating unit 67 adds up the output from the amplifier 63 and the output from the amplifier 66. Accordingly, the addition operating unit 67 outputs a phase difference-corrected cosine component 52 represented by Expression (18) below.

$$A^2 \cos \Delta\phi \cos \delta + A^2 \sin \Delta\phi \sin \delta = A^2 \cos(\Delta\phi - \delta) \tag{18}$$

The addition operating unit 68 subtracts the output from the amplifier 65 from the output from the amplifier 64. Accordingly, the addition operating unit 68 outputs a phase difference-corrected sine component 53 represented by Expression (19) below.

$$A^2 \sin \Delta\phi \cos \delta - A^2 \cos \Delta\phi \sin \delta = A^2 \sin(\Delta\phi - \delta) \tag{19}$$

Expressions (18) and (19) show that, by respectively multiplying the cosine component 1 and the sine component 2 with gains according to the phase difference error component 8 that correlates with the phase noise component $\phi_{noise}$ and then performing addition or subtraction, the phase difference-corrected cosine component 52 and the phase difference-corrected sine component 53 in which the phase difference error component 6 has been removed from the phase difference component $\Delta\phi$ are obtained.

As shown, the phase difference correcting unit 51 detects a first phase difference error component ($A \cos \delta$) from a first signal (the cosine component 1) and detects a second phase difference error component ($A \sin \delta$) from a second signal (the sine component 2), corrects the first signal based on the detected first phase difference error component, and corrects the second signal based on the detected second phase difference error component.

According to this configuration, the phase difference correcting unit 51 can perform control such that in Expression (8), the second term on the right hand-side ($\phi_{noise}$) is canceled by the third term on the right hand-side ($\delta$) in a similar manner to the first embodiment. As a result, reproduction of a modulated signal can be performed in which discontinuity of an arc tangent operation does not occur regardless of a range of the phase noise component $\phi_{noise}$ that is significantly larger than the signal component $\phi_{sig}$.

In addition, the phase difference correcting unit 51 according to the present second embodiment is capable of continuously detecting fluctuations from minute fluctuations in the nanometer order and within a range of $\pm\pi$ to large fluctuations in the micrometer order and within a range of $\pm$ several hundred $\pi$ in a similar manner to the phase difference error detecting unit 8 according to the first embodiment. Therefore, even a phase noise component in the nanometer order which is extremely difficult to track with an actuator can be suppressed and high S/N reproduction can be achieved.

Furthermore, in the present second embodiment, a cosine transform and a sine transform of the phase difference error component 8 need not be performed by the first error correction gain operating unit 17 and the first error correction gain operating unit 18 as is the case in the first embodiment as shown in FIG. 2, and a cosine component and a sine component according to a phase noise component can be handled without modification.

Moreover, in the present second embodiment, the phase difference correcting unit 51 corresponds to an example of the correcting unit and the phase operating unit 6 corresponds to an example of the phase operating unit.

In addition, while a signal outputted from the LPF 61 is directly used as a gain of the amplifiers 63 and 64 and a signal outputted from the LPF 62 is directly used as a gain of the amplifiers 65 and 66 in the present second embodiment, the present invention is not limited thereto. For example, if the LPF 61 and the LPF 62 are not capable of ideally dividing a frequency band of the signal component $\phi_{sig}$ from a frequency band of the phase noise component $\phi_{noise}$, then Expression (11) is not true. Therefore, a configuration may be adopted where the phase noise component $\phi_{noise}$ is suppressed due to the amplifiers 63, 64, 65, and 66 using values obtained by amplifying output signals of the LPF 61 and LPF 62 by an arbitrary value $\gamma$ as gains.

Alternatively, a configuration may be adopted where the amplifiers 63, 64, 65, and 66 use values obtained by amplifying an amplitude component A of output signals of the LPF 61 and LPF 62 by an arbitrary value $\gamma$ that normalizes the amplitude component A as gains and amplitude components of the phase difference-corrected cosine component 52 and the phase difference-corrected sine component 53 outputted from the phase difference correcting unit 51 are "A". The value $\gamma$ when performing this normalization can be realized by using an inverse (1/A) of a square root ($\sqrt{(A^2)} = A$) of an amplitude component $A^2$ obtained as respective square-sums of the cosine component 1 and the sine component 2.

Moreover, while camming of a recording surface of an optical disk medium has been described in the present second embodiment as an example of a fluctuating factor due to disturbance, a fluctuation component in a lower frequency band than a modulated signal due to a fluctuation factor such as a temperature variation can also be canceled with the configuration of the present second embodiment.

In addition, while a noise component other than a signal component is separated by the LPF 61 and LPF 62 of the phase difference correcting unit 51 in the present second embodiment, the present invention is not limited thereto. The phase difference correcting unit 51 may adopt any configuration as long as a noise component other than a signal component can be separated. For example, the phase difference correcting unit 51 may comprise a band elimination filter (BEF), a band-pass filter (BPF), or a high-pass filter (HPF) capable of removing a frequency band of a signal component.

Furthermore, the phase difference correcting unit 51 may separate a noise component other than a signal component by transforming a time domain signal into a frequency domain signal using Fourier transform and dividing a band by frequency domains.

In addition, in the present second embodiment, a configuration may be adopted in which the phase difference correcting unit 51 and the phase operating unit 6 are integrated on a single LSI.

Furthermore, in the present second embodiment, functions of the phase difference correcting unit 51 and the phase operating unit 6 may be realized by a computer-executable program and a computer.

Third Embodiment

Figure 11:
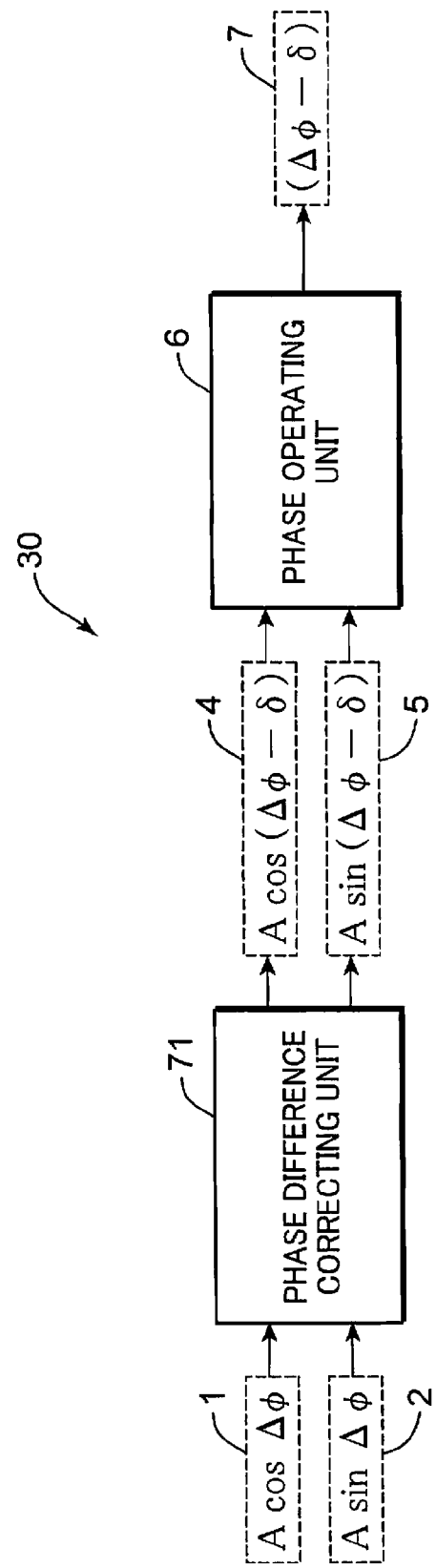
FIG. 11 is a diagram showing a configuration of a phase difference operating unit according to a third embodiment of the present invention.
Figure 12:
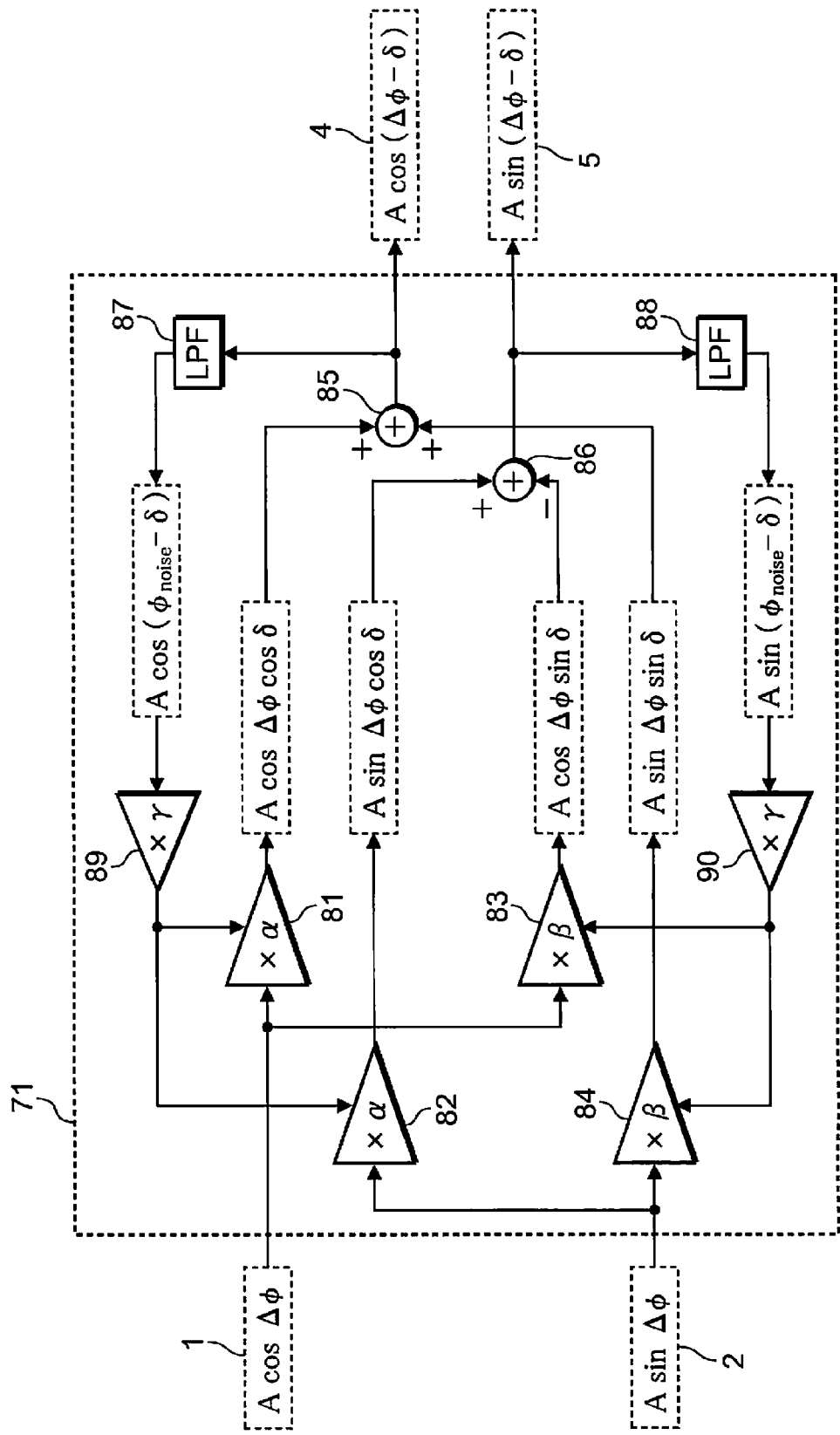
FIG. 12 is a diagram showing a configuration of a phase difference correcting unit according to the third embodiment of the present invention.

FIGS. 11 and 12 are schematic diagrams showing a configuration of a modulated signal detecting apparatus according to a third embodiment of the present invention. Hereinafter, the present third embodiment will be described in detail.

In FIGS. 11 and 12, same components as those shown in FIGS. 1 and 2 are denoted by same reference numerals and descriptions thereof will be omitted.

FIG. 11 is a diagram showing a configuration of a phase difference operating unit according to the third embodiment of the present invention. In FIG. 11, a phase difference operating unit 30 comprises a phase difference correcting unit 71 and a phase operating unit 6. A cosine component 1 and a sine component 2 are inputted to the phase difference correcting unit 71. The cosine component 1 has a phase difference (an optical path difference) $\Delta\phi$ between reference light and signal light. The sine component 2 has an amplitude that is approximately equal to that of the cosine component 1 and a phase difference of approximately $\pi/2$ from the cosine component 1. The phase difference correcting unit 71 uses a phase difference error component $\delta$ to generate a phase difference-corrected cosine component 4 and a phase difference-corrected sine component 5. The generated phase difference-corrected cosine component 4 and phase difference-corrected sine component 5 are inputted to the phase operating unit 6. The phase operating unit 6 outputs a phase difference component 7.

Next, the phase difference correcting unit 71 will be described with reference to FIG. 12. FIG. 12 is a diagram showing a configuration of a phase difference correcting unit according to the third embodiment of the present invention. The phase difference correcting unit 71 comprises amplifiers 81, 82, 83, 84, 89, and 90, addition operating units 85 and 86, and LPFs 87 and 88. The amplifier 81 multiplies the cosine component 1 by a, the amplifier 82 multiplies the sine component 2 by $\alpha$, the amplifier 83 multiplies the cosine component 1 by $\beta$, and the amplifier 84 multiplies the sine component 2 by $\beta$. The amplifiers 81, 82, 83, and 84 provide the cosine component 1 and the sine component 2 inputted to the phase difference correcting unit 71 with gain and output the amplified components. Outputs from the amplifiers 81, 82, 83, and 84 are represented by Expressions (20) to (23) below.

Output from amplifier 81: $A \cos \Delta\phi \cos \delta$ (20)

Output from amplifier 82: $A \sin \Delta\phi \cos \delta$ (21)

Output from amplifier 83: $A \cos \Delta\phi \sin \delta$ (22)

Output from amplifier 84: $A \sin \Delta\phi \sin \delta$ (23)

In this case, the phase difference error component $\delta$ is generated by the LPFs 87 and 88 and the amplifiers 89 and 90.

The error correction gain $\alpha$ of the amplifiers 81 and 82 and the error correction gain $\beta$ of the amplifiers 83 and 84 are represented by Expressions (24) and (25) below.

$$\alpha = \cos \delta \quad (24)$$

$$\delta = \sin \delta \quad (25)$$

The addition operating unit 85 adds up the output from the amplifier 81 and the output from the amplifier 84. Accordingly, the addition operating unit 85 outputs a phase difference-corrected cosine component 4 represented by Expression (26) below.

$$A \cos \Delta\phi \cos \delta + A \sin \Delta\phi \sin \delta = A \cos(\Delta\phi - \delta) \quad (26)$$

The addition operating unit 86 subtracts the output from the amplifier 83 from the output from the amplifier 82. Accordingly, the addition operating unit 86 outputs a phase difference-corrected sine component 5 represented by Expression (27) below.

$$A \sin \Delta\phi \cos \delta - A \cos \Delta\phi \sin \delta = A \sin(\Delta\phi - \delta) \quad (27)$$

Expressions (26) and (27) show that, by multiplying the cosine component 1 and the sine component 2 by gains respectively operated based on the phase difference error component $\delta$ and adding up the multiplied cosine component 1 and the multiplied sine component 2, the phase difference-corrected cosine component 4 and the phase difference-corrected sine component 5 in which the phase difference error component $\delta$ has been removed from the phase difference component $\Delta\phi$ can be obtained.

The phase difference-corrected cosine component 4 and the phase difference-corrected sine component 5 outputted from the addition operating unit 85 and 86 are respectively inputted to the LPFs 87 and 88. The LPFs 87 and 88 output a phase noise component $\phi_{noise}$ that is a component in a lower frequency band than a signal component $\phi_{sig}$ or a difference between the phase noise component $\phi_{noise}$ and the phase difference error component $\delta$. The amplifiers 89 and 90 respectively multiply phase difference error components of the phase difference-corrected cosine component 4 and the phase difference-corrected sine component 5 outputted from the LPFs 87 and 88 by $\gamma$. Values resulting from multiplying the phase difference error components by $\gamma$ are set as gains of the amplifiers 81, 82, 83, and 84. In this case, if $H_1$ denotes a transfer function due to a combination of the LPF 87 and the amplifier 89 and $H_2$ denotes a transfer function due to a combination of the LPF 88 and the amplifier 90, then a value of $\gamma$ is set to an arbitrary value within a range where closed-loop characteristics $1/(1+H_1)$ and $1/(1+H_2)$ in the phase difference correcting unit 71 are both stable.

According to this configuration, the phase difference correcting unit 71 can perform control such that in Expression (8), the second term on the right hand-side ($\phi_{noise}$) is canceled by the third term on the right hand-side ($\delta$) in a similar manner to the first embodiment. As a result, reproduction of a modulated signal can be performed in which discontinuity of an arc tangent operation does not occur regardless of a range of the phase noise component $\phi_{noise}$ that is significantly larger than the signal component $\phi_{sig}$.

In addition, the phase difference correcting unit 71 according to the present third embodiment is capable of continuously detecting fluctuations from minute fluctuations in the nanometer order and within a range of $\pm\pi$ to large fluctuations in the micrometer order and within a range of ±several hundred $\pi$ in a similar manner to the phase difference error detecting unit 8 according to the first embodiment. Therefore, even a phase noise component in the nanometer order which is extremely difficult to track with an actuator can be suppressed and high S/N reproduction can be achieved.

Moreover, in the present third embodiment, the phase difference correcting unit 71 corresponds to an example of the correcting unit and the phase operating unit 6 corresponds to an example of the phase operating unit.

In addition, while the phase difference correcting unit 71 has been described with reference to FIG. 12 in the present third embodiment, the present invention is not limited thereto. The phase difference correcting unit 71 may adopt any configuration as long as respective closed-loop characteristics of a cosine component and a sine component in the phase difference correcting unit 71 shown in FIG. 11 are stable and control can be performed such that, in Expression (8), the second term on the right hand-side ($\phi_{noise}$) is canceled by the third term on the right hand-side (δ). For example, the LPFs 87 and 88 may be a primary LPF or a secondary or higher-order LPF. In addition, when the LPFs 87 and 88 are secondary or higher-order LPFs, the phase difference correcting unit 71 may comprise a phase compensating unit in order to stabilize the closed-loop characteristics.

Alternatively, the phase difference correcting unit 71 may comprise an integrator in place of the LPFs 87 and 88. In addition, the phase difference correcting unit 71 may comprise an accumulator that cumulates outputs of the amplifiers 89 and 90 and may output a value cumulated by the accumulator to the amplifiers 81, 82, 83, and 84. Even in this case, a similar operational effect to that of the present third embodiment may be obtained.

Moreover, while a noise component other than a signal component is separated by the LPFs 87 and 88 of the phase difference correcting unit 71 in the present third embodiment, the present invention is not limited thereto. The phase difference correcting unit 71 may adopt any configuration as long as a noise component other than a signal component can be separated. For example, the phase difference correcting unit 71 may comprise a band elimination filter (BEF), a band-pass filter (BPF), or a high-pass filter (HPF) capable of removing a frequency band of a signal component. Furthermore, the phase difference correcting unit 71 may separate a noise component other than a signal component by transforming a time domain signal into a frequency domain signal using Fourier transform and dividing a band by frequency domains.

Furthermore, while camming of a recording surface of an optical disk medium has been described in the present third embodiment as an example of a fluctuating factor due to disturbance, a fluctuation component in a lower frequency band than a modulated signal due to a fluctuation factor such as a temperature variation can also be canceled with the configuration of the present third embodiment.

In addition, in the present third embodiment, a configuration may be adopted in which the phase difference correcting unit 71 and the phase operating unit 6 are integrated on a single LSI.

Furthermore, in the present third embodiment, functions of the phase difference correcting unit 71 and the phase operating unit 6 may be realized by a computer-executable program and a computer.

Fourth Embodiment

Figure 13:
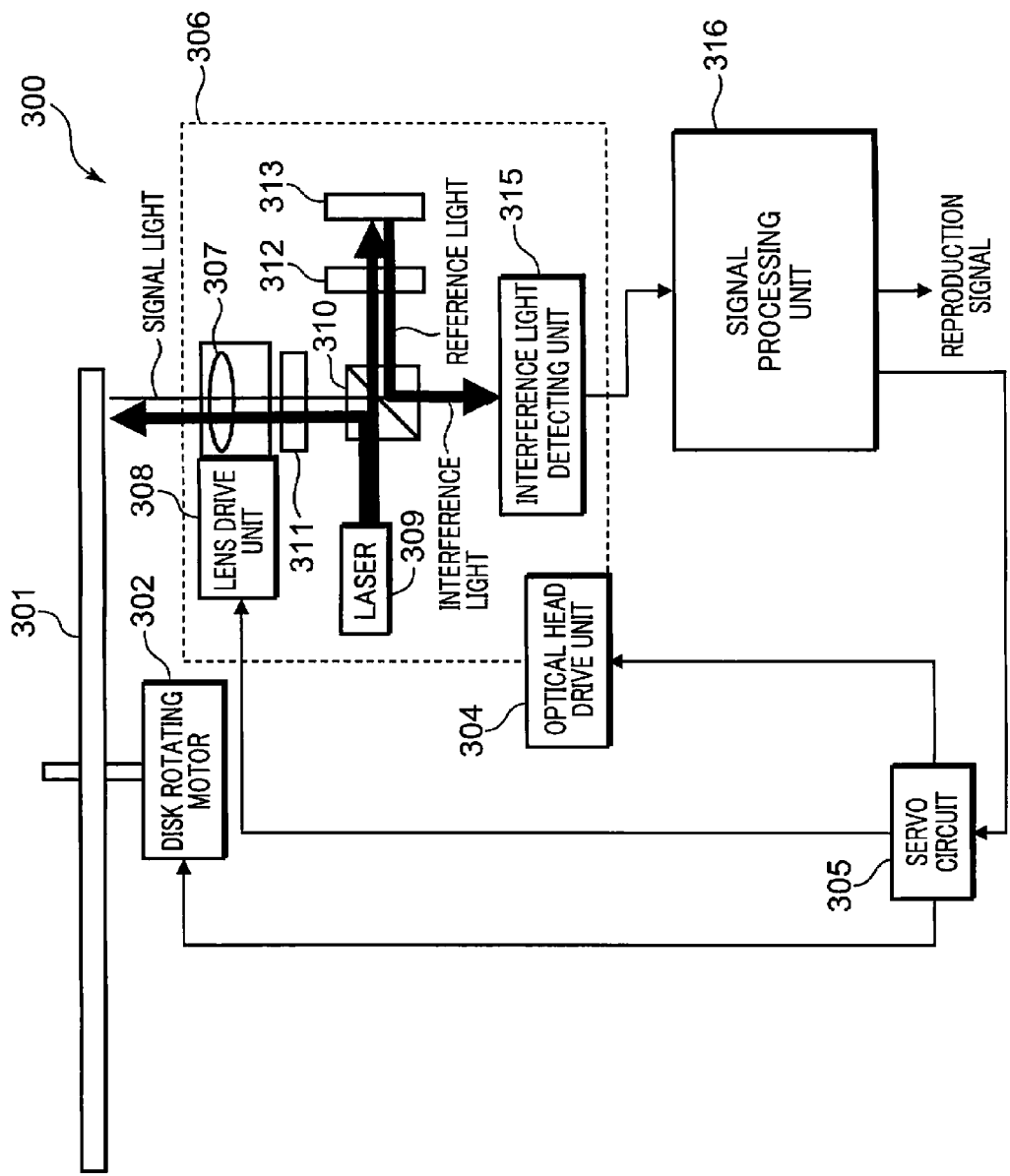
FIG. 13 is a diagram showing a configuration of an optical disk apparatus according to a fourth embodiment of the present invention.
Figure 14:
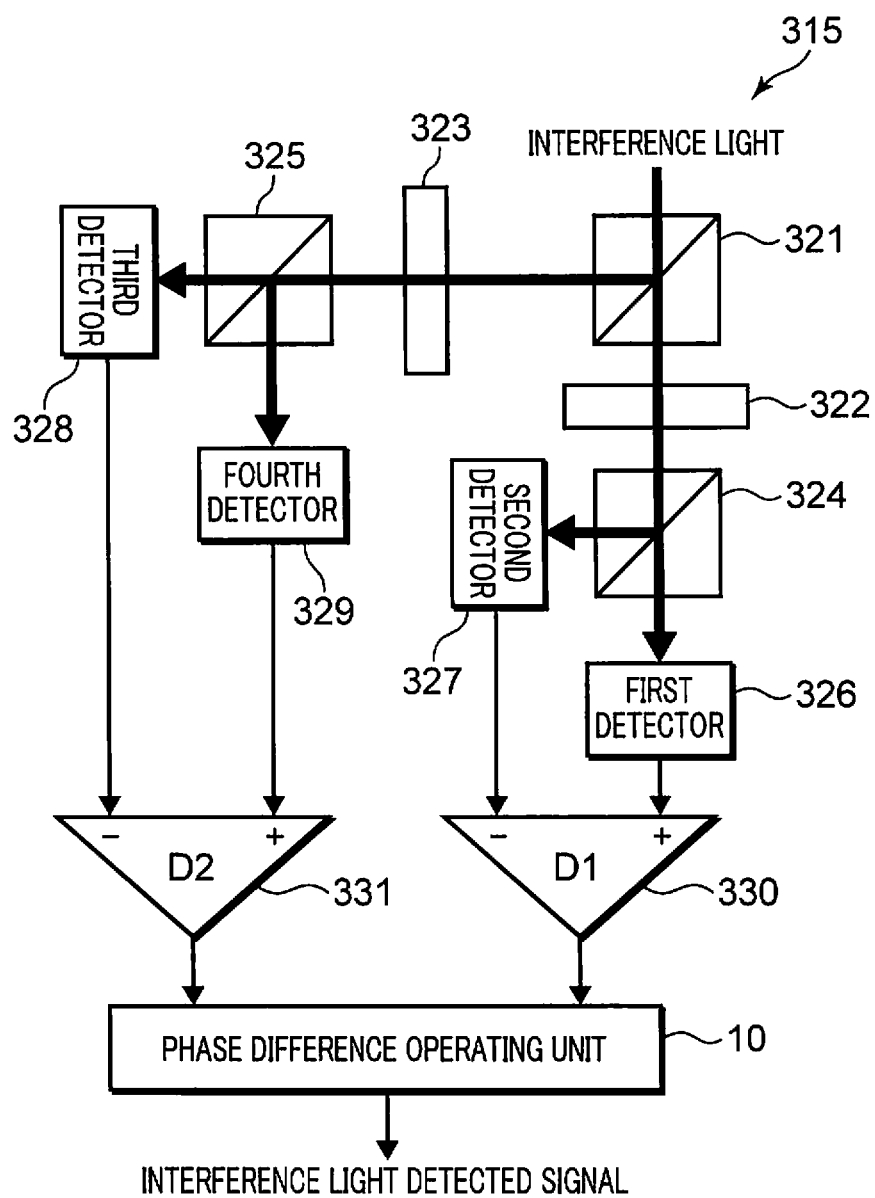
FIG. 14 is a diagram showing a specific configuration of an interference light detecting unit according to the fourth embodiment of the present invention.

FIGS. 13 and 14 are diagrams showing a configuration of a modulated signal detecting apparatus in which signal light is modulated by an optical disk medium according to a fourth embodiment of the present invention.

In FIG. 14, same components as those shown in FIGS. 1 and 2 are denoted by same reference numerals and descriptions thereof will be omitted.

FIG. 13 is a diagram showing a configuration of an optical disk apparatus according to the fourth embodiment of the present invention. In FIG. 13, using a clock signal generated from an optical disk medium 301 on which information is recorded, an optical disk apparatus 300 reproduces data from the optical disk medium 301 or records data onto the optical disk medium 301.

The optical disk apparatus 300 comprises a disk rotating motor 302, an optical head drive unit 304, a servo circuit 305, an optical head unit 306, and a signal processing unit 316. The servo circuit 305 uses a servo error signal to control a lens drive unit 308 so that a focus state and a scan state of an optical beam at an objective lens 307 become optimum. In addition, the servo circuit 305 controls the optical head drive unit 304 so that the optical head unit 306 moves to an optimal radius position of the optical disk medium 301. Furthermore, the servo circuit 305 optimally controls the number of revolutions of the disk rotating motor 302 based on a radius position on the optical disk medium 301 on which the optical beam is irradiated.

Figure 30:
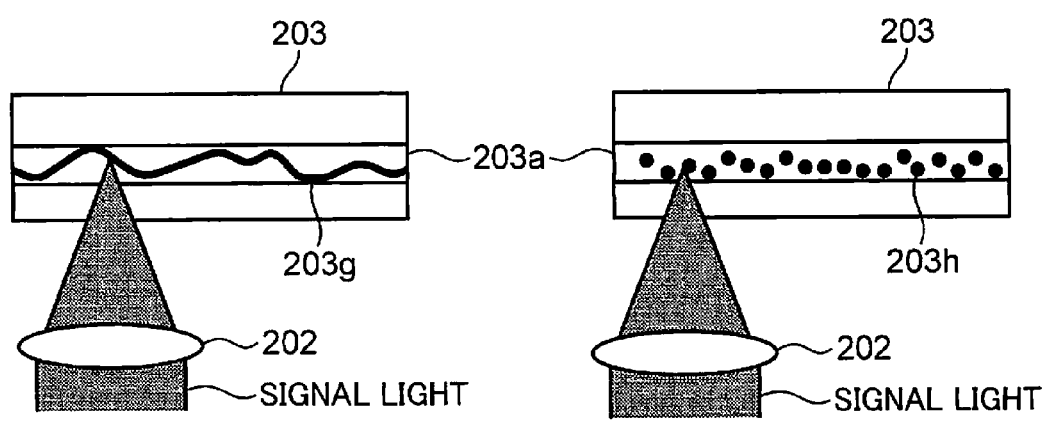
FIG. 30 is a diagram for describing an example in which a phase of signal light is modulated in an optical disk medium.
Figure 31:
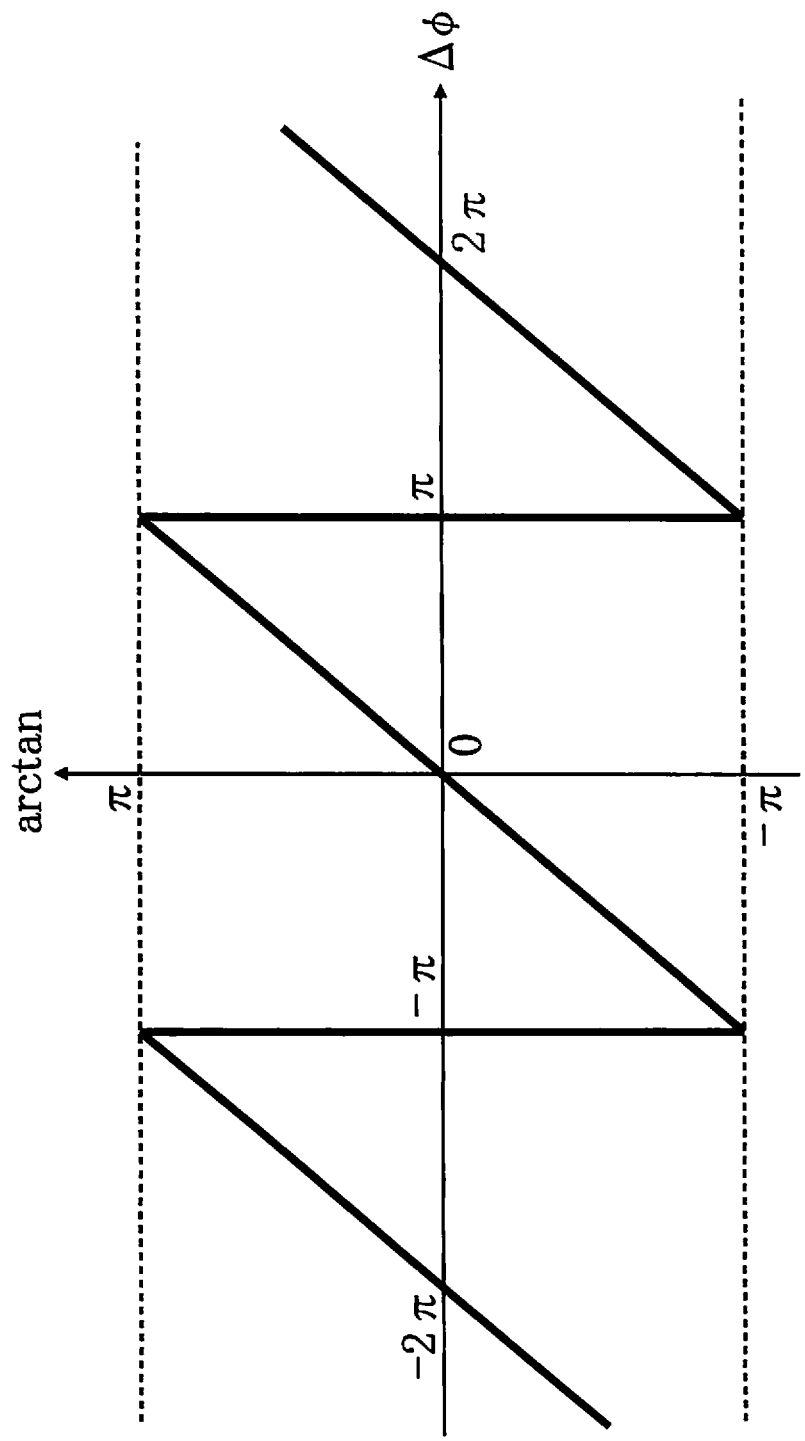
FIG. 31 is a diagram for describing an example of calculating a phase component of light using an arc tangent.

The optical disk medium 301 has at least one or more data recording surfaces. A track is formed on the data recording surface. Information is recorded on the track according to a predetermined data format. The optical disk medium 301 shares a same configuration as the optical disk medium 203 shown in FIG. 30. FIG. 30 shows an example in which a phase of light is modulated by an optical disk medium. Data is recorded as a continuous groove 203g or a discrete hole 203h with varied transmittance or a varied refractive index is formed inside a recording surface 203a. When signal light is irradiated on the groove 203g or the hole 203h, due to a difference in a distance from incidence to the optical disk medium to reaching a position of reflection, phase-modulated signal light is reflected. The signal light is reflected light from the optical disk medium 301.

Moreover, the optical disk medium 301 according to the present fourth embodiment is not limited to the optical disk medium 203 shown in FIG. 30 and an optical disk medium having an altered signal light-reflecting position may be used. For example, the optical disk medium 301 may be an optical disk medium such as a conventional CD-ROM, DVD-ROM, or BD-ROM in which signal light intensity varies according to depths of pits that accommodate binary data. In this case, a phase of reflected light varies when multilevel modulation is applied to pit depth. Alternatively, the optical disk medium 301 may be an optical disk medium that varies reflectance such as a conventional CD-R/RW, DVD-R/RW/RAM, DVD+R/RW, or BD-R/RE. In this case, a phase of reflected light varies by varying a position where reflectance is varied. An operational effect of the present fourth embodiment can also be achieved by using such optical disk media.

The disk rotating motor 302 rotates the optical disk medium 301 at a specified number of revolutions.

Based on an interference light detected signal outputted from the optical head unit 306, the signal processing unit 316 generates a reproduction signal for reproducing data recorded on the optical disk medium 301 and a servo error signal for controlling the disk rotating motor 302, the optical head drive unit 304, and the lens drive unit 308.

The optical head unit 306 comprises a laser 309, a polarizing beam splitter 310, λ/4 plates 311 and 312, a reference light mirror 313, the objective lens 307, the lens drive unit 308, and an interference light detecting unit 315. The optical head unit 306 irradiates an optical beam to the optical disk medium 301, detects light resulting from an interference between signal light reflected by the optical disk medium 301 and reference light while scanning tracks, and outputs an electrical signal.

The laser 309 outputs laser light. The polarizing beam splitter 310 transmits approximately 100% of horizontally-polarized light and reflects approximately 100% of perpendicularly-polarized light incident to a separation plane. The polarizing beam splitter 310 splits the laser light outputted from the laser 309 into perpendicularly-polarized signal light and horizontally-polarized reference light. In addition, a polarization direction of the split signal light is rotated by 90 degrees due to the signal light twice passing through the λ/4 plate 311 positioned on an optical path, and the signal light returns to the polarizing beam splitter 310. A polarization direction of the split reference light is rotated by 90 degrees due to the reference light twice passing through the λ/4 plate 312 positioned on an optical path, and the reference light returns to the polarizing beam splitter 310. At this point, since the polarization directions have been rotated by 90 degrees, contrary to during division, the signal light that has become horizontally-polarized light is transmitted through the polarizing beam splitter 310 and the reference light that has become perpendicularly-polarized light is reflected by the polarizing beam splitter 310. Accordingly, interference light is created by the signal light and the reference light having polarization planes that are perpendicular to each other.

In this case, the polarization plane of laser light incident to the polarizing beam splitter 310 is capable of varying an intensity ratio between the signal light and the reference light by arranging the laser 309 that has been rotated in advance.

The objective lens 307 focuses the signal light onto the optical disk medium 301 and converts the signal light reflected by the optical disk medium 301 into parallel light. The signal light converted into parallel light retraces the optical path of the signal light during its approach. In addition, the objective lens 307 is driven in a focusing direction and a tracking direction by the lens drive unit 308.

Through transmission, the λ/4 plates 311 and 312 convert linearly-polarized light into circularly-polarized light and circularly-polarized light into linearly-polarized light. By being transmitted through the λ/4 plates 311 and 312 twice, linearly-polarized light becomes linearly-polarized light having a polarization plane rotated by 90 degrees. For example, perpendicularly-polarized light is converted into horizontally-polarized light and horizontally-polarized light is converted into perpendicularly-polarized light.

The reference light mirror 313 reflects approximately 100% of reference light divided from laser light. The reference light reflected by the reference light mirror 313 returns along a same optical path as during its approach.

The interference light detecting unit 315 detects multiplexed light of the signal light reflected by the optical disk medium 301 and the reference light reflected by the reference light mirror 313 and outputs an electrical signal. The interference light detecting unit 315 detects interference light with at least three or more different phase differences between the signal light and the reference light, and outputs an electrical signal.

FIG. 14 is a diagram showing a specific configuration of the interference light detecting unit 315 according to the present fourth embodiment. The interference light detecting unit 315 shown in FIG. 14 comprises a half beam splitter (HBS) 321, a λ/2 plate 322, a λ/4 plate 323, a first PBS 324, a second PBS 325, a first detector 326, a second detector 327, a third detector 328, a fourth detector 329, a first operational circuit 330, a second operational circuit 331, and a phase difference operating unit 10.

The HBS 321 simultaneously reflects and transmits incident multiplexed light (interference light) in two directions at approximately the same intensity.

The λ/2 plate 322 rotates a polarization direction of the multiplexed light transmitted through the HBS 321 by 45 degrees. Among the multiplexed light whose polarization direction has been rotated by 45 degrees, the first PBS 324 transmits approximately 100% of horizontally-polarized light and reflects approximately 100% of perpendicularly-polarized light. The first detector 326 and the second detector 327 output an electrical signal corresponding to incident light intensity. The first detector 326 detects interference light in the horizontal polarization direction among the multiplexed light whose polarization direction has been rotated by 45 degrees, and outputs an electrical signal corresponding to the light intensity. The second detector 327 detects interference light in the perpendicular polarization direction among the multiplexed light whose polarization direction has been rotated by 45 degrees, and outputs an electrical signal corresponding to the light intensity. The first operational circuit 330 outputs a differential signal between the electrical signal outputted from the first detector 326 and the electrical signal outputted from the second detector 327.

The λ/4 plate 323 rotates a polarization direction of the multiplexed light reflected by the HBS 321 by 45 degrees and provides a phase difference of π/2 (90 degrees) between respective signal light components and reference light components of the perpendicularly-polarized light and the horizontally-polarized light. Among the multiplexed light transmitted through the λ/4 plate 323, the second PBS 325 transmits approximately 100% of the horizontally-polarized light and reflects approximately 100% of the perpendicularly-polarized light. The third detector 328 and the fourth detector 329 output an electrical signal corresponding to incident light intensity. The third detector 328 detects interference light in the horizontal polarization direction among the multiplexed light transmitted through the λ/4 plate 323, and outputs an electrical signal corresponding to the light intensity. The fourth detector 329 detects interference light in the perpendicular polarization direction among the multiplexed light transmitted through the λ/4 plate 323, and outputs an electrical signal corresponding to the light intensity. The second operational circuit 331 outputs a differential signal between the electrical signal outputted from the third detector 328 and the electrical signal outputted from the fourth detector 329.

The phase difference operating unit 10 performs an operation based on the electrical signal outputted from the first operational circuit 330 and the electrical signal outputted from the second operational circuit 331, and outputs an interference light detected signal.

A polarization state of the multiplexed light of signal light and reference light which is incident to the interference light detecting unit 315 may be represented by a Jones vector as Expression (28) below.

$$\begin{pmatrix} E_d \\ E_m \end{pmatrix} = \begin{pmatrix} A_d \exp(i(\theta + \phi_{sig} + \phi_{noiseS})) \\ A_m \exp(i\theta + \phi_{noiseM}) \end{pmatrix} \quad (28)$$

In Expression (28), $E_d$ denotes an electrical field of signal light reflected by the optical disk medium 301 and $A_d$ denotes an amplitude component of the electrical field of the signal light. $E_m$ denotes an electrical field of reference light reflected by the reference light mirror 313 and $A_m$ denotes an amplitude component of the electrical field of the reference light. θ denotes a phase component relating to a wavelength λ of laser light, time t, and location z, $\phi_{sig}$ denotes a signal component that has been phase-modulated by the optical disk medium 301, and $\phi_{noiseS}$ and $\phi_{noiseM}$ denote phase noise components due to a fluctuation in phase difference between the signal light electrical field and the reference light electrical field created by a fluctuation of optical path difference or the like.

A Jones vector of light transmitted through the HBS 321 and transmitted through the λ/2 plate 322 is as represented by Expression (29) below. In this case, the λ/2 plate 322 is arranged such that a direction at an angle of 22.5 degrees when viewed from a direction of horizontal polarization is a fast axis. A fast axis refers to a direction of vibration in which light proceeds quickly on a wavelength plate. In addition, a direction of vibration in which light proceeds slowly is referred to as a slow axis.

$$\begin{pmatrix} \cos 45° & \sin 45° \\ \sin 45° & -\cos 45° \end{pmatrix} \begin{pmatrix} \frac{E_d}{\sqrt{2}} \\ \frac{E_m}{\sqrt{2}} \end{pmatrix} = \begin{pmatrix} (E_d + E_m)/2 \\ (E_d - E_m)/2 \end{pmatrix} \quad (29)$$

Next, an electrical field of light transmitted through the first PBS 324 and an electrical field of light reflected by the first PBS 324 are respectively represented by Expressions (30) and (31) below.

Transmitted(horizontally-polarized light):$(E_d+E_m)/2$ (30)

Reflected(perpendicularly-polarized light):$(E_d-E_m)/2$ (31)

Accordingly, detected signals of the first detector 326 and the second detector 327 are represented by Expressions (32) and (33) below.

$$\text{First detector 326: } \eta \left| \frac{(E_d + E_m)}{2} \right|^2 = \eta \left( \frac{1}{4} A_d^2 + \frac{1}{4} A_m^2 + \frac{1}{2} A_d A_m \cos\Delta\phi \right) \quad (32)$$

$$\text{Second detector 32: } \eta \left| \frac{(E_d - E_m)}{2} \right|^2 = \eta \left( \frac{1}{4} A_d^2 + \frac{1}{4} A_m^2 - \frac{1}{2} A_d A_m \cos\Delta\phi \right) \quad (33)$$

※ $\Delta\phi=\phi_{sig}+\phi_{noise}, \phi_{noise}=\phi_{noiseS}-\phi_{noiseM}$ In Expressions (32) and (33), η denotes a conversion efficiency of a detector. Δϕ denotes a phase difference due to a difference in optical path lengths between signal light and reference light. A differential signal obtained by the first operational circuit 330 based on detected signals of the first detector 326 and the second detector 327 is represented by Expression (34) below.

$$\eta A_d A_m \cos\Delta\phi = A \cos\Delta\phi \quad (34)$$

Meanwhile, a Jones vector of light reflected by the HBS 321 and transmitted through the λ/4 plate 323 is as represented by Expression (35) below. In this case, the λ/4 plate 323 is arranged such that a direction at an angle of 45 degrees when viewed from a direction of horizontal polarization is a fast axis.

$$\frac{1-i}{2} \begin{pmatrix} i+\cos 90° & \sin 90° \\ \sin 90° & i-\cos 90° \end{pmatrix} \begin{pmatrix} \frac{E_d}{\sqrt{2}} \\ -\frac{E_m}{\sqrt{2}} \end{pmatrix} = \frac{1-i}{\sqrt{2}} \begin{pmatrix} \frac{i(E_d - iE_m)}{2} \\ \frac{(E_d + iE_m)}{2} \end{pmatrix} \quad (35)$$

Next, an electrical field of light transmitted through the second PBS 325 and an electrical field of light reflected by the second PBS 325 are respectively represented by Expressions (36) and (37) below.

Transmitted (horizontally-polarized light)

$$: \frac{1-i}{\sqrt{2}} \left\{ \frac{i(E_d - iE_m)}{2} \right\} \quad (36)$$

Reflected (perpendicularly-polarized light)

$$: \frac{1-i}{\sqrt{2}} \left\{ \frac{(E_d + iE_m)}{2} \right\} \quad (37)$$

According to Expressions (36) and (37), detected signals of the third detector 328 and the fourth detector 329 are represented by Expressions (38) and (39) below.

Third detector 328

$$: \eta \left| \frac{i(E_d - iE_m)}{2} \right|^2 = \eta \left( \frac{1}{4} A_d^2 + \frac{1}{4} A_m^2 - \frac{1}{2} A_d A_m \sin\Delta\phi \right) \quad (38)$$

Fourth detector 329

$$: \eta \left| \frac{(E_d + iE_m)}{2} \right|^2 = \eta \left( \frac{1}{4} A_d^2 + \frac{1}{4} A_m^2 + \frac{1}{2} A_d A_m \sin\Delta\phi \right) \quad (39)$$

A differential signal obtained by the second operational circuit 331 based on detected signals of the third detector 328 and the fourth detector 329 is represented by Expression (40) below.

$$\eta A_d A_m \sin\Delta\phi = A \sin\Delta\phi \quad (40)$$

A cosine component and a sine component operated based on Expressions (34) and (40) are inputted to the phase difference operating unit 10. The phase difference operating unit 10 outputs a signal ($\phi_{sig}$) in which a phase noise component $\phi_{noise}$ has been canceled from a phase difference component Δϕ as an interference light detected signal. In this case, it is assumed that the phase difference operating unit 10 shares a same configuration as that according to the first embodiment and a description thereof will be omitted.

In the present fourth embodiment, a modulation code is designed so that a frequency band of a modulated signal component and a frequency band of a phase difference error component do not overlap each other in advance. Therefore, a signal component ($\phi_{sig}$) and a phase difference error component ($\phi_{noise}-\delta$) can be separated from each other with the simple LPF 21 shown in FIG. 4. However, when the simple LPF 21 is used, the signal component must be prevented from leaking into a phase difference error signal. Therefore, a band of the signal component and a band of the phase difference error component must be clearly separated from each other and an LPF with a steep filter characteristic must be used. As a result, in order to remove and control a phase difference error in a stable manner, a control frequency characteristic must be set to around 1/10 of a band of the LPF. In addition, more superior methods of separating a phase difference error component includes a method of invariably sampling a particular level (for example, a zero cross point of an interference light detected signal) from a reproduction signal. A phase difference error component detected by the phase difference error detecting unit 8 in this manner is feedback-controlled to the phase difference correcting unit 3 as a phase difference error correction value.

Figure 15:
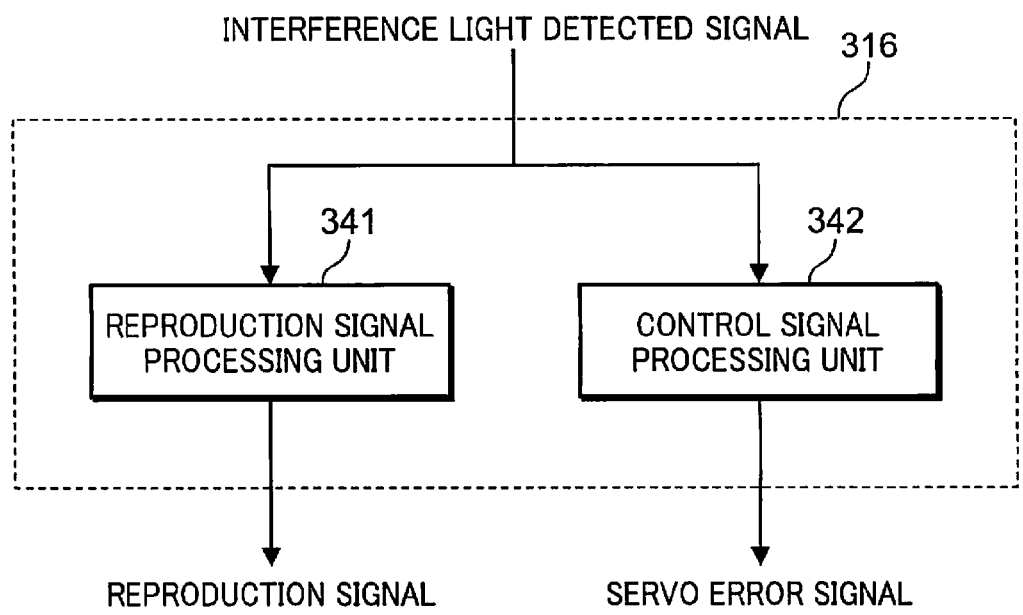
FIG. 15 is a diagram showing a specific configuration of a signal processing unit according to the fourth embodiment of the present invention.

Next, the signal processing unit 316 according to the present fourth embodiment will be described. FIG. 15 is a diagram showing a specific configuration of the signal processing unit according to the present fourth embodiment.

The signal processing unit 316 comprises a reproduction signal processing unit 341 and a control signal processing unit 342. The reproduction signal processing unit 341 reproduces data recorded on the optical disk medium 301 and generates a reproduction signal from the interference light detected signal. The control signal processing unit 342 generates a servo error signal based on the interference light detection signal and outputs the generated servo error signal to the servo circuit 305.

According to this configuration, the phase difference correcting unit of the phase difference operating unit 10 can perform control such that in Expression (8), the second term on the right hand-side ($\phi_{noise}$) is canceled by the third term on the right hand-side ($\delta$) in a similar manner to the first embodiment. As a result, reproduction of a modulated signal can be performed in which discontinuity of an arc tangent operation does not occur regardless of a range of the phase noise component $\phi_{noise}$ that is significantly larger than the signal component $\phi_{sig}$.

In addition, the phase difference error detecting unit according to the present fourth embodiment is also capable of continuously detecting fluctuations from minute fluctuations in the nanometer order and within a range of $\pm\pi$ to large fluctuations in the micrometer order and within a range of ±several hundred $\pi$ in a similar manner to the first embodiment. Therefore, even a phase noise component in the nanometer order which is extremely difficult to track with an actuator can be suppressed and an optical disk apparatus capable of reproduction at a high S/N can be provided.

Moreover, in the present fourth embodiment, the optical disk apparatus 300 corresponds to an example of the modulated signal detecting apparatus, the half beam splitter 321 corresponds to an example of the branching unit, the first detector 326, the second detector 327, the third detector 328, and the fourth detector 329 correspond to examples of at least three detectors, and the first operational circuit 330 and the second operational circuit 331 correspond to an example of the detected signal operating unit.

Furthermore, while the present fourth embodiment adopts a configuration in which an intensity ratio between signal light and reference light of a polarization plane of laser light incident to the polarizing beam splitter 310 is variable by arranging the laser 309 that has been rotated in advance, the present invention is not limited thereto. For example, the optical head unit 306 may comprise a λ/2 plate between the laser 309 and the polarizing beam splitter 310. Accordingly, by rotating the λ/2 plate, the polarization plane of laser light may be rotated to vary the intensity ratio between signal light and reference light.

In addition, while camming of a recording surface of an optical disk medium has been described in the present fourth embodiment as an example of a fluctuating factor due to disturbance, a fluctuation component in a lower frequency band than a modulated signal due to a fluctuation factor such as a temperature variation can also be canceled with the configuration of the present fourth embodiment.

Furthermore, while the signal processing unit 316 is arranged outside the optical head unit 306 in the present fourth embodiment, a configuration may also be adopted in which the optical head unit 306 comprises the signal processing unit 316.

In addition, while the phase difference operating unit 10 in the interference light detecting unit 315 is arranged inside the optical head unit 306 in the present fourth embodiment, the phase difference operating unit 10 may instead be arranged outside of the optical head unit 306. In this case, a configuration may be adopted in which the phase difference operating unit 10 and the signal processing unit 316 are integrated on a single LSI.

Moreover, while the phase difference error detecting unit 8 has been described with reference to FIG. 4 in the present fourth embodiment, the present invention is not limited thereto. The phase difference error detecting unit 8 may adopt any configuration as long as a closed-loop characteristic constituted by the phase difference correcting unit 3, the phase operating unit 6, and the phase difference error detecting unit 8 shown in FIG. 1 is stable and control can be performed such that, in Expression (8), the second term on the right hand-side ($\phi_{noise}$) is canceled by the third term on the right hand-side ($\delta$). For example, the LPF 21 may be a primary LPF or a secondary or higher-order LPF. When the LPF 21 is a secondary or higher-order LPF, the phase difference error detecting unit 8 may comprise a phase compensating unit in order to stabilize the closed-loop characteristic. Alternatively, the phase difference error detecting unit 8 may comprise an integrator in place of the LPF 21. In addition, as shown in FIG. 7, the phase difference error detecting unit 8 may comprise an accumulator 23 which cumulates output from the amplifier 22 and which outputs an cumulated value to the phase difference correcting unit 3. Even in this case, a similar operational effect to that of the present fourth embodiment may be obtained.

Moreover, while the phase difference correcting unit 3 has been described with reference to FIG. 2 in the present fourth embodiment, the present invention is not limited thereto. Any configuration may be adopted as long as a cosine component and a sine component having a phase difference component $\Delta\phi$ are corrected using a phase difference error component $\delta$ to a phase difference-corrected cosine component and a phase difference-corrected sine component. For example, the first error correction gain operating unit 17 and the second error correction gain operating unit 18 shown in FIG. 2 may determine the error correction gains $\alpha$ and $\beta$ using a look-up table or the like instead of using Expressions (3) and (4) described above.

In addition, while the cosine component 1 is multiplied by $-\beta$ by the amplifier 13 and the cosine component 1 multiplied by $-\beta$ and the sine component 2 multiplied by $\alpha$ are added up by the addition operating unit 16 in the phase difference correcting unit 3 shown in FIG. 2, alternatively, the cosine component 1 may be multiplied by $\beta$ by the amplifier 13 and the cosine component 1 multiplied by $\beta$ may be subtracted from the sine component 2 multiplied by a by the addition operating unit 16. In this case, a similar operational effect to that of the present fourth embodiment may be obtained.

Furthermore, as shown in FIG. 5, the phase difference correcting unit 3 may comprise amplifiers 11, 12, 13, and 14, addition operating units 15 and 16, a first error correction gain operating unit 17, a third error correction gain operating unit 31, and an error correction look-up table (LUT) 32. The first error correction gain operating unit 17 refers to the error correction look-up table (LUT) 32 and operates an error correction gain α from a phase difference error component δ. The third error correction gain operating unit 31 refers to the error correction LUT 32 and operates a value whose phase is shifted by π/2 as an error correction gain β from the inputted error correction gain α. In this case, a similar operational effect to that of the present fourth embodiment may be obtained.

In addition, when the cosine component 1 and the sine component 2 are A/D-converted digital data, as shown in FIG. 6, the phase difference correcting unit 3 may comprise multiplying units 41, 42, 43, and 44, addition operating units 15 and 16, a first error correction gain operating unit 17, and a second error correction gain operating unit 18. In this case, the multiplying unit 41 may multiply the cosine component 1 by the error correction gain α, the multiplying unit 42 may multiply the sine component 2 by the error correction gain α, the multiplying unit 43 may multiply the cosine component 1 by the error correction gain β, and the multiplying unit 44 may multiply the sine component 2 by the error correction gain β.

Moreover, while the phase operating unit 6 generates the phase difference component 7 using Expression (7) above in the present fourth embodiment, the present invention is not limited thereto. For example, the phase operating unit 6 may comprise a look-up table that retains, in advance, the phase difference component 7 obtained as a result of an arc tangent operation. The phase operating unit 6 may transform a phase difference-corrected cosine component 4 and a phase difference-corrected sine component 5 into the phase difference component 7 using the look-up table. In addition, the phase operating unit 6 may operate the phase difference component 7 by performing branching as represented by Expression (9) or (10) above.

Moreover, while a noise component other than a signal component is separated by the LPF 21 of the phase difference error detecting unit 8 in the present fourth embodiment, the present invention is not limited thereto. The phase difference error detecting unit 8 may adopt any configuration as long as a noise component other than a signal component can be separated. For example, the phase difference error detecting unit 8 may comprise a band elimination filter (BEF), a band-pass filter (BPF), or a high-pass filter (HPF) capable of removing a frequency band of a signal component. In addition, the phase difference error detecting unit 8 may separate a noise component other than a signal component by transforming a time domain signal into a frequency domain signal using Fourier transform and dividing a band by frequency domains.

In addition, in the present fourth embodiment, a configuration may be adopted in which the signal processing unit 316 is integrated on a single LSI.

Furthermore, in the present fourth embodiment, a configuration may be adopted in which the phase difference correcting unit 3, the phase operating unit 6, and the phase difference error detecting unit 8 are integrated on a single LSI.

In addition, in the present fourth embodiment, functions of the phase difference correcting unit 3, the phase operating unit 6, and the phase difference error detecting unit 8 may be realized by a computer-executable program and a computer. For example, a program of the phase difference correcting unit 3, the phase operating unit 6, and the phase difference error detecting unit 8 is represented by the flow chart shown in FIG. 8.

Moreover, while a configuration of the interference light detecting unit 315 has been described with reference to FIG. 14 in the present fourth embodiment, the present invention is not limited thereto. In principle, the interference light detecting unit 315 need only comprise three or more detectors and the respective detectors need only detect interference light so that phase differences between signal light and reference light differ from each other. The interference light detecting unit 315 may include a branching unit which branches interference light between signal light and reference light into at least three beams of light, at least three detectors which respectively detect the at least three beams of light branched by the branching unit and which respectively output detected signals corresponding to intensities of detected beams of light, and a detected signal operating unit which operates a first signal and a second signal based on the detected signals outputted by the at least three detectors. For example, when the interference light detecting unit 315 comprises three detectors, phase differences between signal light and reference light at the respective detectors may be realized by a combination of 0, 120, and 240 degrees or a combination of −120, 0, and 120 degrees.

Moreover, while the interference light detecting unit 315 comprises four detectors as shown in FIG. 14 in the present fourth embodiment, the present invention is not limited thereto and the interference light detecting unit 315 is capable of generating a cosine component and a sine component with three or more detectors.

Figure 16:
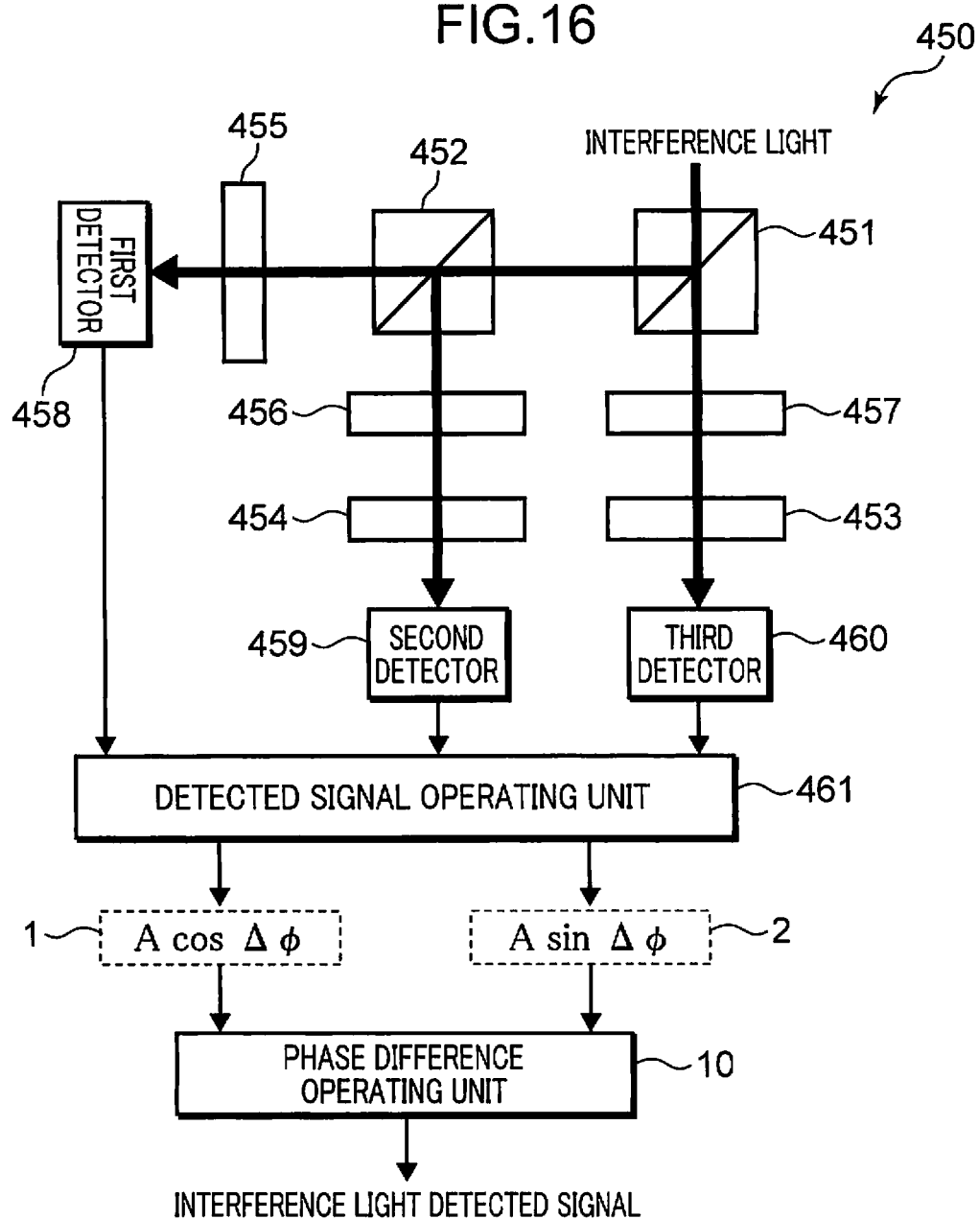
FIG. 16 is a diagram showing a configuration of an interference light detecting unit comprising three detectors in the fourth embodiment of the present invention.

For example, FIG. 16 is a diagram showing a configuration of an interference light detecting unit comprising three detectors in the fourth embodiment of the present invention. In this case, phase differences between signal light and reference light on the respective detectors are 0, 2π/3, and 4π/3.

An interference light detecting unit 450 shown in FIG. 16 comprises nonpolarizing beam splitters 451 and 452, polarizers 453, 454, and 455, a phase plate 456, a phase plate 457, a first detector 458, a second detector 459, a third detector 460, a detected signal operating unit 461, and the phase difference operating unit 10. The polarizers 453, 454, and 455 transmit 45-degree polarized light. The phase plate 456 creates a phase difference of 5π/3 between signal light and reference light. The phase plate 457 creates a phase difference of π/3 between the signal light and the reference light.

The nonpolarizing beam splitter 451 splits interference light incident to the interference light detecting unit 450 at an intensity ratio of 2 to 1. In this case, a ratio between reflected light and transmitted light of the nonpolarizing beam splitter 451 is 2 to 1. Therefore, the ratio between reflected light and transmitted light is equivalent to a split intensity ratio. The nonpolarizing beam splitter 451 creates a phase difference of π between the signal light and the reference light with respect to reflected light.

First, light reflected by the nonpolarizing beam splitter 451 is incident to the nonpolarizing beam splitter 452. The nonpolarizing beam splitter 452 splits incident light at an intensity ratio of 1 to 1. In this case, a ratio between reflected light and transmitted light of the nonpolarizing beam splitter 452 is 1 to 1. Therefore, the ratio between reflected light and transmitted light is equivalent to a split intensity ratio. The nonpolarizing beam splitter 452 creates a phase difference of π between the signal light and the reference light with respect to reflected light.

Light transmitted through the nonpolarizing beam splitter 452 is incident to the polarizer 455. The polarizer 455 only transmits 45-degree polarized light among the incident light. Light transmitted through the polarizer 455 is detected by the first detector 458. At this point, since the light detected by the first detector 458 has been reflected by the nonpolarizing beam splitter 451, a phase difference of it exists between signal light and reference light.

Next, light reflected by the nonpolarizing beam splitter 452 is incident to the phase plate 456. The phase plate 456 creates a phase difference of π/3 between signal light and reference light with respect to the incident light. At this point, light which combines a phase difference due to reflection by the nonpolarizing beam splitter 451, a phase difference due to reflection by the nonpolarizing beam splitter 452, and a phase difference due to transmission through the phase plate 456 and which has a phase difference of 11π/3 (=5π/3) between the signal light and the reference light is incident to the polarizer 454. The polarizer 454 only transmits 45-degree polarized light among the incident light. Light transmitted through the polarizer 454 is detected by the second detector 459.

Next, light transmitted through the nonpolarizing beam splitter 451 is incident to the phase plate 457. The phase plate 457 creates a phase difference of π/3 between signal light and reference light with respect to the incident light. The light having a phase difference of π/3 between the signal light and the reference light is incident to the polarizer 453. The polarizer 453 only transmits 45-degree polarized light among the incident light. Light transmitted through the polarizer 453 is detected by the third detector 460. In this case, intensities of beams of light detected by the respective detectors is as represented by Expressions (41) to (43) below.

First detector 458: $I_A = \eta \left| \frac{1}{\sqrt{3}} E_d - \frac{1}{\sqrt{3}} E_m \right|^2 = \eta \left( \begin{array}{c} \frac{1}{3} A_d^2 + \frac{1}{3} A_m^2 - \\ \frac{2}{3} A_d A_m \cos \Delta \phi \end{array} \right)$ (41)

Second detector 459: $I_B =$ (42)

$\eta \left| \frac{1}{\sqrt{3}} E_d + \frac{1}{\sqrt{3}} e^{-\frac{\pi}{3}i} E_m \right|^2 = \eta \left( \begin{array}{c} \frac{1}{3} A_d^2 + \frac{1}{3} A_m^2 + \\ \frac{2}{3} A_d A_m \cos\left(\Delta\phi + \frac{\pi}{3}\right) \end{array} \right)$ Third detector 460: $I_C =$ (43)

$\eta \left| \frac{1}{\sqrt{3}} E_d + \frac{1}{\sqrt{3}} e^{\frac{\pi}{3}i} E_m \right|^2 = \eta \left( \begin{array}{c} \frac{1}{3} A_d^2 + \frac{1}{3} A_m^2 + \\ \frac{2}{3} A_d A_m \cos\left(\Delta\phi - \frac{\pi}{3}\right) \end{array} \right)$ Based on Expressions (44) and (45) below, the detected signal operating unit 461 calculates a cosine component (A cos Δϕ) and a sine component (A sin Δϕ) from signals $I_A$, $I_B$, and $I_C$ respectively detected by the first detector 458, the second detector 459, and the third detector 460.

$A \cos \Delta\phi = I_A - \frac{I_B + I_C}{2}$ (44)

$A \sin \Delta\phi = \frac{\sqrt{3}}{2}(I_C - I_B)$ (45)

Moreover, the interference light detecting unit 315 is not limited to the configuration shown in FIG. 14. For example, while a 2/2 plate and a λ/4 plate are used as optical elements for obtaining signals in which a phase difference between signal light and reference light is varied, an optical element capable of controlling polarized light, nano-photonic material, or a hybrid optical function element such as an optical waveguide may also be used.

In addition, in the present fourth embodiment, a configuration may be adopted in which the interference light detecting unit 315 and the signal processing unit 316 are integrated on a single LSI on which an optical waveguide, an electric circuit, and an electronic circuit are integrated.

Moreover, while a configuration of the phase difference operating unit 10 has been described with reference to FIGS. 1, 2, and 4 in the present fourth embodiment, the present invention is not limited thereto. Any configuration may be adopted as long as a cosine component and a sine component having a phase difference component Δϕ that includes a signal component and a phase noise components are corrected using a phase difference error component δ to a phase difference-corrected cosine component and a phase difference-corrected sine component. For example, the first error correction gain operating unit 17 and the second error correction gain operating unit 18 shown in FIG. 2 may determine the error correction gains α and β using a look-up table or the like instead of using Expressions (3) and (4) described above.

Furthermore, while the cosine component 1 is multiplied by −β by the amplifier 13 and the cosine component 1 multiplied by −β and the sine component 2 multiplied by α are added up by the addition operating unit 16 in the phase difference correcting unit 3 shown in FIG. 2, alternatively, the cosine component 1 may be multiplied by β by the amplifier 13 and the cosine component 1 multiplied by β may be subtracted from the sine component 2 multiplied by α by the addition operating unit 16. In this case, a similar operational effect to that of the present fourth embodiment may be obtained.

Furthermore, as shown in FIG. 5, the phase difference correcting unit 3 may comprise amplifiers 11, 12, 13, and 14, addition operating units 15 and 16, a first error correction gain operating unit 17, a third error correction gain operating unit 31, and an error correction look-up table (LUT) 32. The first error correction gain operating unit 17 refers to the error correction look-up table (LUT) 32 and operates an error correction gain α from a phase difference error component δ. The third error correction gain operating unit 31 refers to the error correction LUT 32 and operates a value whose phase is shifted by π/2 as an error correction gain β from the inputted error correction gain α. In this case, a similar operational effect to that of the present fourth embodiment may be obtained.

In addition, when the cosine component 1 and the sine component 2 are A/D-converted digital data, as shown in FIG. 6, the phase difference correcting unit 3 may comprise multiplying units 41, 42, 43, and 44, addition operating units 15 and 16, a first error correction gain operating unit 17, and a second error correction gain operating unit 18. In this case, the multiplying unit 41 may multiply the cosine component 1 by the error correction gain α, the multiplying unit 42 may multiply the sine component 2 by the error correction gain α, the multiplying unit 43 may multiply the cosine component 1 by the error correction gain β, and the multiplying unit 44 may multiply the sine component 2 by the error correction gain β.

Furthermore, the phase difference operating unit may be configured as shown in FIGS. 9 and 10 or as shown in FIGS. 11 and 12. Even in this case, a similar operational effect to that of the present fourth embodiment may be obtained.

Fifth Embodiment

Figure 17:
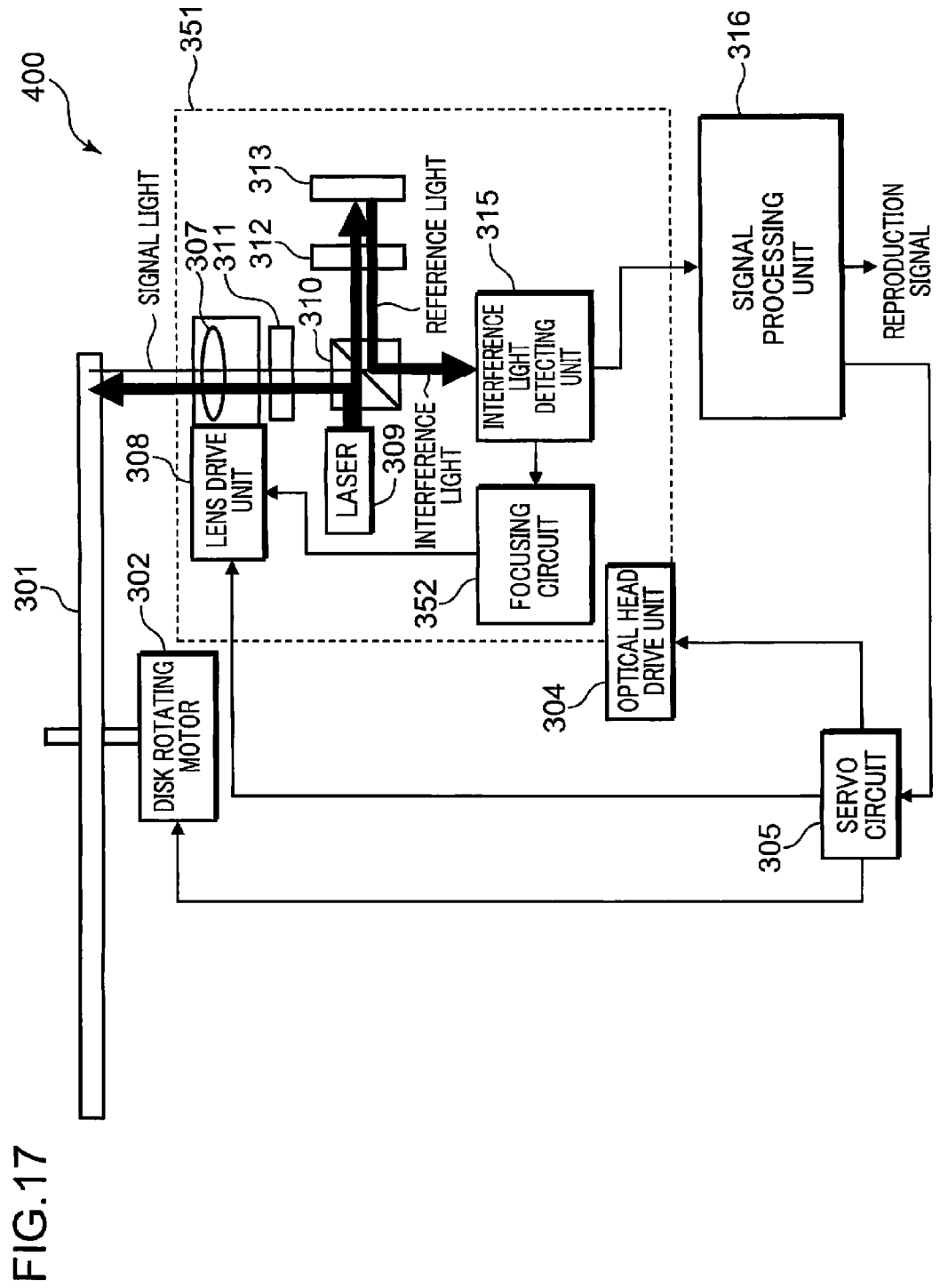
FIG. 17 is a diagram showing a configuration of an optical disk apparatus according to a fifth embodiment of the present invention.
Figure 18:
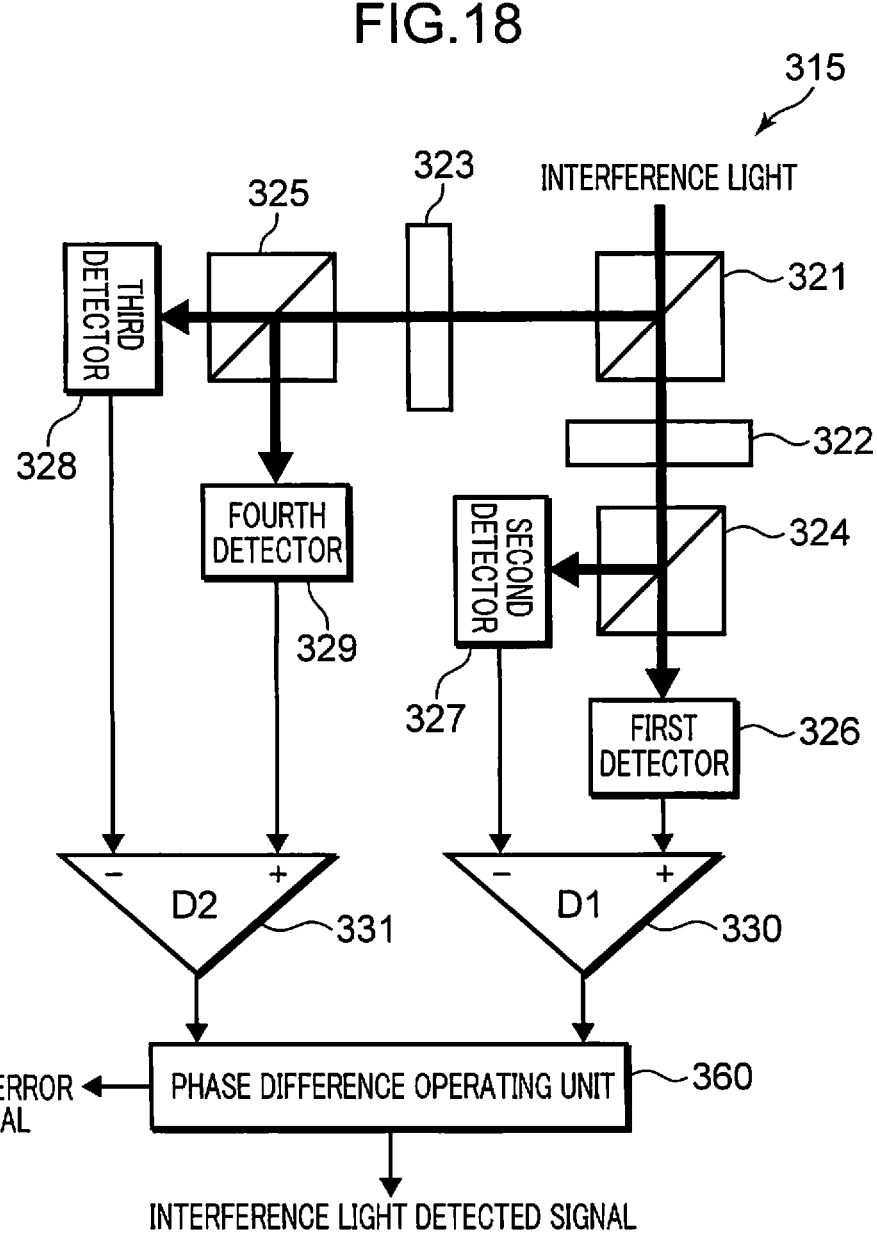
FIG. 18 is a diagram showing a configuration of an interference light detecting unit according to the fifth embodiment of the present invention.
Figure 19:
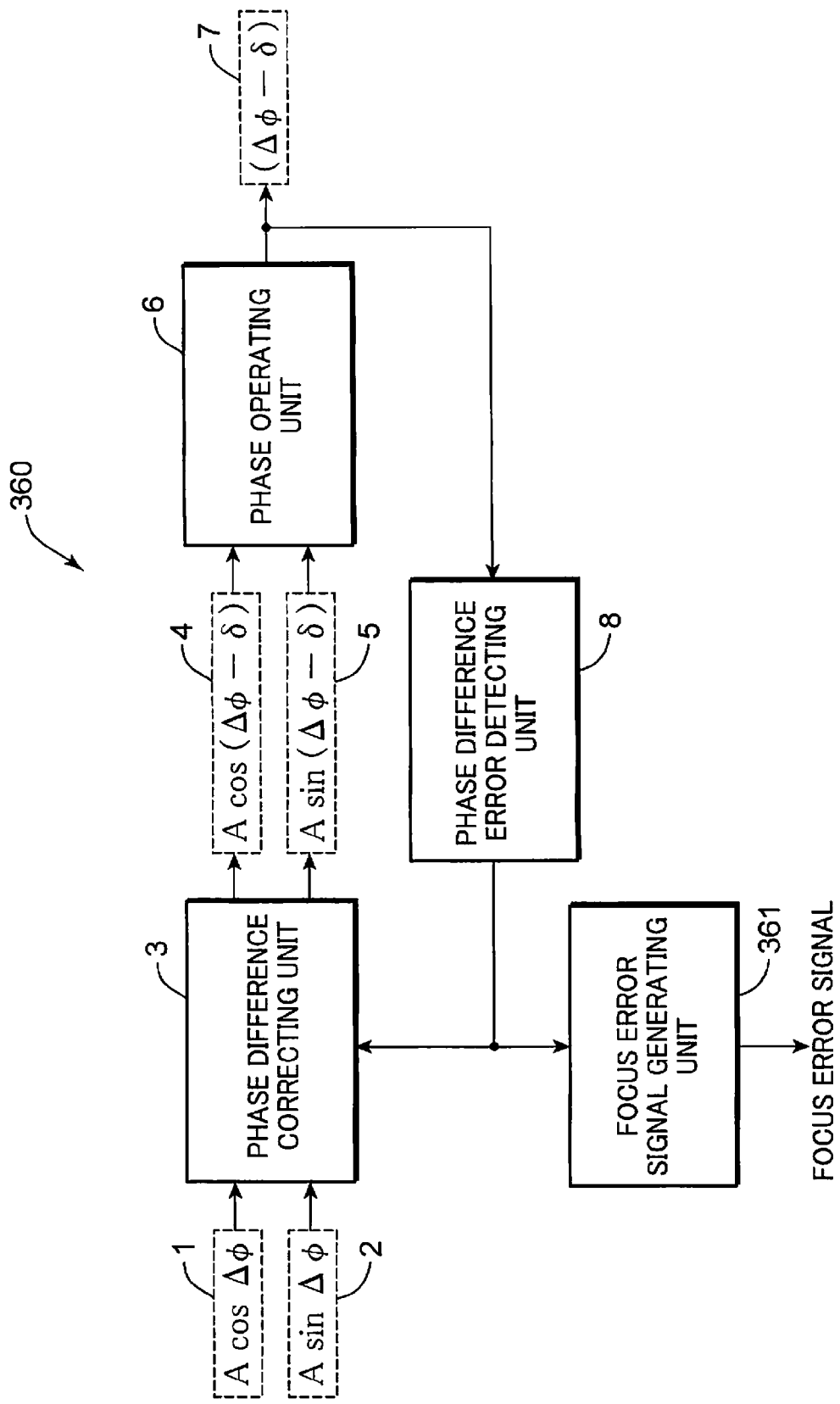
FIG. 19 is a diagram showing a configuration of a phase difference operating unit according to the fifth embodiment of the present invention.

FIGS. 17, 18, and 19 are diagrams showing a configuration of a modulated signal detecting apparatus in which signal light is modulated by an optical disk medium according to a fifth embodiment of the present invention.

In FIGS. 17 and 18, same components as those shown in FIGS. 13 and 14 are denoted by same reference numerals and descriptions thereof will be omitted. In FIG. 19, same components as those shown in FIG. 1 are denoted by same reference numerals and descriptions thereof will be omitted.

FIG. 17 is a diagram showing a configuration of an optical disk apparatus according to the fifth embodiment of the present invention. FIG. 18 is a diagram showing a specific configuration of an interference light detecting unit according to the fifth embodiment of the present invention. FIG. 19 is a diagram showing a configuration of a phase difference operating unit according to the fifth embodiment of the present invention.

In FIG. 17, using a clock signal generated from an optical disk medium 301 on which information is recorded, an optical disk apparatus 400 reproduces data from the optical disk medium 301 or records data onto the optical disk medium 301.

The optical disk apparatus 400 comprises a disk rotating motor 302, an optical head drive unit 304, a servo circuit 305, an optical head unit 351, and a signal processing unit 316.

The optical head unit 351 comprises a laser 309, a polarizing beam splitter 310, λ/4 plates 311 and 312, a reference light mirror 313, an objective lens 307, a lens drive unit 308, an interference light detecting unit 315, and a focusing circuit 352.

In addition, as shown in FIG. 18, the interference light detecting unit 315 comprises a half beam splitter (HBS) 321, a λ/2 plate 322, a λ/4 plate 323, a first PBS 324, a second PBS 325, a first detector 326, a second detector 327, a third detector 328, a fourth detector 329, a first operational circuit 330, a second operational circuit 331, and a phase difference operating unit 360.

Furthermore, as shown in FIG. 19, the phase difference operating unit 360 comprises a phase difference correcting unit 3, a phase operating unit 6, a phase difference error detecting unit 8, and a focus error signal generating unit 361.

The focusing circuit 352 performs focusing control of the lens drive unit 308 based on a focus error signal outputted from the phase difference operating unit 360 (refer to FIG. 18) in the interference light detecting unit 315.

The focus error signal generating unit 361 generates a focus error signal based on a phase difference error component δ outputted from the phase difference error detecting unit 8. The phase difference error component δ correlates with a phase noise component $\phi_{noise}$ detected by the phase difference error detecting unit 8. A major factor of the phase noise component $\phi_{noise}$ is a fluctuation of optical path difference that is created by undulation or deflection of a recording surface of the optical disk medium 301. Therefore, the focus error signal generating unit 361 is able to handle the phase difference error component δ detected by the phase difference error detecting unit 8 as a focus error signal.

According to this configuration, in a similar manner to the fourth embodiment, the phase difference correcting unit 3 can perform control such that in Expression (8), the second term on the right-hand-side ($\phi_{noise}$) is canceled by the third term on the right-hand-side (δ). As a result, reproduction of a modulated signal can be performed in which discontinuity of an arc tangent operation does not occur regardless of a range of the phase noise component $\phi_{noise}$ that is significantly larger than the signal component $\phi_{sig}$.

In addition, the phase difference error detecting unit 8 according to the present fourth embodiment is also capable of continuously detecting fluctuations from minute fluctuations in the nanometer order and within a range of ±π to large fluctuations in the micrometer order and within a range of ±several hundred π in a similar manner to the first embodiment. Therefore, even a phase noise component in the nanometer order which is extremely difficult to track with an actuator can be suppressed and high S/N reproduction can be achieved. Furthermore, in the present fifth embodiment, focusing control using the phase difference error component δ can be performed.

Moreover, in the present fifth embodiment, the optical disk apparatus 400 corresponds to an example of the modulated signal detecting apparatus, the half beam splitter 321 corresponds to an example of the branching unit, the first detector 326, the second detector 327, the third detector 328, and the fourth detector 329 correspond to examples of at least three detectors, and the first operational circuit 330 and the second operational circuit 331 correspond to an example of the detected signal operating unit.

Sixth Embodiment

Figure 20:
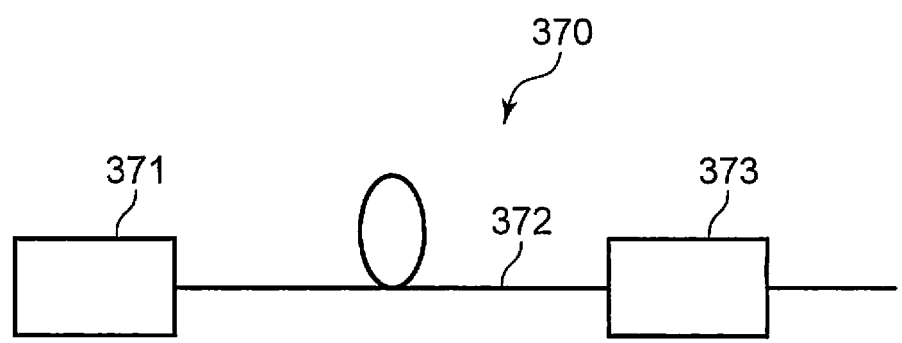
FIG. 20 is a diagram showing an overall configuration of an optical transmission system according to a sixth embodiment of the present invention.
Figure 21:
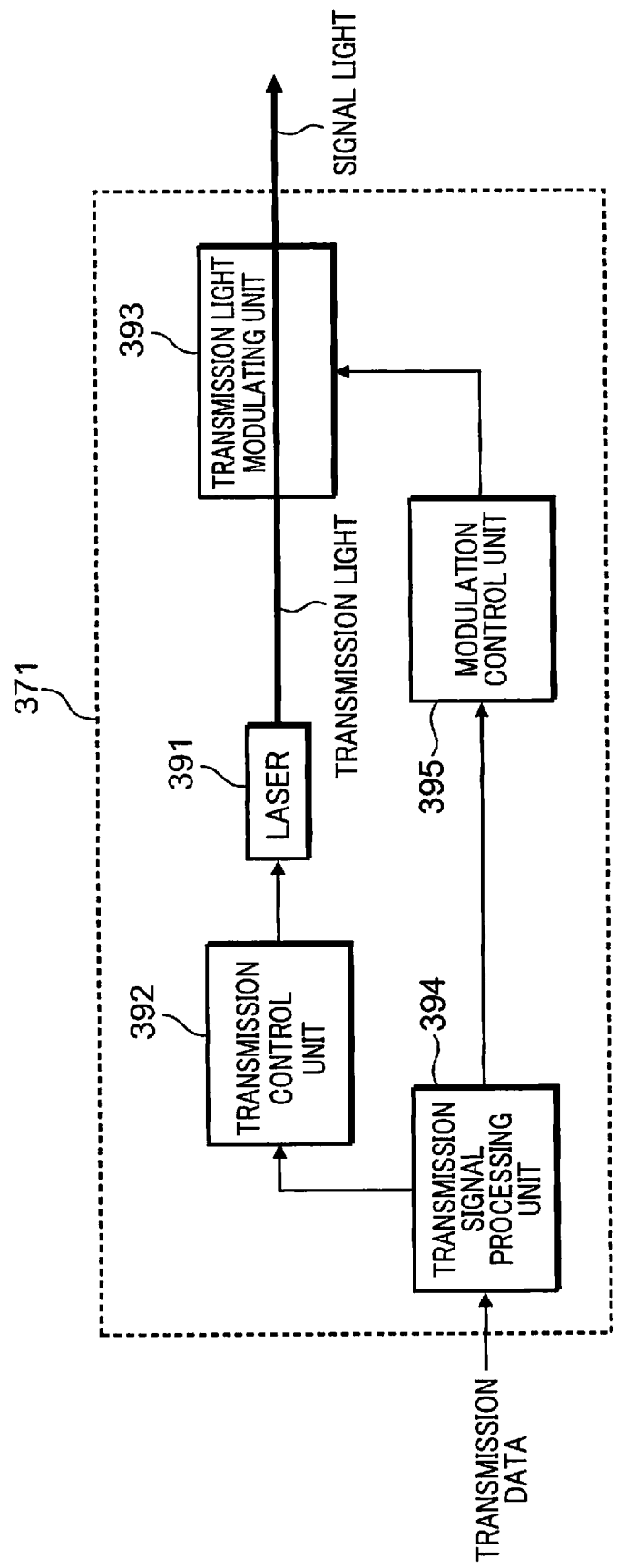
FIG. 21 is a diagram showing a configuration of an optical transmitter shown in FIG. 20.
Figure 22:
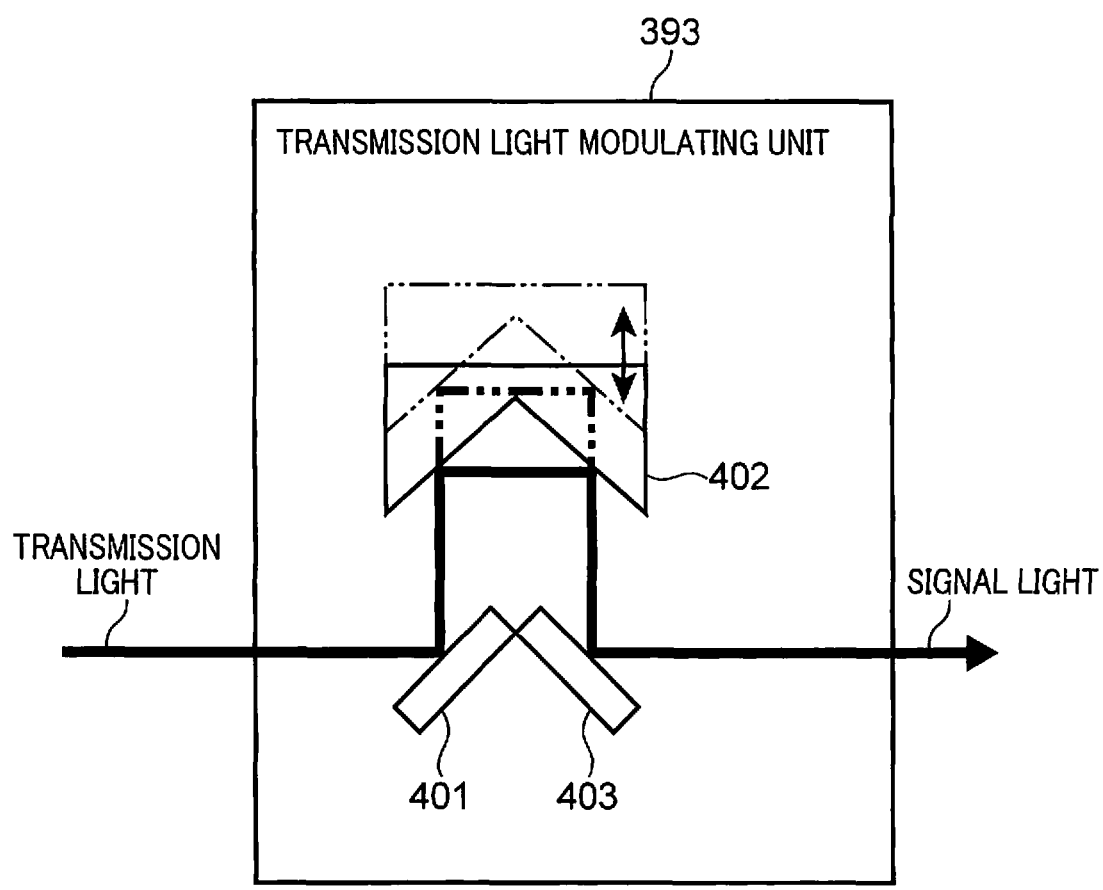
FIG. 22 is a diagram showing an example of a signal light modulating unit shown in FIG. 21.
Figure 23:
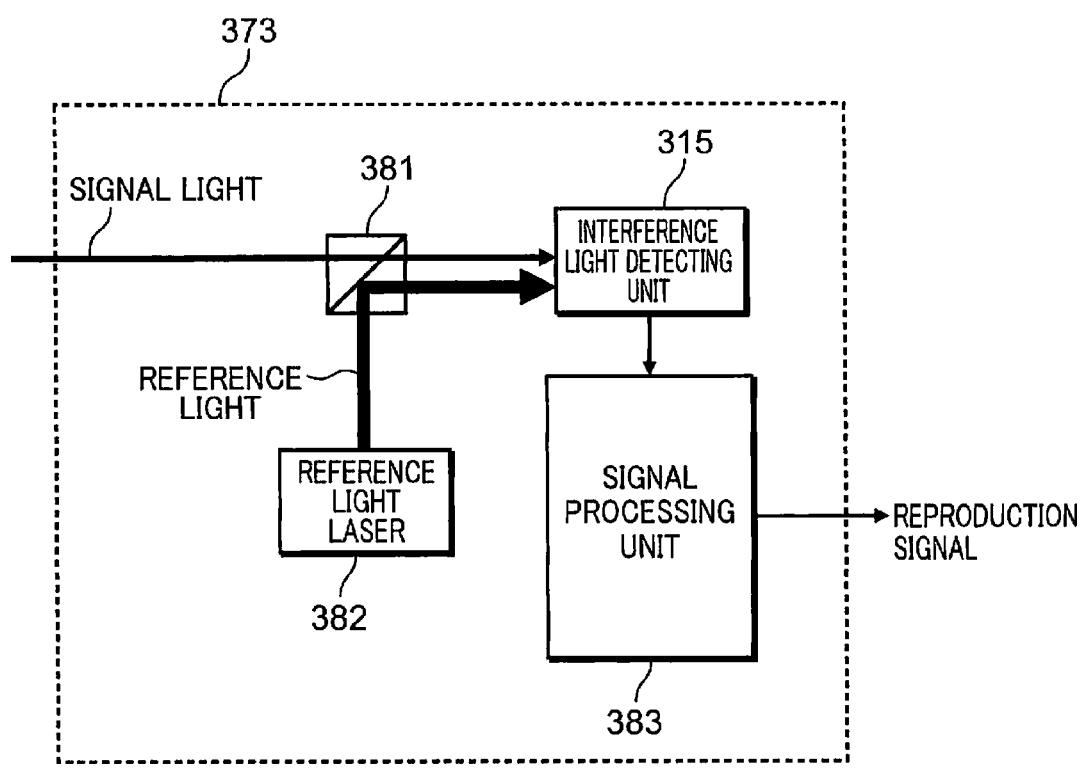
FIG. 23 is a diagram showing a configuration of a modulated signal detecting apparatus shown in FIG. 20.

FIG. 20 is a diagram showing an overall configuration of an optical transmission system 370 according to a sixth embodiment of the present invention. FIG. 21 is a diagram showing a configuration of an optical transmitter shown in FIG. 20. FIG. 22 is a diagram showing an example of a signal light modulating unit shown in FIG. 21. FIG. 23 is a diagram showing a configuration of a modulated signal detecting apparatus shown in FIG. 20.

The present sixth embodiment will now be described with reference to FIGS. 20, 21, 22, and 23. In FIG. 23, same components as those shown in FIGS. 13 and 14 are denoted by same reference numerals and descriptions thereof will be omitted.

In FIG. 20, the optical transmission system 370 comprises an optical transmitter 371, an optical transmission path 372, and a modulated signal detecting apparatus 373. The optical transmitter 371 outputs a phase-modulated optical signal. The optical signal outputted from the optical transmitter 371 is inputted to the modulated signal detecting apparatus 373 via the optical transmission path 372.

First, an example of the optical transmitter 371 will be described with reference to FIG. 21. The optical transmitter 371 shown in FIG. 21 comprises a laser 391, a transmission control unit 392, a transmission light modulating unit 393, a transmission signal processing unit 394, and a modulation control unit 395.

The transmission signal processing unit 394 receives transmission data. The transmission signal processing unit 394 having received transmission data notifies the transmission control unit 392 that data transmission is to be performed, generates a phase modulation signal based on the transmission data, and outputs the generated phase modulation signal to the modulation control unit 395. The transmission control unit 392 controls the laser 391 so that transmission light is outputted from the laser 391. The transmission light outputted from the laser 391 is guided to the transmission light modulating unit 393.

The modulation control unit 395 phase-modulates the transmission light by varying a refractive index of the transmission light modulating unit 393 based on the received phase modulation signal. The transmission light is phase-modulated by the transmission light modulating unit 393 and becomes signal light.

Moreover, while the transmission light modulating unit 393 phase-modulates transmission light by varying a refractive index in the present sixth embodiment, the present invention is not limited thereto. For example, the transmission light modulating unit 393 may phase-modulate transmission light by varying an actual optical path length using a plurality of optical elements such as a mirror and an optical fiber. Even in this case, operational effects of the present invention can be achieved.

An example of the transmission light modulating unit 393 which varies an optical path length will be described with reference to FIG. 22. The transmission light modulating unit 393 comprises an incidence mirror 401, a drive mirror 402, and an exit mirror 403. Transmission light incident to the transmission light modulating unit 393 is reflected by the incidence mirror 401 and proceeds toward the drive mirror 402. The transmission light reflected by the incidence mirror 401 is further reflected by the drive mirror 402 in a direction of the exit mirror 403. The drive mirror 402 can be driven in a direction approximately parallel to an optical axis of light reflected by the incidence mirror 401. Driving of the drive mirror 402 is not limited to any particular method. The transmission light reflected by the drive mirror 402 is reflected by the exit mirror 403. The transmission light reflected by the exit mirror 403 is outputted from the transmission light modulating unit 393 as signal light.

A geometric distance traveled by the transmission light in the transmission light modulating unit 393 is determined by a position of the drive mirror 402. Therefore, by varying the position of the drive mirror 402 using an actuator or the like, an optical path length of the transmission light can be varied and a phase of the outputted signal light can be differentiated from a phase of the transmission light.

Next, the modulated signal detecting apparatus 373 will be described with reference to FIG. 23. The modulated signal detecting apparatus 373 comprises a polarizing beam splitter (PBS) 381, a reference light laser 382, an interference light detecting unit 315, and a signal processing unit 383.

Horizontally-polarized signal light is inputted to the modulated signal detecting apparatus 373. The signal light is obtained by phase-modulating light in accordance with data to be transmitted to the modulated signal detecting apparatus 373. The PBS 381 transmits approximately 100% of horizontally-polarized light and reflects approximately 100% of perpendicularly-polarized light. A polarization direction of reference light outputted from the reference light laser 382 is set to a vertical direction that is approximately perpendicular to the signal light. Accordingly, since the horizontally-polarized signal light is transmitted through the PBS 381 and the perpendicularly-polarized reference light is reflected by the PBS 381, multiplexed light of the signal light and the reference light is generated. In addition, a wavelength of the reference light is set approximately the same as a wavelength of the signal light so as to cause interference with the signal light.

Next, a Jones vector of the multiplexed light of the signal light and the reference light at the PBS 381 is as represented by Expression (46) below.

$$\begin{pmatrix} E_d \\ E_m \end{pmatrix} = \begin{pmatrix} A_d \exp(i(\theta + \phi_{sig} + \phi_{noiseS})) \\ A_m \exp(i\theta + \phi_{noiseM}) \end{pmatrix} \quad (46)$$

In Expression (46), $E_d$ denotes an electrical field of signal light and $A_d$ denotes an amplitude component of the electrical field of the signal light. $E_m$ denotes an electrical field of the reference light outputted by the reference light laser 382, and $A_m$ denotes an amplitude component of the electrical field of the reference light. $\theta$ denotes a phase component relating to a wavelength $\lambda$ of laser light, time t, and location z, $\phi_{sig}$ denotes a phase-modulated signal component, and $\phi_{noiseS}$ and $\phi_{noiseM}$ are phase noise components due to a fluctuation in phase difference between the signal light electrical field and the reference light electrical field created by a fluctuation of optical path difference or the like.

The multiplexed light generated by the PBS 381 is incident to the interference light detecting unit 315. The interference light detecting unit 315 generates a plurality of interference beams of light with different phase differences from the incident multiplexed light, converts intensities of the generated plurality of interference beams of light into electrical signals, and generates an interference light detected signal.

A configuration of the interference light detecting unit 315 is shown in FIG. 14. Configurations of the interference light detecting unit 315 and the phase difference operating unit 10 are the same as the configurations of the interference light detecting unit and the phase difference operating unit according to the fourth embodiment and a description thereof will be omitted.

According to this configuration, the phase difference correcting unit of the phase difference operating unit 10 can perform control such that in Expression (8), the second term on the right hand-side ($\phi_{noise}$) is canceled by the third term on the right hand-side ($\delta$) in a similar manner to the first embodiment. As a result, reproduction of a modulated signal can be performed in which discontinuity of an arc tangent operation does not occur regardless of a range of the phase noise component $\phi_{noise}$ that is significantly larger than the signal component $\phi_{sig}$.

In addition, the phase difference error detecting unit according to the present sixth embodiment is also capable of continuously detecting fluctuations from minute fluctuations in the nanometer order and within a range of $\pm \pi$ to large fluctuations in the micrometer order and within a range of $\pm$several hundred $\pi$ in a similar manner to the first embodiment. Therefore, even a phase noise component in the nanometer order which is extremely difficult to track with an actuator can be suppressed and an optical transmission system capable of reproduction at a high S/N can be provided.

Moreover, in the present sixth embodiment, the modulated signal detecting apparatus 373 corresponds to an example of the modulated signal detecting apparatus.

Figure 24:
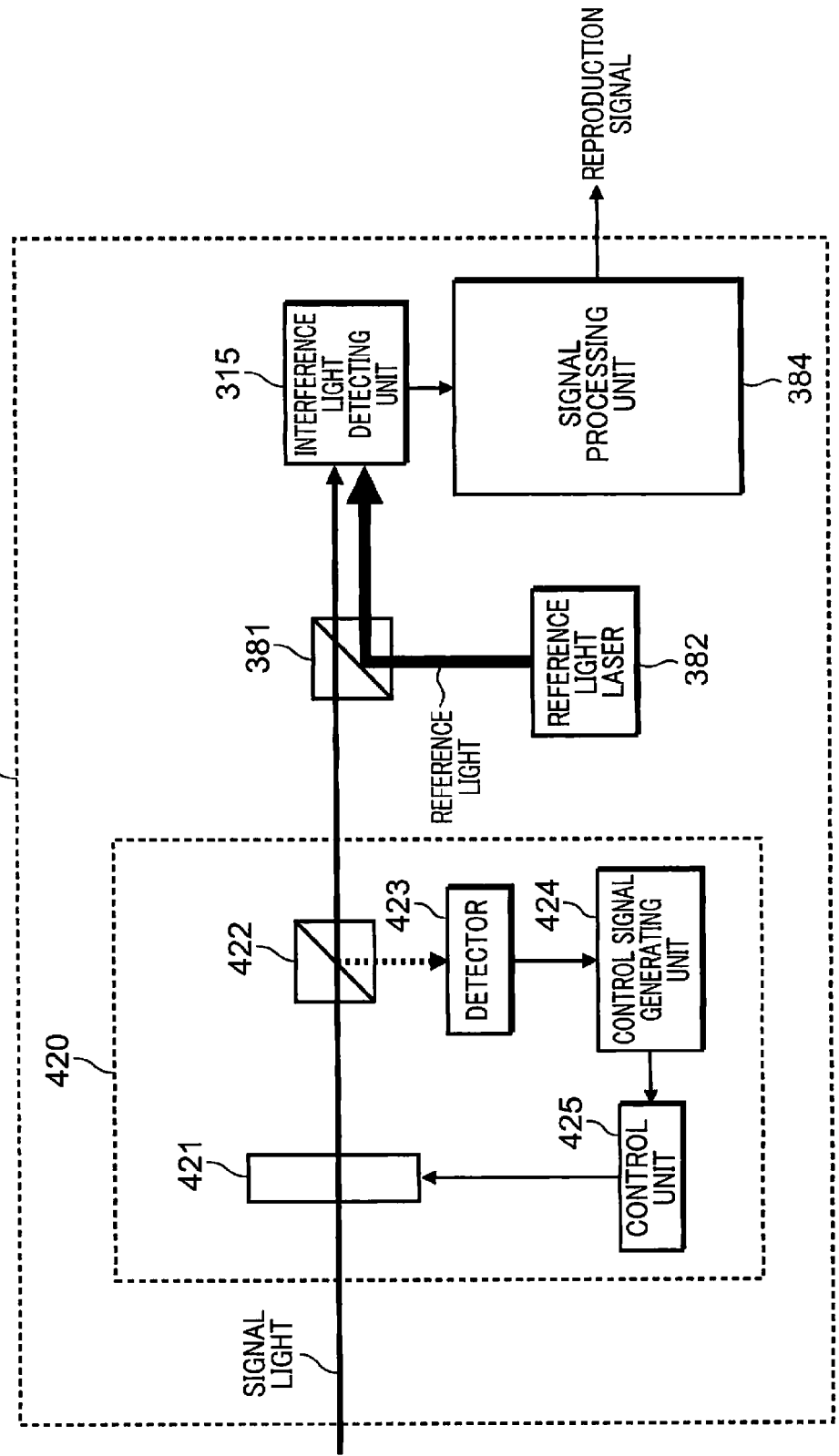
FIG. 24 is a diagram showing another configuration of a modulated signal detecting apparatus according to the sixth embodiment of the present invention.

In addition, in the present sixth embodiment, the modulated signal detecting apparatus 373 is not limited to the configuration shown in FIG. 23. FIG. 24 is a diagram showing another configuration of a modulated signal detecting apparatus according to the present sixth embodiment. For example, depending on characteristics of the optical transmission path 372 or external factors such as temperature, signal light is not always incident to the modulated signal detecting apparatus 373 as horizontally-polarized light. Therefore, as shown in FIG. 24, signal light whose polarization direction is controlled by a polarization control unit 420 is incident to the PBS 381. Accordingly, loss due to a fluctuation in the polarization direction of the signal light can be suppressed.

The modulated signal detecting apparatus 373 shown in FIG. 24 comprises the PBS 381, the reference light laser 382, the interference light detecting unit 315, a signal processing unit 384, and the polarization control unit 420. The polarization control unit 420 comprises a $\lambda/2$ plate 421, a PBS 422, a detector 423, a control signal generating unit 424, and a control unit 425.

A polarization direction of signal light incident to the polarization control unit 420 is not necessarily always horizontal polarization due to the signal light being subjected to various disturbances in the optical transmission path 372. The polarization control unit 420 controls the uncertain polarization direction of the signal light to become horizontal polarization.

Rotation of the λ/2 plate 421 is controlled by the control unit 425. The control unit 425 controls the λ/2 plate 421 so that a fast axis is at an angle of θ degrees as viewed from a direction of horizontal polarization. Accordingly, the signal light is transmitted with its polarization plane rotated by 2θ. The signal light transmitted through the λ/2 plate 421 is guided to the PBS 422. At this point, the PBS 422 transmits approximately 100% of horizontally-polarized light and reflects approximately 100% of perpendicularly-polarized light. If the signal light transmitted through the λ/2 plate 421 is completely horizontally-polarized light, approximately 100% of the signal light is transmitted through the PBS 422. However, even a slight inclination of the polarization plane of the signal light from a horizontal direction results in reflection of light by the PBS 422. The detector 423 detects light reflected by the PBS 422 and outputs an electrical signal.

The control signal generating unit 424 generates a control signal for controlling a rotation of the λ/2 plate 421 such that a signal outputted from the detector 423 is minimum. The generated control signal is inputted to the control unit 1205. The control unit 425 controls the signal light to become horizontally-polarized light by rotating the λ/2 plate 421 according to the control signal.

Moreover, in the present sixth embodiment, while the polarization control unit 420 comprises the λ/2 plate 421 and the control unit 425 which rotates the λ/2 plate 421 in order to rotate the polarization plane of signal light, the present invention is not limited thereto. For example, the polarization control unit 420 may rotate the polarization plane using an element which utilizes a Faraday effect in which a magnetic field is applied to rotate a polarization plane of linearly-polarized light parallel to the magnetic field. In any case, by using an element capable of controlling the polarization plane of signal light, an effect of suppressing loss of the signal light can be produced.

Moreover, while a configuration of the interference light detecting unit 315 has been described with reference to FIG. 14 in the present sixth embodiment, the present invention is not limited thereto. In principle, the interference light detecting unit 315 need only comprise three or more detectors and the respective detectors need only detect interference light such that phase differences between signal light and reference light differ from each other. For example, when the interference light detecting unit 315 comprises three detectors, phase differences between the signal light and the reference light at the respective detectors may be realized by a combination of 0, 120, and 240 degrees or a combination of −120, 0, and 120 degrees. For example, an interference light detecting unit may be configured so as to comprise three detectors as shown in FIG. 16. Since FIG. 16 has already been described in the fourth embodiment, a detailed description will be omitted.

Figure 25:
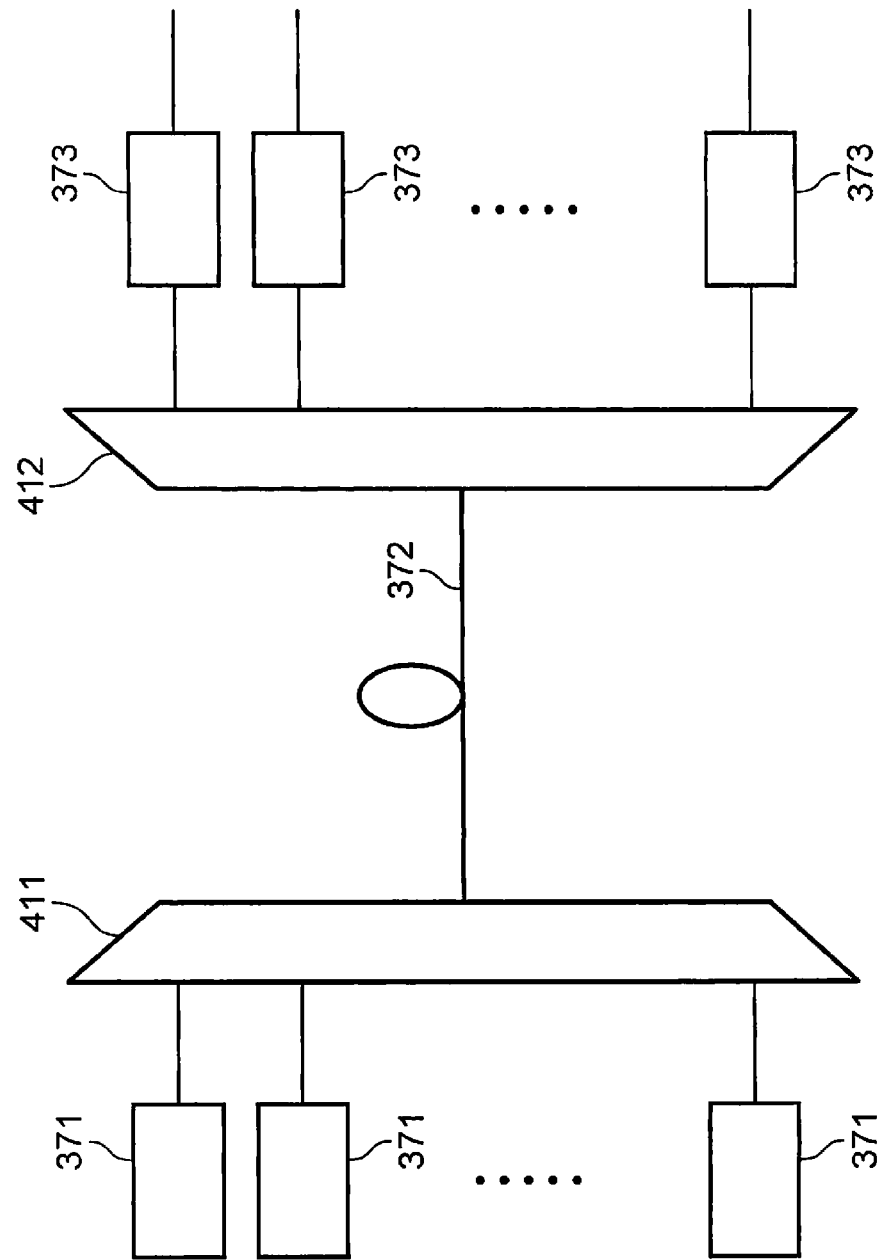
FIG. 25 is a diagram showing another configuration of an optical transmission system according to the sixth embodiment of the present invention.

Moreover, while a configuration of an optical transmission system has been described with reference to FIG. 20 in the present sixth embodiment, the present invention is not limited thereto. FIG. 25 is a diagram showing another configuration of an optical transmission system according to the present sixth embodiment. For example, an optical transmission system 410 shown in FIG. 25 comprises a plurality of optical transmitters 371, a wavelength multiplexing unit 411, the optical transmission path 372, a wavelength separating unit 412, and a plurality of modulated signal detecting apparatuses 373. In this case, each optical transmitter 371 modulates transmission light with a different wavelength and outputs the modulated transmission light as signal light. The signal light outputted from each optical transmitter 371 is inputted to a modulated signal detecting apparatus 373 corresponding to each wavelength and reproduction of a modulated signal is performed. Accordingly, data can be transmitted in parallel.

Each optical transmitter 371 outputs signal light with a different wavelength. A plurality of signal beams of light outputted from the respective optical transmitters 371 is inputted to the wavelength multiplexing unit 411. The wavelength multiplexing unit 411 multiplexes the plurality of inputted signal beams of light. The multiplexed signal light is inputted to the wavelength separating unit 412 via the optical transmission path 372. The wavelength separating unit 412 separates the inputted multiplexed signal light into signal beams of light of the respective wavelengths and respectively outputs the separated signal beams of light to the respective modulated signal detecting apparatuses 373. Signal light separated by the wavelength separating unit 412 is inputted to the modulated signal detecting apparatus 373.

Moreover, the interference light detecting unit 315 is not limited to the configuration shown in FIG. 14. For example, while a λ/2 plate and a λ/4 plate are used as optical elements for obtaining signals in which a phase difference between signal light and reference light is varied, an optical element capable of controlling polarized light, nano-photonic material, or a hybrid optical function element such as an optical waveguide may also be used.

In addition, in the present sixth embodiment, a configuration may be adopted in which the interference light detecting unit 315 and the signal processing unit 383 are integrated on a single LSI on which an optical waveguide, an electric circuit, and an electronic circuit are integrated.

Furthermore, in the present sixth embodiment, a configuration may be adopted in which a part of or all of the modulated signal detecting apparatus 373 is integrated on a single LSI on which an optical waveguide, an electric circuit, and an electronic circuit are integrated.

Seventh Embodiment

Figure 26:
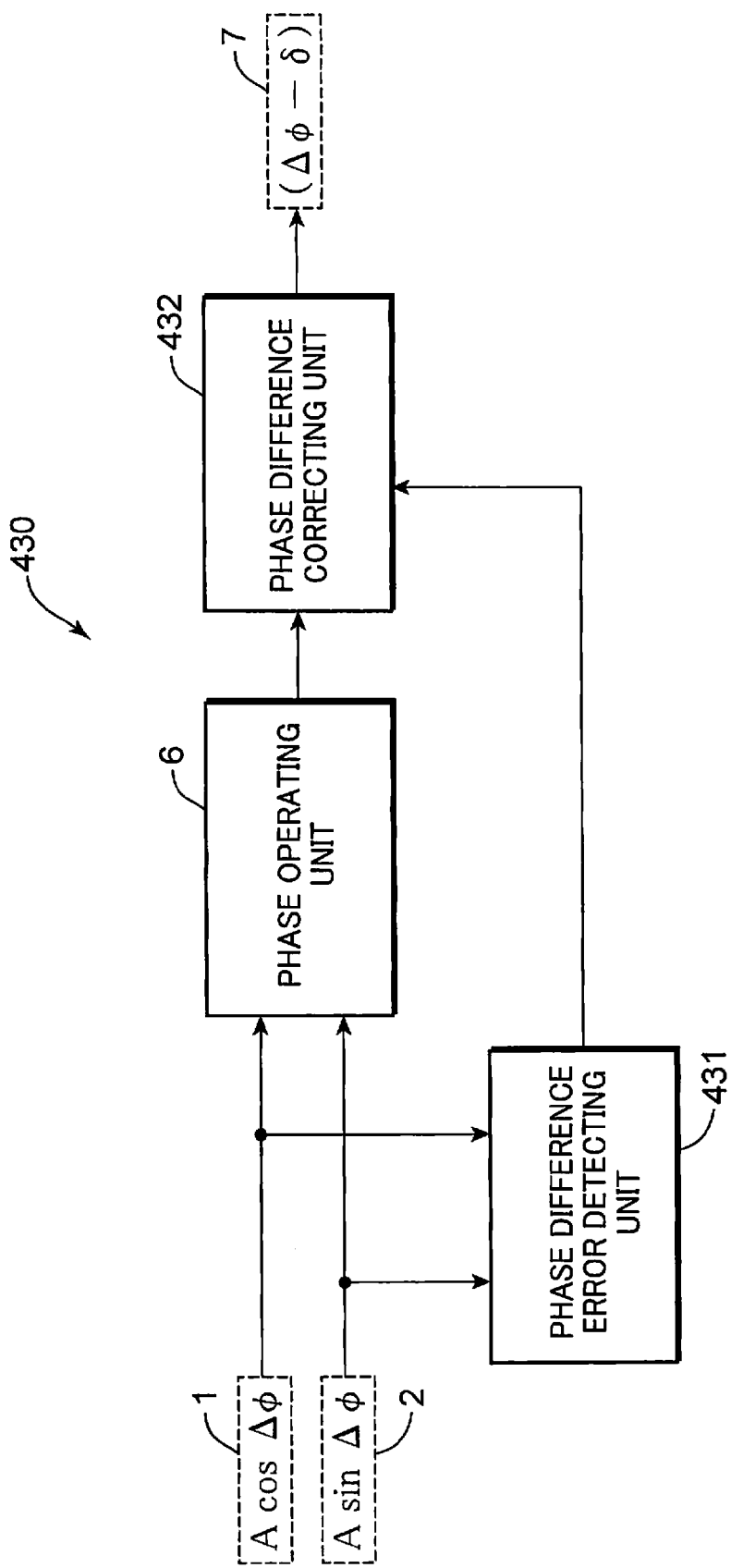
FIG. 26 is a diagram showing a configuration of a phase difference operating unit according to a seventh embodiment of the present invention.
Figure 27:
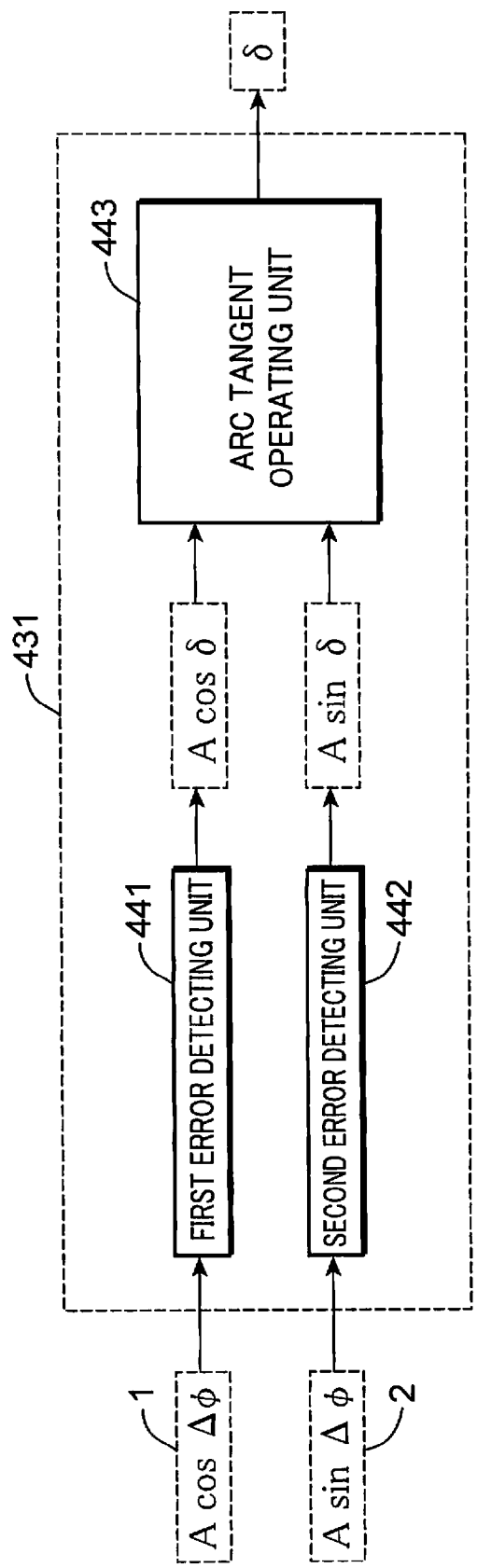
FIG. 27 is a diagram showing a configuration of an interference light detecting unit according to the seventh embodiment of the present invention.
Figure 28:
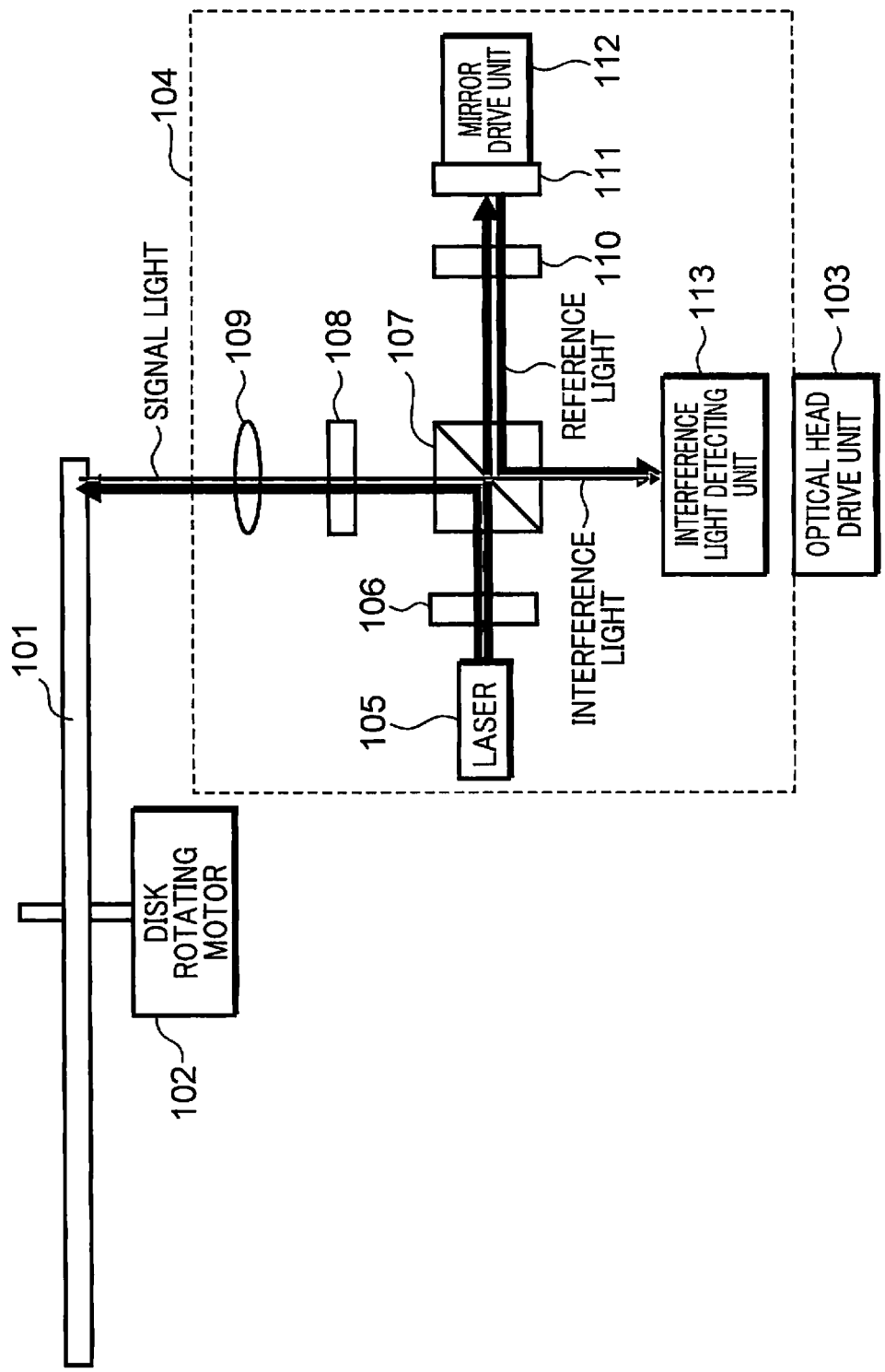
FIG. 28 is a diagram showing a configuration of a conventional interferometric optical disk apparatus.
Figure 29:
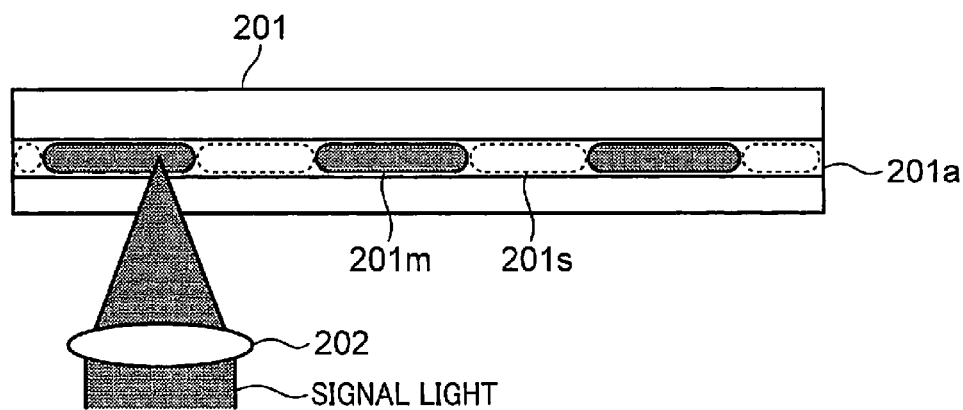
FIG. 29 is a diagram for describing an example in which an intensity of signal light is modulated in an optical disk medium.

FIGS. 26 and 27 are schematic diagrams showing a configuration of a modulated signal detecting apparatus according to a seventh embodiment of the present invention. Hereinafter, the present seventh embodiment will be described in detail.

In FIGS. 26 and 27, same components as those shown in FIGS. 1 and 2 are denoted by same reference numerals and descriptions thereof will be omitted.

FIG. 26 is a diagram showing a configuration of a phase difference operating unit according to the seventh embodiment of the present invention. In FIG. 26, a phase difference operating unit 430 comprises a phase difference error detecting unit 431, a phase operating unit 6, and a phase difference correcting unit 432. A cosine component 1 and a sine component 2 are inputted to the phase difference error detecting unit 431 and the phase operating unit 6. The cosine component 1 has a phase difference (an optical path difference) $\Delta\phi$ between reference light and signal light. The sine component 2 has an amplitude that is approximately equal to that of the cosine component 1 and a phase difference of approximately $\pi/2$ from the cosine component 1. The phase operating unit 6 outputs a phase difference component $\Delta\phi$. A detailed configuration of the phase operating unit 6 is similar to the configuration in the first embodiment and will not be described in detailed in the present seventh embodiment.

The phase difference error detecting unit 431 detects and outputs a phase difference error component δ.

Next, the phase difference error detecting unit 431 will be described with reference to FIG. 27. FIG. 27 is a diagram showing a configuration of an interference light detecting unit according to the seventh embodiment of the present invention. The phase difference error detecting unit 431 shown in FIG. 27 comprises a first error detecting unit 441, a second error detecting unit 442, and an arc tangent operating unit 443. Based on Expression (47) below, the first error detecting unit 441 generates a signal according to a phase noise component $\phi_{noise}$ other than a signal component $\phi_{sig}$ from the cosine component 1 inputted to the phase difference error detecting unit 431, and outputs the generated signal. In addition, based on Expression (48) below, the second error detecting unit 442 generates a signal according to a phase noise component $\phi_{noise}$ other than a signal component $\phi_{sig}$ from the sine component 2 inputted to the phase difference error detecting unit 431, and outputs the generated signal.

$$A \cos \delta = \gamma A \cos \phi_{noise} \quad (47)$$

$$A \sin \delta = \gamma A \sin \phi_{noise} \quad (48)$$

At this point, if a frequency band of the phase noise component $\phi_{noise}$ is lower than a frequency band of the signal component $\phi_{sig}$, for example, the first error detecting unit 441 and the second error detecting unit 442 are constituted by a low-pass filter (LPF) capable of ideally dividing the frequency band of the signal component $\phi_{sig}$ from the frequency band of the phase noise component $\phi_{noise}$ and an amplifier which amplifies a signal divided by the LPF by an arbitrary value $\gamma$.

A signal output (A cos δ) according to the phase noise component $_{noise}$ generated by the first error detecting unit 441 is outputted to the arc tangent operating unit 443. In addition, a signal output (A sin δ) according to the phase noise component $\phi_{noise}$ generated by the second error detecting unit 442 is outputted to the arc tangent operating unit 443. The arc tangent operating unit 443 outputs a phase difference error component δ. In this case, the arc tangent operating unit 443 has similar functions to the phase operating unit 6 according to the first embodiment. Therefore, a description of the arc tangent operating unit 443 will be omitted in the present seventh embodiment.

Based on the phase difference component Δφ outputted from the phase operating unit 6 and the phase difference error component δ outputted from the phase difference error detecting unit 431, the phase difference correcting unit 432 generates and outputs a phase difference-corrected phase difference signal Sig by performing an operation represented by Expression (49) below.

$$Sig = \begin{cases} \Delta\phi - \delta - 2\pi & \text{(when } \Delta\phi - \delta > \pi) \\ \Delta\phi - \delta & \text{(when } -\pi < \Delta\phi - \delta \le \pi) \\ \Delta\phi - \delta + 2\pi & \text{(when } \Delta\phi - \delta \le -\pi) \end{cases} \quad (49)$$

In the present seventh embodiment, the signal component $\phi_{sig}$ is modulated within a range of ±π. Therefore, when Δφ−δ exceeds a range of the signal component $\phi_{sig}$ (a range of ±π), the phase difference correcting unit 432 corrects the value of Δφ−δ by adding 2π to or subtracting 2π from Δφ−δ. Accordingly, a reproduced modulated signal is prevented from being discontinuous due to a discontinuous portion of the arc tangent operation.

According to this configuration, the phase difference correcting unit 432 can perform control such that in Expression (8), the second term on the right hand-side ($\phi_{noise}$) is canceled by the third term on the right hand-side (δ) in a similar manner to the first embodiment. As a result, reproduction of a modulated signal can be performed in which discontinuity of an arc tangent operation does not occur regardless of a range of the phase noise component $\phi_{noise}$ that is significantly larger than the signal component $\phi_{sig}$.

In addition, the phase difference error detecting unit 431 according to the present seventh embodiment is also capable of continuously detecting fluctuations from minute fluctuations in the nanometer order and within a range of ±π to large fluctuations in the micrometer order and within a range of ±several hundred π in a similar manner to the first embodiment. Therefore, even a phase noise component in the nanometer order which is extremely difficult to track with an actuator can be suppressed and high S/N reproduction can be achieved.

Furthermore, in the present seventh embodiment, a cosine transform and a sine transform of the phase difference error component δ need not be performed by the first error correction gain operating unit 17 and the second error correction gain operating unit 18 as is the case in the first embodiment as shown in FIG. 2, and a phase difference error component δ according to a phase noise component can be handled without modification.

Moreover, in the present seventh embodiment, the phase difference correcting unit 432 and the phase difference error detecting unit 431 correspond to an example of the correcting unit, the phase operating unit 6 corresponds to an example of the phase operating unit, the phase difference error detecting unit 431 corresponds to an example of the phase difference error detecting unit, and the phase difference correcting unit 432 corresponds to an example of the phase difference correcting unit.

Furthermore, while camming of a recording surface of an optical disk medium has been described in the present seventh embodiment as an example of a fluctuating factor due to disturbance, a fluctuation component in a lower frequency band than a modulated signal due to a fluctuation factor such as a temperature variation can also be canceled with the configuration of the present seventh embodiment.

In addition, while the first error detecting unit 441 and the second error detecting unit 442 use an LPF to separate a noise component other than a signal component in the present seventh embodiment, the present invention is not limited thereto. The first error detecting unit 441 and the second error detecting unit 442 may adopt any configuration as long as a noise component other than a signal component can be separated. For example, the first error detecting unit 441 and the second error detecting unit 442 may use a band elimination filter (BEF) or a band-pass filter (BPF) capable of removing a frequency band of a signal component. In addition, when a noise component exists which has a higher frequency band than a frequency band of a signal component, the first error detecting unit 441 and the second error detecting unit 442 may use a high-pass filter (HPF). Furthermore, the first error detecting unit 441 and the second error detecting unit 442 may separate a noise component other than a signal component by transforming a time domain signal into a frequency domain signal using Fourier transform and dividing a band by frequency domains.

Moreover, in the present seventh embodiment, a configuration may be adopted in which the phase difference error detecting unit 431, the phase operating unit 6, and the phase difference correcting unit 432 are integrated on a single LSI.

In addition, in the present seventh embodiment, functions of the phase difference error detecting unit 431, the phase operating unit 6, and the phase difference correcting unit 432 may be realized by a computer-executable program and a computer.

The specific embodiments described above primarily include an invention configured as described below.

A modulated signal detecting apparatus according to an aspect of the present invention is a modulated signal detecting apparatus for detecting a modulated signal component from a signal based on a phase difference component between phase-modulated signal light and non-phase-modulated reference light, the modulated signal detecting apparatus comprising: a correcting unit which detects a phase difference error component included in the phase difference component and which corrects a first signal having the phase difference component as an angle of a cosine function and a second signal whose angle of the cosine function differs from that of the first signal by approximately π/2 based on the detected phase difference error component; and a phase operating unit which operates a phase difference component from the first signal and the second signal corrected by the correcting unit, wherein the correcting unit obtains the corrected first signal and the corrected second signal by rotating a coordinate point represented by the first signal and the second signal on a polar coordinate plane by an angle corresponding to the phase difference error component.

According to this configuration, the correcting unit detects a phase difference error component included in a phase difference component and, based on the detected phase difference error component, corrects a first signal having the phase difference component as an angle of a cosine function and a second signal whose angle of the cosine function differs from that of the first signal by approximately π/2. The phase operating unit operates a phase difference component from the first signal and the second signal corrected by the correcting unit. In addition, the correcting unit obtains the corrected first signal and the corrected second signal by rotating a coordinate point represented by the first signal and the second signal on a polar coordinate plane by an angle corresponding to the phase difference error component.

Therefore, a phase difference error component that is a phase noise component created by a fluctuation of optical path difference between phase-modulated signal light and non-phase-modulated reference light can be canceled from a phase difference component between the signal light and the reference light, and a modulated signal with a high S/N ratio can be detected.

In addition, in the modulated signal detecting apparatus described above, the correcting unit preferably comprises: a phase difference error detecting unit which detects a phase difference error component included in the phase difference component; and a phase difference correcting unit which corrects the first signal and the second signal based on the phase difference error component detected by the phase difference error detecting unit.

According to this configuration, the phase difference error detecting unit detects a phase difference error component included in the phase difference component. The phase difference correcting unit corrects the first signal and the second signal based on the phase difference error component detected by the phase difference error detecting unit.

Therefore, the phase difference error detecting unit and the phase difference correcting unit can be configured as separate components and the first signal and the second signal can be corrected by the phase difference error detecting unit using the phase difference error component detected by the phase difference error detecting unit.

Furthermore, in the modulated signal detecting apparatus described above, preferably, the phase difference error detecting unit detects the phase difference error component from the phase difference component operated by the phase operating unit.

According to this configuration, since the phase difference error component is detected from the phase difference component operated by the phase operating unit, correction can be repetitively performed so that the phase difference error component included in the phase difference component becomes zero.

In addition, in the modulated signal detecting apparatus described above, preferably, the correcting unit detects a first phase difference error component from the first signal, detects a second phase difference error component from the second signal, corrects the first signal based on the detected first phase difference error component, and corrects the second signal based on the detected second phase difference error component.

According to this configuration, a first phase difference error component is detected from the first signal, a second phase difference error component is detected from the second signal, the first signal is corrected based on the detected first phase difference error component, and the second signal is corrected based on the detected second phase difference error component.

Therefore, phase difference error components can be respectively detected from the first signal and the second signal and the first signal and the second signal can be respectively corrected using the detected phase difference error components.

Furthermore, in the modulated signal detecting apparatus described above, preferably, the correcting unit extracts a frequency band corresponding to the phase difference error component from the phase difference component.

According to this configuration, since a frequency band corresponding to the phase difference error component is extracted from the phase difference component, the phase difference error component can be readily detected.

In addition, in the modulated signal detecting apparatus described above, preferably, the correcting unit includes a low-pass filter which extracts a frequency band corresponding to the phase difference error component that is lower than a frequency band corresponding to the modulated signal component from the phase difference component.

According to this configuration, since a frequency band corresponding to the phase difference error component that is lower than a frequency band corresponding to the modulated signal component is extracted from the phase difference component, a phase noise component that is a frequency band can be extracted.

Furthermore, in the modulated signal detecting apparatus described above, preferably, the correcting unit generates a first error correction gain α and a second error correction gain β based on the detected phase difference error component and generates a first phase difference-corrected signal $Y_1$ and a second phase difference-corrected signal $Y_2$ representing a corrected first signal $X_1$ and a corrected second signal $X_2$ based on the following expressions $$Y_1 = \alpha X_1 + \beta X_2$$

$$Y_2 = \alpha X_2 - \beta X_1, \text{ and}$$

the phase operating unit operates the phase difference component from the first phase difference-corrected signal $Y_1$ and the second phase difference-corrected signal $Y_2$.

According to this configuration, a first error correction gain α and a second error correction gain β are generated based on the detected phase difference error component, and a first phase difference-corrected signal $Y_1$ and a second phase difference-corrected signal $Y_2$ representing a corrected first signal $X_1$ and a corrected second signal $X_2$ are generated based on the above expressions. In addition, a phase difference component is operated from the first phase difference-corrected signal $Y_1$ and the second phase difference-corrected signal $Y_2$.

Therefore, based on the expressions above, the first phase difference-corrected signal $Y_1$ and the second phase difference-corrected signal $Y_2$ from which the phase difference error component has been removed from the phase difference component can be readily calculated.

In addition, in the modulated signal detecting apparatus described above, preferably, the correcting unit multiplies the phase difference error component by a predetermined factor, cumulates the phase difference error component multiplied by the predetermined factor, and generates the first error correction gain α and the second error correction gain β based on the cumulated phase difference error component.

According to this configuration, the first error correction gain α and the second error correction gain β can be generated based on a cumulated phase difference error component.

Moreover, preferably, the modulated signal detecting apparatus described above further comprises: a branching unit which branches interference light between the signal light and the reference light into at least three beams of light; at least three detectors which respectively detect the at least three beams of light branched by the branching unit and which respectively output detected signals corresponding to intensities of detected beams of light; and a detected signal operating unit which operates the first signal and the second signal based on the detected signals outputted by the at least three detectors.

According to this configuration, the branching unit branches interference light between the signal light and the reference light into at least three beams of light. The at least three detectors respectively detect the at least three beams of light branched by the branching unit and respectively output detected signals corresponding to intensities of detected beams of light. The detected signal operating unit operates the first signal and the second signal based on the detected signals outputted by the at least three detectors.

Therefore, the first signal and the second signal can be operated by using three beams of light among which a phase difference between the signal light and the reference light differ from one another.

Furthermore, in the modulated signal detecting apparatus described above, preferably, the signal light is reflected light from an optical disk medium.

According to this configuration, by detecting a modulated signal component from a signal based on a phase difference component between signal light phase-modulated by an information recording surface of an optical disk medium and reference light, data recorded on the optical disk medium can be reproduced.

In addition, in the modulated signal detecting apparatus described above, preferably, the signal light is obtained by phase-modulating light in accordance with data to be transmitted to the modulated signal detecting apparatus.

According to this configuration, since the signal light is obtained by phase-modulating light in accordance with data to be transmitted to the modulated signal detecting apparatus, data can be transmitted using light.

A modulated signal detecting method according to another aspect of the present invention is a modulated signal detecting method of detecting a modulated signal component from a signal based on a phase difference component between phase-modulated signal light and non-phase-modulated reference light, the modulated signal detecting method comprising: a phase difference error detecting step of detecting a phase difference error component included in the phase difference component; a correcting step of correcting a first signal having the phase difference component as an angle of a cosine function and a second signal whose angle of the cosine function differs from that of the first signal by approximately $\pi/2$ based on the detected phase difference error component; and a phase operating step of operating a phase difference component from the first signal and the second signal corrected in the correcting step, wherein in the correcting step, the corrected first signal and the corrected second signal are obtained by rotating a coordinate point represented by the first signal and the second signal on a polar coordinate plane by an angle corresponding to the phase difference error component.

According to this configuration, in the phase difference error detecting step, a phase difference error component included in the phase difference component is detected. In the correcting step, based on the detected phase difference error component, a first signal having the phase difference component as an angle of a cosine function and a second signal whose angle of the cosine function differs from that of the first signal by approximately $\pi/2$ are corrected. In the phase operating step, a phase difference component is operated from the corrected first signal and the corrected second signal. In addition, in the correcting step, the corrected first signal and the corrected second signal are obtained by rotating a coordinate point represented by the first signal and the second signal on a polar coordinate plane by an angle corresponding to the phase difference error component.

Therefore, a phase difference error component that is a phase noise component created by a fluctuation of optical path difference between phase-modulated signal light and non-phase-modulated reference light can be canceled from a phase difference component between the signal light and the reference light, and a modulated signal with a high S/N ratio can be detected.

It is to be understood that the specific embodiments or examples described in Description of Embodiments are merely illustrative of the technical contents of the present invention, and that the present invention should not be construed as being limited to such specific examples. Obviously, many modifications and variations of the present invention are possible without departing from the spirit of the invention and the scope of the following claims.

The modulated signal detecting apparatus and the modulated signal detecting method according to the present invention are capable of suppressing a phase noise component by signal processing and amplifying weak signal light, and are useful as a modulated signal detecting apparatus and a modulated signal detecting method for detecting a modulated signal component from a signal based on a phase difference component between phase-modulated signal light and non-phase-modulated reference light. In addition, the modulated signal detecting apparatus and the modulated signal detecting method according to the present invention are useful as a modulated signal detecting apparatus and a modulated signal detecting method for improving reproduction performance of a large-capacity optical storage. Furthermore, the modulated signal detecting apparatus and the modulated signal detecting method according to the present invention are applicable to uses including optical communication and optical transmission such as an optical bus.

The invention claimed is:

1. A modulated signal detecting apparatus for detecting a modulated signal component from a signal based on a phase difference component $\Delta_\phi$ between phase-modulated signal light and non-phase-modulated reference light, the modulated signal detecting apparatus comprising:
a correcting unit which detects a phase difference error component δ included in the phase difference component $\Delta_\phi$ and which corrects a first signal $X_1$ having the phase difference component $\Delta_\phi$ as an angle of a cosine function and a second signal $X_2$ whose angle of the cosine function differs from that of the first signal $X_1$ by approximately π/2 based on the detected phase difference error component δ; and
a phase operating unit which operates a corrected phase difference component Δϕ-δ from the first signal $X_1$ and the second signal $X_2$ corrected by the correcting unit, wherein
the correcting unit obtains the corrected first signal $X_1$ and the corrected second signal $X_2$ by correcting the phase difference error component δ which is the lower band portion of the modulated signal component by extracting a lower band portion of the modulated signal component and rotating a coordinate point represented by the first signal $X_1$ and the second signal $X_2$ on a polar coordinate plane by an angle corresponding to the phase difference error component δ, the correcting unit further including:
a phase difference error component extracting unit which extracts a frequency band corresponding to the phase difference error component δ that is lower than a frequency band corresponding to the modulated signal component by a low-pass filter from the phase difference component Δϕ;
a first error correction gain operating unit which generates a cosine value cos δ of the detected phase difference error component δ as a first error correction gain α;
a second error correction gain operating unit which generates a sine value sin δ of the detected phase difference error component δ as a second error correction gain β;
a first amplifier which multiplies the first signal X1 by α;
a second amplifier which multiplies the second signal by $X_2$ by α;
a third amplifier which multiplies the first signal $X_1$ by −β;
a fourth amplifier which multiplies the second signal $X_2$ by β;
a first addition operating unit which outputs a first phase difference-corrected signal $Y_1$ obtained by adding an output value α$X_1$ of the first amplifier and an output value β$X_2$ of the fourth amplifier; and
a second addition operating unit which outputs a second phase difference-corrected signal $Y_2$ obtained by adding an output value α$X_2$ of the second amplifier and an output value −β$X_1$ of the third amplifier, and
the phase operating unit operates the corrected phase difference component Δϕ−δ from the first phase difference-corrected signal $Y_1$ and the second phase difference-corrected signal $Y_2$.

2. The modulated signal detecting apparatus according to claim 1, wherein
the correcting unit comprises:
a phase difference error detecting unit which detects a phase difference error component included in the phase difference component; and
a phase difference correcting unit which corrects the first signal $X_1$ and the second signal $X_2$ based on the phase difference error component δ detected by the phase difference error detecting unit.

3. The modulated signal detecting apparatus according to claim 1, wherein the phase difference error detecting unit detects the phase difference error component δ from the corrected phase difference component operated by the phase operating unit.

4. The modulated signal detecting apparatus according to claim 1, wherein the correcting unit detects a first phase difference error component from the first signal $X_1$, detects a second phase difference error component from the second signal $X_2$, corrects the first signal $X_1$ based on the detected first phase difference error component, and corrects the second signal $X_2$ based on the detected second phase difference error component.

5. The modulated signal detecting apparatus according to claim 1, wherein the correcting unit multiplies the phase difference error component δ by a predetermined factor, cumulates the phase difference error component δ multiplied by the predetermined factor, and generates the first error correction gain α and the second error correction gain β based on the cumulated phase difference error component δ.

6. The modulated signal detecting apparatus according to claim 1, further comprising:
a branching unit which branches interference light between the signal light and the reference light into at least three beams of light;
at least three detectors which respectively detect the at least three beams of light branched by the branching unit and which respectively output detected signals corresponding to intensities of the detected beams of light; and
a detected signal operating unit which operates the first signal $X_1$ and the second signal $X_2$ based on the detected signals outputted by the at least three detectors.

7. The modulated signal detecting apparatus according to claim 1, wherein the signal light is reflected light from an optical disk medium.

8. The modulated signal detecting apparatus according to claim 1, wherein the signal light is obtained by phase-modulating light in accordance with data to be transmitted to the modulated signal detecting apparatus.

9. A modulated signal detecting method of detecting a modulated signal component from a signal based on a phase difference component Δϕ between phase-modulated signal light and non-phase-modulated reference light, the modulated signal detecting method comprising:
a phase difference error detecting step of detecting a phase difference error component δ included in the phase difference component Δϕ;
a correcting step of correcting a first signal $X_1$ having the phase difference component as an angle of a cosine function and a second signal $X_2$ whose angle of the cosine function differs from that of the first signal $X_1$ by approximately π/2 based on the detected phase difference error component δ; and
a phase operating step of operating a corrected phase difference component Δϕ−δ from the first signal $X_1$ and the second signal $X_2$ corrected in the correcting step, wherein
the correcting step obtains the corrected first signal $X_1$ and the corrected second signal $X_2$ by correcting the phase difference error component δ which is the lower band portion of the modulated signal component by extracting a lower band portion of the modulated signal component and rotating a coordinate point represented by the first signal $X_1$ and the second signal $X_2$ on a polar coordinate plane by an angle corresponding to the phase difference error component $\delta$, the correcting step further including:
- a phase difference error component extracting step which extracts a frequency band corresponding to the phase difference error component $\delta$ that is lower than a frequency band corresponding to the modulated signal component by a low-pass filter from the phase difference component $\Delta\phi$;
- a first error correction gain operating step which generates a cosine value $\cos \delta$ of the detected phase difference error component $\delta$ as a first error correction gain $\alpha$;
- a second error correction gain operating step which generates a sine value $\sin \delta$ of the detected phase difference error component $\delta$ as a second error difference correction gain $\beta$;
- a first multiplying step which multiplies the first signal $X_1$ by $\alpha$;
- a second multiplying step which multiplies the second signal $X_2$ by $\alpha$;
- a third multiplying step which multiplies the first signal $X_1$ by $-\beta$;
- a fourth multiplying step which multiplies the second signal $X_2$ by $\beta$;
- a first addition operating step which outputs a first phase difference-corrected signal $Y_1$ obtained by adding an output value $\alpha X_1$ of the first multiplying step and an output value $\beta X_2$ of the fourth multiplying step; and
- a second addition operating step which outputs a second phase difference-corrected signal $Y_2$ obtained by adding an output value $\alpha X_2$ of the second multiplying step and an output value $-\beta X_1$ of the third multiplying step, and the phase operating step operates the corrected phase difference component $\Delta\phi-\delta$ from the first phase difference-corrected signal $Y_1$ corrected by the correcting unit and the second phase difference-corrected signal $Y_2$.

* * * * *